United States Patent
Shiono et al.

(10) Patent No.: US 7,848,205 B2
(45) Date of Patent: Dec. 7, 2010

(54) INFORMATION-RECORDING MEDIUM AND OPTICAL INFORMATION-RECORDING/REPRODUCING DEVICE

(75) Inventors: Teruhiro Shiono, Osaka (JP); Tatsuo Itoh, Osaka (JP)

(73) Assignee: Panasonic Corporation, Osaka (JP)

( * ) Notice: Subject to any disclaimer, the term of this patent is extended or adjusted under 35 U.S.C. 154(b) by 595 days.

(21) Appl. No.: 11/913,013

(22) PCT Filed: Apr. 26, 2006

(86) PCT No.: PCT/JP2006/308781

§ 371 (c)(1),
(2), (4) Date: Oct. 29, 2007

(87) PCT Pub. No.: WO2006/118164

PCT Pub. Date: Nov. 9, 2006

(65) Prior Publication Data

US 2009/0067313 A1 Mar. 12, 2009

(30) Foreign Application Priority Data

Apr. 27, 2005 (JP) .............................. 2005-129265

(51) Int. Cl.
*G11B 7/00* (2006.01)
(52) U.S. Cl. .............................. 369/112.01; 369/53.28; 369/275.4; 369/286; 369/288
(58) Field of Classification Search ............. 369/53.28, 369/112.01, 286, 288
See application file for complete search history.

(56) References Cited

U.S. PATENT DOCUMENTS 5,559,784 A * 9/1996 Ota .............................. 369/94

(Continued)

FOREIGN PATENT DOCUMENTS

JP 2001-505701 4/2001

(Continued)

OTHER PUBLICATIONS

Nakano and Kawata, "Light propagation in a multilayered medium for three-dimensional optical memory", Oct. 1, 2005, Applied Optics, vol. 44, No. 28, pp. 5966-5971.*

(Continued)

*Primary Examiner*—Wayne R Young
*Assistant Examiner*—Brenda Bernardi
(74) *Attorney, Agent, or Firm*—Wenderoth, Lind & Ponack, L.L.P.

(57) ABSTRACT

An information-recording medium having a substrate and a recording part formed on the substrate allowing three-dimensional formation of recording pits, the recording part, comprising multiple recording layers, in which the recording pits are formed with a converged recording light at a wavelength of $\lambda 2$ and reproduced with a converged reproducing light with a wavelength $\lambda 1$ shorter than the wavelength $\lambda 2$, and intermediate layers alternately laminated between the recording layers, wherein the reflectance at the recording light wavelength of $\lambda 2$ in the unrecorded region is smaller than the reflectance at the reproducing light wavelength of $\lambda 1$ in the unrecorded regions of the recording layers.

22 Claims, 20 Drawing Sheets

U.S. PATENT DOCUMENTS

| | | | |
|---|---|---|---|
| 6,009,065 | A | 12/1999 | Glushko et al. |
| 6,970,414 | B1 * | 11/2005 | Pavel ...................... 369/275.1 |
| 7,139,233 | B2 * | 11/2006 | Mizuuchi et al. ....... 369/112.01 |
| 2005/0157629 | A1 * | 7/2005 | Shiono et al. ............ 369/275.2 |
| 2005/0254393 | A1 * | 11/2005 | Mizuuchi et al. ....... 369/112.01 |
| 2006/0126457 | A1 * | 6/2006 | Maeda et al. ............ 369/44.37 |
| 2006/0140070 | A1 * | 6/2006 | Shiono et al. ............ 369/44.23 |
| 2007/0242592 | A1 * | 10/2007 | Alpert ........................ 369/121 |

FOREIGN PATENT DOCUMENTS

| | | |
|---|---|---|
| JP | 2003-171382 | 6/2003 |
| JP | 2004-259369 | 9/2004 |
| WO | 2004/019333 | 3/2004 |
| WO | 2004/107040 | 12/2004 |

OTHER PUBLICATIONS

International Search Report dated Aug. 8, 2006 issued in the International Application No. PCT/JP2006/308781.

Yoshimasa Kawata et al., "Three-dimensional optical memory by using an organic multilayered medium", Optics Japan 2000, Preprint pp. 95-96 (2000).

* cited by examiner

INFORMATION-RECORDING MEDIUM AND OPTICAL INFORMATION-RECORDING/REPRODUCING DEVICE

TECHNICAL FIELD

The present invention relates to an information-recording medium and an optical information-recording/reproducing device capable of recording an information bit, i.e., a recording pit, three-dimensionally. In particular, it relates to an information-recording medium that suppresses decrease in recording light intensity even in a lower recording layer far separated from an object lens, assuring supply of a reflected light for focus servo control, and allows favorable recording/reproduction at high accuracy, and an optical information-recording/reproducing device for use in recording and reproduction of the information-recording medium.

BACKGROUND ART

Optical disks such as CD (compact disk) and DVD (digital versatile disk) and optical card memories have been used as optical information-recording media.

For further improvement of the volume of recorded information, an information-recording medium shown in FIG. 20 having multiple recording layers 101 three-dimensionally laminated is described in Nonpatent Document 1.

The information-recording medium 121 has a transparent glass substrate 104 and recording layers 101a to 101d of a urethane-urea copolymer material of a photon-mode material and intermediate layers 102a to 102c of a film of PVA (polyvinylalcohol) and PMMA (polymethyl methacrylate) laminated alternately on the transparent substrate 104.

During recording, a high-peak-power recording light 122a having a wavelength of 0.790 μm that is emitted from a Ti-sapphire-laser recording-light source 120a is transmitted through a beam splitter 118a, expanded in beam diameter by a beam expander 123, transmitted through another beam splitter 118b, and converged by an object lens 106 into a desirable recording layer 101c of a multilayered three-dimensionally recordable/reproducible information-recording medium 121 (convergent light 107). When such a convergent light 107 is focused, the region where the power density of light is higher (convergent point and its surrounding region) absorbs the light as if the wavelength became half by a nonlinear phenomenon such as a two-photon absorption process, forming a recording pit 105. Accordingly even when the number of recording layers is increased, the other recording layers are almost transparent to the recording light, and the two-photon absorption occurs only in a particular recording position, and thus, it is possible to avoid decay of the recording light and perform recording sufficiently in the lower recording layer.

On the other hand, during reproduction, a low-peak-power reproducing light 122b at a wavelength of 0.6328 μm emitted from a He—Ne laser of reproducing-light source 120b is similarly converged by an object lens 106 into a recording pit 105 in the desirable recording layer 101c (convergent light 107). The reflected light is bent by the beam splitter 118b into the Y-axis direction, converged by a detection lens 111, transmitted through a pinhole 114 placed at the convergent point of the detection lens 111, and detected by a photodetector 119, allowing a signal to be reproduced.

Although not discussed in Nonpatent Document 1, in conventional optical disk recording/reproducing devices, focus servo control is performed to make the recording or reproducing light from its light source focus though an object lens on a disk accurately during recording or reproduction. It is thus preferable to perform the focus servo control also when a recording pit 105 formed by nonlinear recording such as two-photon absorption recording as in Nonpatent Document 1 is recorded or reproduced. Accordingly, if a certain reflected light is obtained from the recording layer 101 when the recording light 122a or the reproducing light 122b is irradiated on the information-recording medium 121, it is possible to focus the recording light accurately in a desirable recording layer 101c by using the reflected light as the light for focus servo control.

However, studies by the inventors showed that there were the following problems occurring when such focus servo control is performed in a three-dimensionally recordable information-recording medium 121 such as that described in Nonpatent Document 1.

Namely during recording or during reproduction of the information-recording medium 121, reflected lights for focus servo control both at the recording-light wavelength and the reproducing-light wavelength are needed at a certain intensity in each recording layer 101 for converging the recording or reproducing light in a desirable recording layer 101c accurately.

However, the information-recording medium 121 has multiple laminated recording layers 101 for forming recording pits three-dimensionally. Thus when the number of the recording layers 101 is large, the recording and reproducing lights are reflected and adsorbed not only in a desirable recording layer 101c but also in other recording layers 101. Reflection and absorption in each recording layer 101 lead to decrease of the intensity of recording and reproducing lights in the bottom layer most separated from the object lens (101d in FIG. 20). Accordingly, use of the recording or reproducing light for obtaining the reflected light for focus servo control results in decrease of transmission of the recording or reproducing light, causing a problem that favorable recording pits are not formed in lower recording layers especially during recording demanding high light intensity for example in two-photon absorption process. Specifically, when nonlinear recording such as two-photon absorption recording, multiple-photon absorption recording or plasma absorption recording is used, the recording sensitivity decreases more drastically with decrease in light intensity especially during recording than that in common one-photon absorption recording. For example in the case of two-photon absorption recording, the large decrease in recording sensitivity occurs, because the recording sensitivity is proportional to the square of the light intensity (with the nth power in n-photon absorption recording). For example in normal one-photon absorption recording, the recording sensitivity decreases to 0.8 times when the intensity of recording light becomes 0.8 times, but it decreases to the square of the value, 0.64 times, in two-photon absorption recording. Thus in a conventional information-recording medium as described in Nonpatent Document 1, it was difficult to assure a reflected light for focus servo control and also a sufficient light intensity in the lower recording layer during recording. Although it may be possible to adjust the power of the recording-light source according to the position of the recording layer in such a case, because the nonlinear recording demand a high-peak-power semiconductor laser, for example at several 100 mW to 1 W or more, as the recording-light source, it is unrealistic to adjust the power of the light source toward the upward direction. Thus in forming recording pits three-dimensionally in a recording part, it is difficult to make the power of recording-light source for that purpose higher than that for forming recording pits in upper recording layers. For that reason, there is a need for an information-recording medium that demands no power adjustment during recording or allows favorable recording with smaller power adjustment (for example, adjustment amount of not more than 30%).

Nonpatent Document 1: Yoshimasa Kawata et al., "Three-dimensional optical memory by using an organic multilayered medium", Optics Japan 2000, Preprint pp. 95-96 (2000)

SUMMARY OF THE INVENTION

The present invention, which was made to solve the problems in traditional methods, is to provide an information-recording medium that suppresses decrease in recording light intensity even in a lower recording layer far separated from an object lens, assuring supply of a reflected light for focus servo control, and allows favorable recording/reproduction at high accuracy, and an optical information-recording/reproducing device for use in recording and reproduction of the information-recording medium.

An aspect of the present invention is an information-recording medium having a substrate and a recording part formed on the substrate allowing three-dimensional formation of recording pits, the recording part, comprising multiple recording layers, in which the recording pits are formed with a converged recording light with a wavelength of $\lambda 2$ and reproduced with a converged reproducing light with a wavelength $\lambda 1$ shorter than the wavelength $\lambda 2$, and intermediate layers alternately laminated between the recording layers, wherein the reflectance at the recording light wavelength of $\lambda 2$ in unrecorded regions of the recording layers is smaller than the reflectance at the reproducing light wavelength of $\lambda 1$ in the unrecorded regions of the recording layers.

The object, characteristics, aspects, and advantages of the present invention will become more evident in the following detailed description and the drawings attached.

BRIEF DESCRIPTION OF THE DRAWINGS

FIG. 2A is a chart showing an example of the relationship between the thickness of recording layer in the information-recording medium and the reflectances of the recording and reproducing lights in the unrecorded region of the recording layer in the embodiment 1 of the present invention, while

FIG. 3A is a chart showing another example of the relationship between the thickness of recording layer in the information-recording medium and the reflectances of the recording and reproducing lights in the unrecorded region of the recording layer in the embodiment 1 of the present invention, while

FIG. 4A is a chart showing the relationship between the thickness of recording layer in the information-recording medium of FIG. 2A and the reflectances of the reproducing light in the recorded and unrecorded region of the recording layer, while

FIG. 5A is a chart showing the relationship between the thickness of the recording layer in the information-recording medium of FIG. 3A and the reflectances of the reproducing light in the recorded and unrecorded regions of the recording layer, while

FIG. 8A is a chart showing an example of the relationship between the thickness of the recording layer in the information-recording medium in the embodiment 2 of the invention and the reflectances of the reproducing and recording lights in the unrecorded regions of the recording layer, while

FIG. 9A is a chart showing the relationship between the thickness of the recording layer in the information-recording medium in the embodiment 2 of the invention and the reflectances of the recording and reproducing lights in the unrecorded region of the recording layer, while

FIG. 10A is a chart showing the relationship between the thickness of the recording layer in the information-recording medium shown in FIG. 8A and the reflectances of the reproducing light in the recorded and unrecorded regions of the recording layer, while

FIG. 11A is a chart showing the relationship between the thickness of the recording layer in the information-recording medium of FIG. 9A and the reflectances of the reproducing light in the recorded and unrecorded regions of the recording layer, while

FIG. 12A is a chart showing an example of the relationship between the thickness of the recording layer and the reflectances of the recording and reproducing lights in the unrecorded region of the recording layer in the information-recording medium in the embodiment 3 of the present invention, while

FIG. 13A is a chart showing another example of the relationship between the thickness of the recording layer in the information-recording medium and the reflectances of the recording and reproducing lights in the unrecorded region of the recording layer in the embodiment 3 of the present invention, while

FIG. 14A is a chart showing the relationship between the thickness of the recording layer in the information-recording medium shown in FIG. 12A and the reflectance of the reproducing light in the recorded and unrecorded regions of the recording layer, while

FIG. 15A is a chart showing the relationship between the thickness of the recording layer in the information-recording medium shown in FIG. 13A and the reflectances of the reproducing light in the recorded and unrecorded regions of the recording layer, while

FIG. 16A is a chart showing an example of the relationship between the thickness of the recording layer in the information-recording medium and the reflectances of the recording and reproducing lights in the unrecorded region of the recording layer in the embodiment 4 of the present invention, while

FIG. 17A is a chart showing another example of the relationship between the thickness of the recording layer in the information-recording medium and the reflectances of the recording and reproducing lights in the unrecorded region of the recording layer in the embodiment 4 of the present invention, while

FIG. 18A is a chart showing the relationship between the thickness of the recording layer in the information-recording medium in FIG. 16A and the reflectances of the reproducing light in the recorded and unrecorded regions of the recording layer, while

FIG. 19A is a chart showing the relationship between the thickness of the recording layer in the information-recording medium in FIG. 17A and the reflectances of the reproducing light in the recorded and unrecorded regions of the recording layer, while

DESCRIPTION OF THE PREFERRED EMBODIMENTS

The information-recording medium according to the present invention is characterized in that, when a recording light and a reproduction light are used and the reproducing-light wavelength $\lambda 1$ (hereinafter, referred to simply as $\lambda 1$) is shorter than the recording-light wavelength $\lambda 2$ (hereinafter, referred to simply as $\lambda 2$), the reflectance of the $\lambda 2$-wavelength recording light in the unrecorded region is smaller than the reflectance of the $\lambda 1$-wavelength reproducing light in the unrecorded region, for assuring supply of a reflected light for focus servo control and also forming recording pits three-dimensionally by nonlinear recording and reproducing them.

Figure 1:
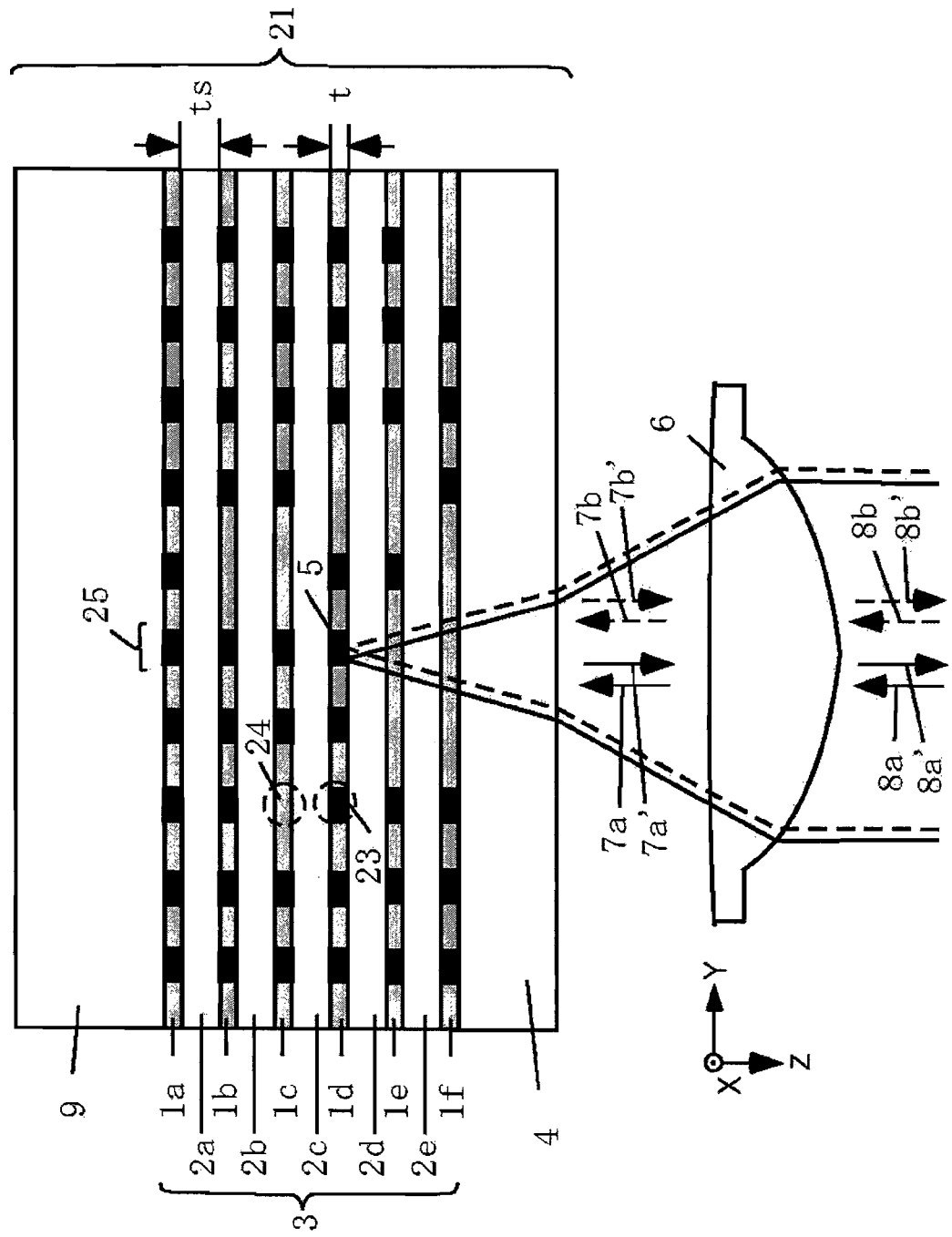
FIG. 1 is an explanatory drawing illustrating the configuration of an information-recording medium according to the invention and the method of recording/reproducing a recording pit.

FIG. 1 is an explanatory drawing showing the configuration of an information-recording medium according to the invention and the method of recording/reproducing a signal.

As shown in FIG. 1, the information-recording medium 21 according to the invention has a substrate 9, for example having a thickness of 1.1 mm, and a recording part 3 including multiple recording layers 1 formed on the substrate 9 (six layers 1a to 1f in FIG. 1, layer thickness: t). The recording part 3 also has intermediate layers 2, for example having a thickness $t_s$ of 3 to 10 μm, between the recording layers 1 (five layers 2a to 2e in FIG. 1), and the recording layers 1 and the intermediate layers 2 form an alternate multiple-laminated structure.

A protective layer 4, for example having a thickness of 50 to 100 μm, may be formed additionally on the incident side or input/output side of the recording lights 7a and 7a' (7a: convergent recording light on information-recording medium 21, and 7a': reflective recording light from information-recording medium 21) and reproducing lights 7b and 7b' (7b: convergent reproducing light on information-recording medium 21, and 7b': reflected reproducing light from information-recording medium 21) of the recording part 3. The protective layer 4 thus formed enables recording and reproduction of information, even when there is, for example, some dust, stain, and/or scratch on the information-recording medium.

A convergent light 7a at a recording-light wavelength $\lambda 2$ is irradiated during recording, for example, on track 25, a recording region of the target recording layer 1d of the information-recording medium according to the present invention. Then, the reflected light 7a' can be used as a light for focus servo control, as the reflected light 7a' from the recording layer 1d is detected with a photodetector (not shown in FIG. 1). The recording light is thus condensed accurately into the target recording layer 1d during recording by the focus servo control by using the reflected light 7a', causing change in an optical constant of the recording layer, preferably in refractive index, and thus forming a recording pit 5.

Similarly during reproduction, the convergent light 7b at the reproducing-light wavelength $\lambda 1$ is irradiated, for example, into a target recording layer 1d. Then, its reflected light 7b' can be used as the light for focus servo control by detecting the reflected light 7b' from the recording layer 1d with a photodetector (not shown in FIG. 1). Thus by the focus servo control using the reflected light 7b', the reproducing light is condensed accurately on the track 25 in the target recording layer 1d during reproduction, reproducing a signal by the reflected light 7b' from the recording pit 5 in the recorded region.

Because recording pits 5 are formed locally on the track 25 in recording layer 1d as the unrecorded region 24 and the recorded region 23 during reproduction (region of the recording pit 5 formed is in the recorded region 23), the reflected light from the unrecorded region 24 or the recorded region 23

(recording pit 5), whichever is higher in intensity, is used as the reflected light for focus servo control. Accordingly in the information-recording medium according to the present invention, a recording pit is formed in nonlinear recording such as two-photon absorption recording by using the change caused by recording in an optical constant of the recording layer such as refractive index, and thus, the reflectance of the recording layer varies between before and after recording, depending on the combination of the recording and intermediate layers. Thus, for example, when the difference (|n2−n|) between the refractive index n2 of intermediate layer 2 and the refractive index n of unrecorded region 24 in a recording layer 1 is larger than the difference (|n2−n1|) between the refractive index n2 of intermediate layer 2 and the refractive index n1 of recorded region 23 in the recording layer 1, the reflectance of unrecorded region 24 becomes larger, while the reflectance of recorded region 23 becomes smaller. Accordingly in an information-recording medium having such properties, the reflected light from the unrecorded region 24 is mainly detected as a light for focus servo control. Such a characteristic of the decrease in reflectance caused by recording is called H→L (High-to-Low) characteristic. On the other hand, when the difference (|n2−n|) between the refractive index n2 of intermediate layer 2 and the refractive index n of the unrecorded region 24 in a recording layer 1 is smaller than the difference (|n2−n|) between the refractive index n2 of intermediate layer 2 and the refractive index n1 of recorded region 23 in the recording layer 1, the reflectance of the unrecorded region 24 becomes smaller, while the reflectance of the recorded region 23 becomes larger. Accordingly in an information-recording medium having such properties, the reflected light from the recorded region 23 (i.e., recording pit 5) is mainly used as the light for focus servo control. Such a characteristic of the decrease in reflectance caused by recording is called L→H (Low-to-High) characteristic.

Normally, the change in refractive index by recording (|n1−n|) is not so large, and, considering the light intensity of the reflected light, an intermediate layer, having a refractive index n2 higher than the refractive index n of unrecorded region and the refractive index n1 of recorded region, i.e., an intermediated layer having a refractive index satisfying the relationship: n<n1<n2, is preferable, for obtaining an information-recording medium having an H→L characteristic. On the other hand, for a medium having an L→H characteristic, an intermediate layer having a refractive index n2 lower than the refractive index n of unrecorded region and the refractive index n1 of recorded region, i.e., an intermediate layer having a refractive index satisfying the relationship: n1>n>n2, is preferable. The refractive index of intermediate layer 2 is preferably different by 0.05 or more from the refractive index of unrecorded region 24 in the recording layer 1 or the refractive index of recorded region 23. It is known that it is possible to obtain a reflectance of at least approximately 0.1% or more with respect to the reproducing light and to perform favorable focus servo control during reproduction, if the difference in refractive index is 0.05 or more.

The method of assuring supply of a reflected light for focus servo control described above leads to a decrease in light intensity in the lower recording layer more separated from the object lens during recording or reproduction, making recording or reproduction more difficult. In particular in nonlinear recording, the decrease in light intensity during recording affects recording sensitivity exponentially, which in turn makes it difficult to form the recording pits in lower recording layers.

It was found in the present invention that it was possible to conduct favorable high-accuracy recording and reproduction also in the lower recording layer under focus servo control, by forming a recording layer in such a manner that the reflectance of the $\lambda 2$-wavelength light in the unrecorded region 24 becomes smaller than the reflectance of the $\lambda 1$-wavelength light in the unrecorded region by using the difference between the wavelengths $\lambda 1$ and $\lambda 2$ during nonlinear recording.

Thus, the recording-light transmission coefficient of each recording layer 1 is larger if it is the recording layer satisfying the relationship in reflectance according to the present invention. Thus, it is possible to perform recording favorably even in the bottom recording layer (1a in FIG. 1) most separated from the object lens 6 without significant decrease in light intensity of the recording light 7a. A recording light having a large peak power of several hundreds mW to 1 W or more is needed in nonlinear recording, and thus, it is difficult to adjust the used recording light source toward increase in its peak power, while the peak power needed for the reproducing light source is smaller, and it is thus preferable to make the power lower than that of the recording light (generally, about several to several dozens mW) also for prevention of recording by the reproducing light. Accordingly, the power of the reproducing-light source is about 1/10 of the power of recording-light source, and the maximum power (peak power) has a margin. Therefore, even when the reflectance of the reproducing light in the unrecorded region of the recording layer is made larger than the reflectance of the recording light, the light intensity of the reproduction light reflected from the recording layer decreases only gradually, as the target recording layer becomes lower, more separated from the object lens 6, and thus, it is possible to prevent decrease in reflection light intensity, to the degree allowing detection thereof by increase of the power of the reproducing-light source as needed according to the decrease. Even when the recording- and reproducing-light sources are used in combination, the reflectance at the reproducing-light wavelength is larger, and thus, it is possible to obtain sufficient light intensity even if the power of the reproducing light is smaller. On the other hand, the power of the recording light is about 10 times larger than that of the reproducing light, and thus, the reflectance at the recording-light wavelength may be adjusted to be as small as about 1/10 of that at the reproducing-light wavelength.

It was found in the present invention that, although the reflective properties of the recording layer may vary according to the recording- and reproducing-light wavelengths used, it was possible to determine the reflectances suitable for the combination of wavelengths by adjusting the thickness of the recording layer. Hereinafter in the following embodiments, typical information-recording media satisfying the relationship in reflectances of the recording and reproducing lights will be described respectively in particular combinations of recording- and reproducing-light wavelengths.

Embodiment 1

In the present embodiment, described are an information-recording medium and an optical information-recording/reproducing device using a recording light and a reproducing light, of which the reproducing-light wavelength $\lambda 1$ is shorter than the recording-light wavelength $\lambda 2$, for example the reproducing-light wavelength satisfies the relationship: $0.6 \, \mu m \leq \lambda 1 \leq 0.7 \, \mu m$ and the recording-light wavelength satisfies the relationship: $0.73 \, \mu m \leq \lambda 2 \leq 0.83 \, \mu m$. Typical examples of the light sources emitting lights at such wavelengths include the combination of a semiconductor laser emitting a light at a wavelength $\lambda 1$ of 0.66 μm and a light at a wavelength $\lambda 2$ of 0.78 μm.

Figure 2A:
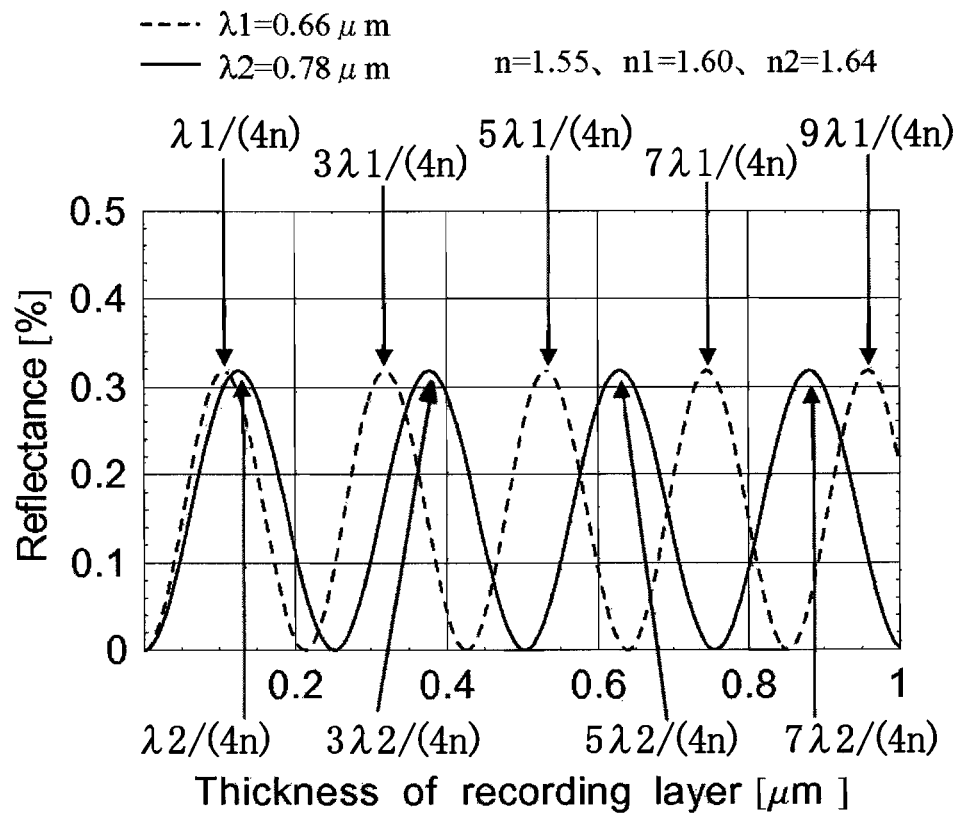
Figure 2B:
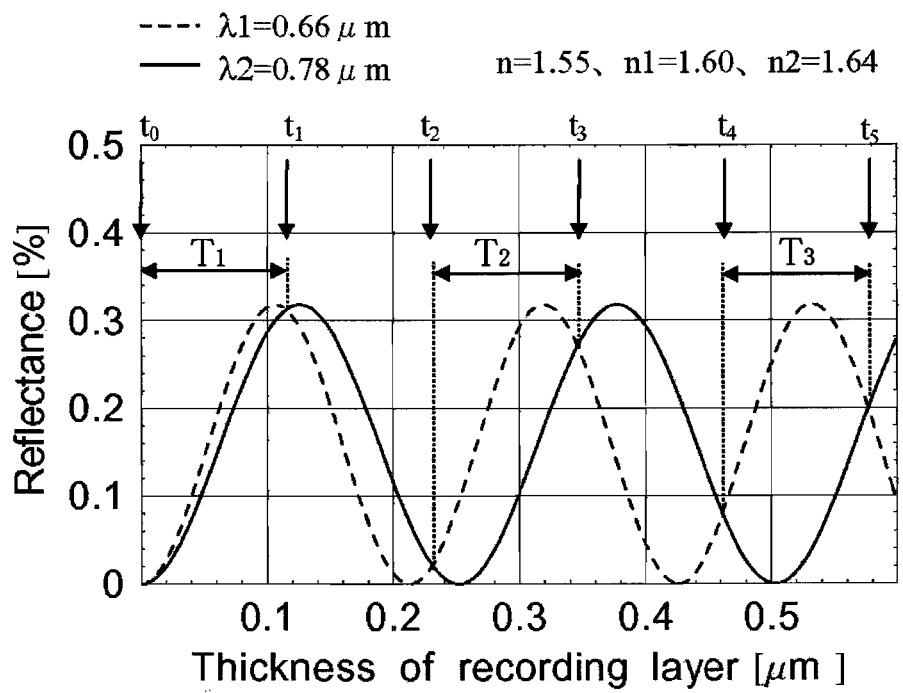
FIG. 2B is a chart showing the thickness ranges of the recording layer where the reflectance of the recording light becomes lower than the reflectance of the reproducing light in the unrecorded region of the recording layer in FIG. 2A.
Figure 3A:
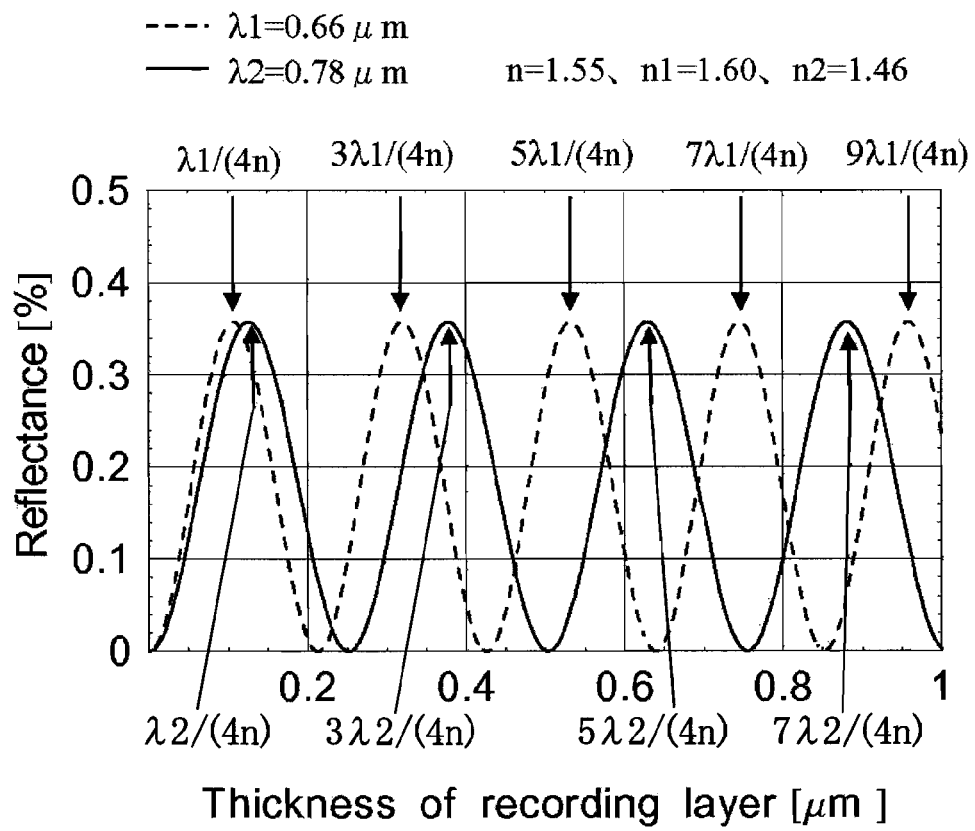
Figure 3B:
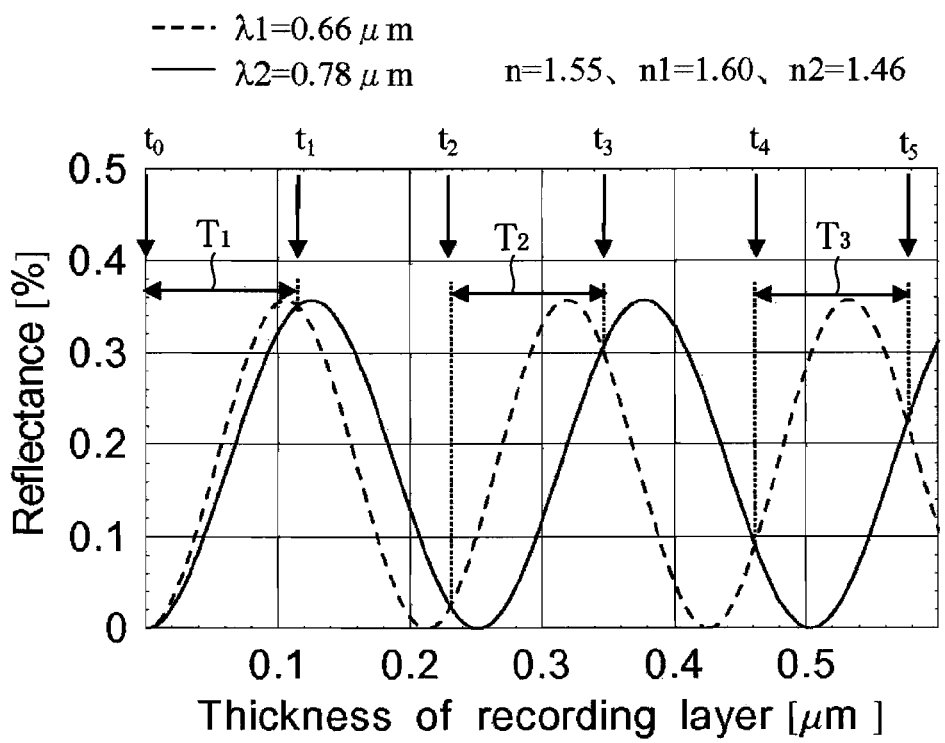
FIG. 3B is a chart showing the thickness ranges of the recording layer where the reflectance of the recording light becomes lower than the reflectance of the reproducing light in the unrecorded region of the recording layer in FIG. 3A.
Figure 4A:
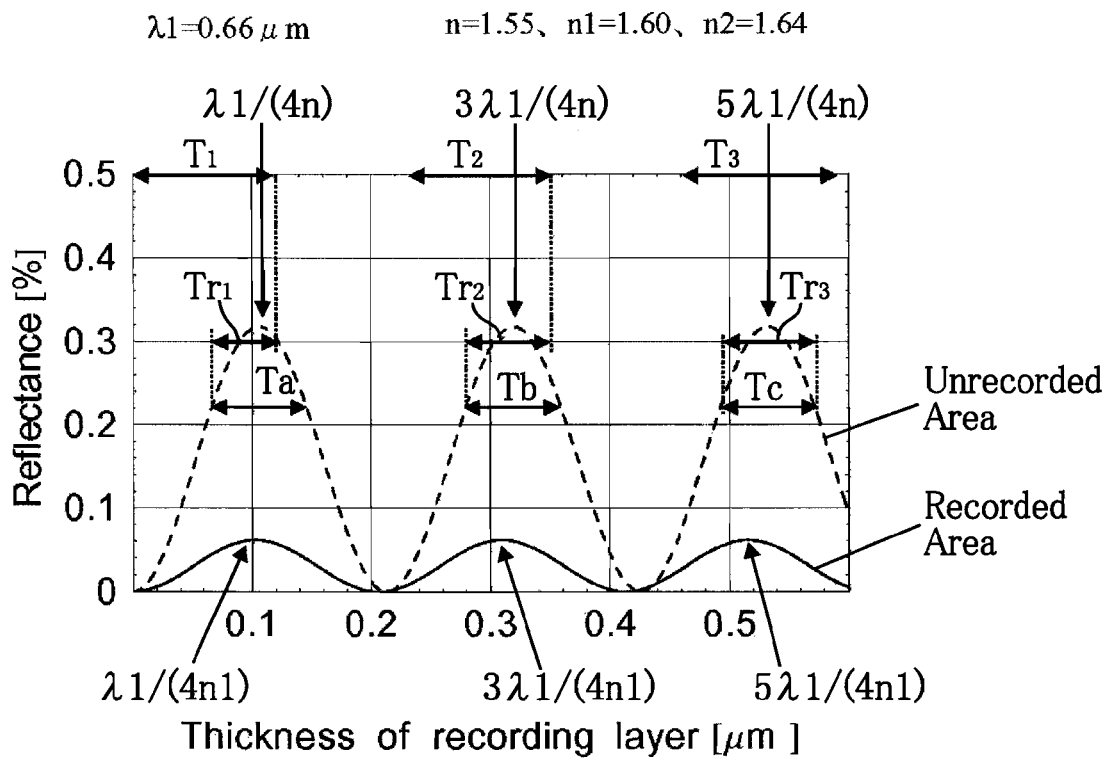
Figure 4B:
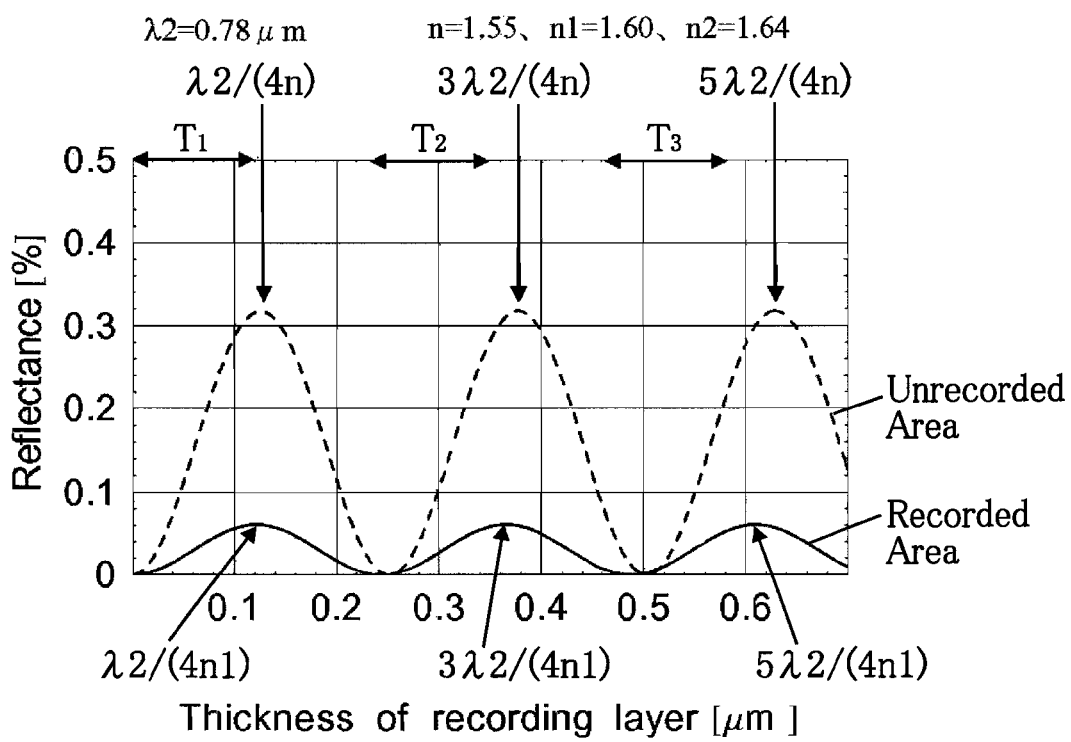
FIG. 4B is a chart showing the relationship between the thickness of the recording layer of the information-recording medium of FIG. 2A and the reflectances of the recording light in the recorded and unrecorded regions of the recording layer.
Figure 5A:
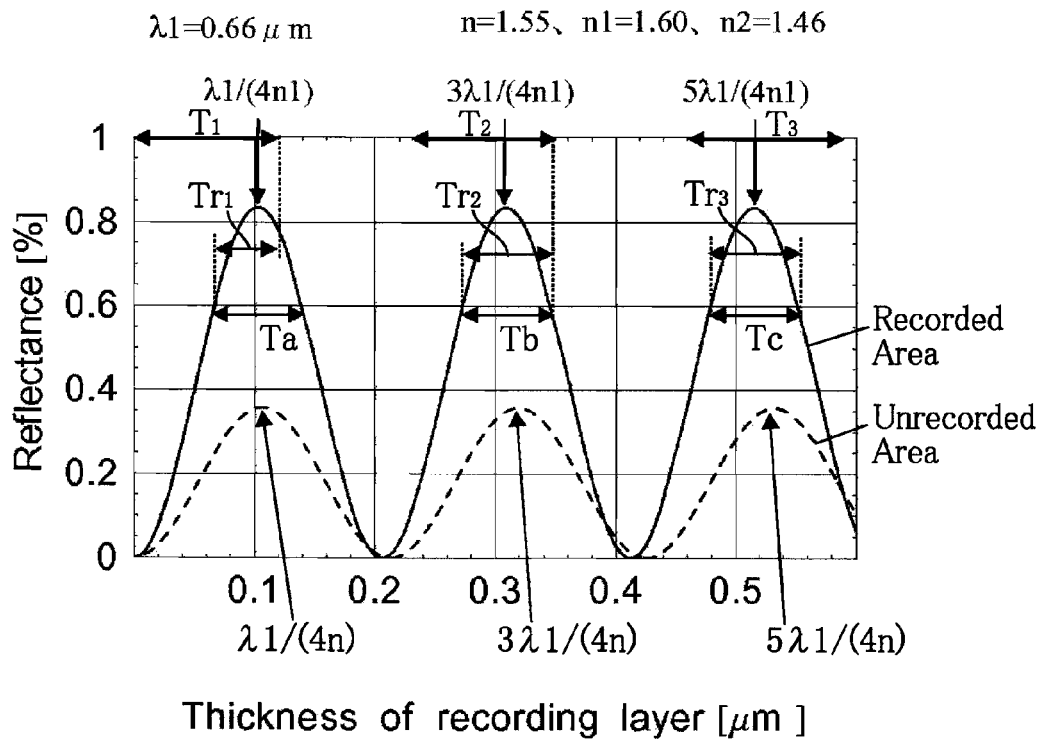
Figure 5B:
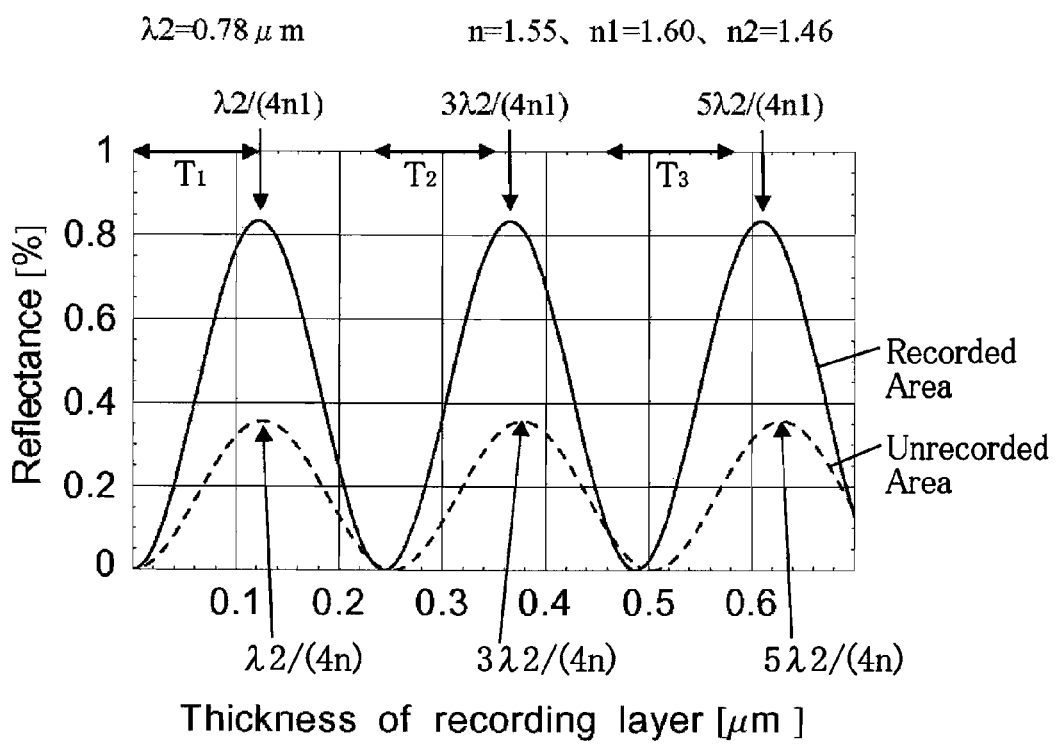
FIG. 5B is a chart showing the relationship between the thickness of the recording layer of the information-recording medium of FIG. 3A and the reflectances of the recording light in the recorded and unrecorded regions of the recording layer.
Figure 6A:
FIG. 6 is a drawing illustrating the process of producing the information-recording medium in the embodiment 1 of the present invention.
Figure 6B:
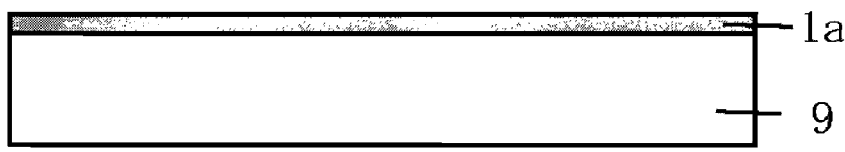
Figure 6C:
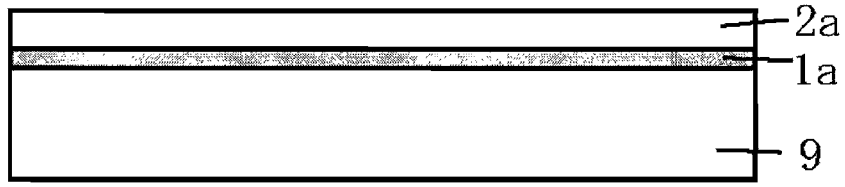
Figure 6D:
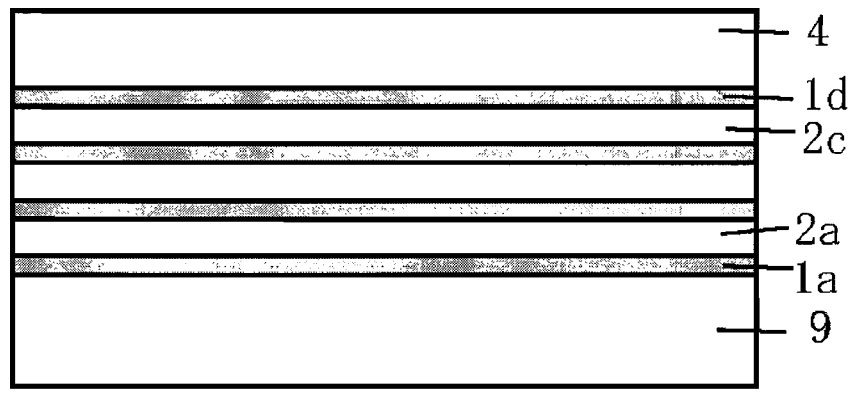
Figure 7:
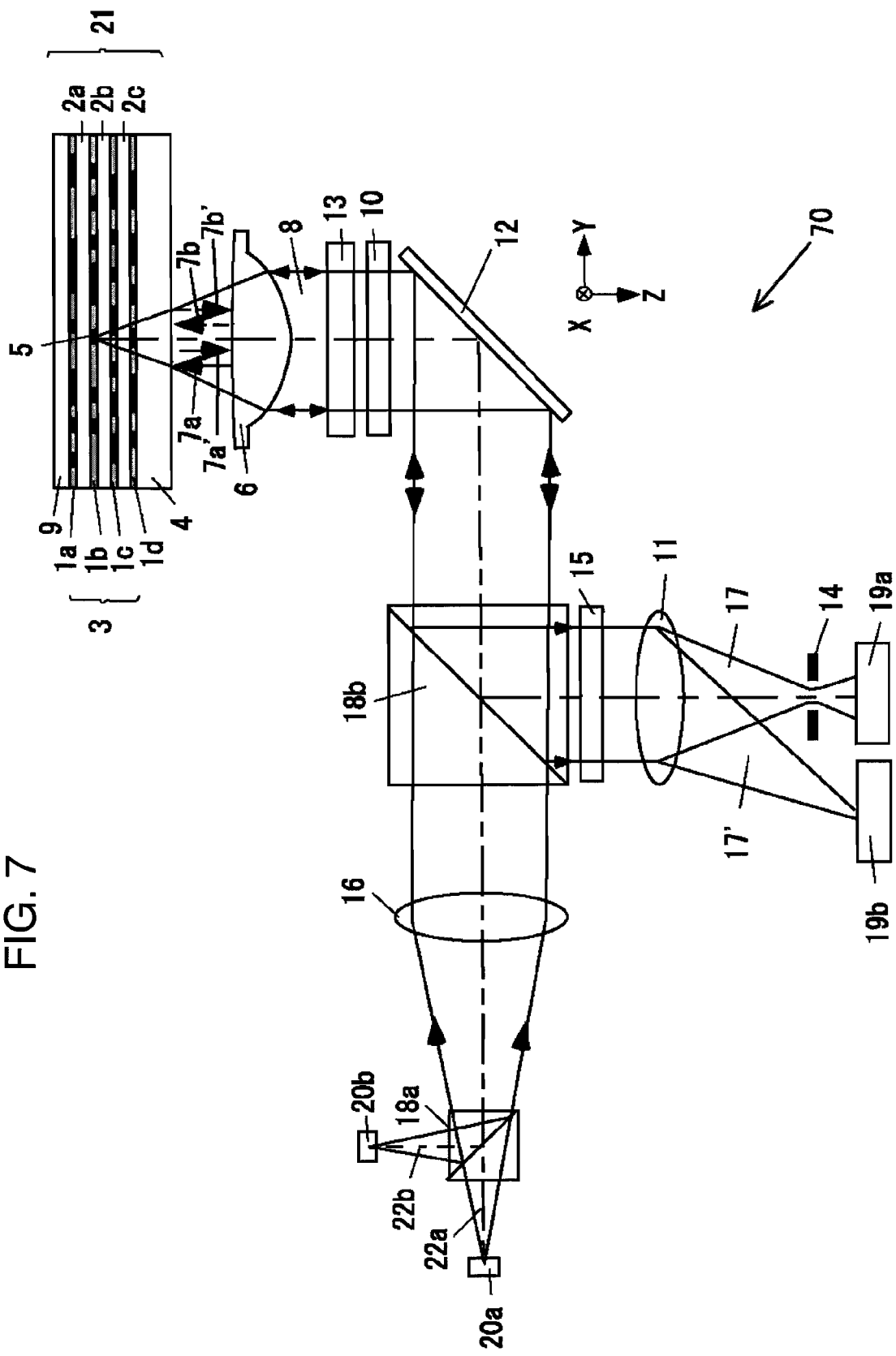
FIG. 7 is a drawing illustrating the configuration of the optical information-recording/reproducing device in the embodiment 1 of the present invention and the method of recording/reproducing a signal on the information-recording medium.

The preferable thickness of the recording layer 1 in the present embodiment information-recording medium 21 will be described in detail with reference to FIGS. 2 to 5. FIGS. 2A and 2B show an example of the relationship between the thickness of recording layer in the information-recording medium in the embodiment 1 of the present invention and the reflectances of the recording and reproducing lights in the unrecorded region of the recording layer. FIG. 3A and FIG. 3B show another example of the relationship between the thickness of recording layer in the information-recording medium in the embodiment 1 of the present invention and the reflectances of the recording and reproducing lights in the unrecorded region of the recording layer. FIG. 4A shows the relationship between the thickness of the recording layer of the information-recording medium of FIG. 2A and the reflectances of the reproducing light in the recorded and unrecorded regions of the recording layer, while FIG. 4B shows the relationship between the thickness of the recording layer of the information-recording medium of FIG. 2A and the reflectances of the recording light in the recorded and unrecorded regions of the recording layer. FIG. 5A shows the relationship between the thickness of the recording layer of the information-recording medium of FIG. 3A and the reflectances of the reproducing light in the recorded and unrecorded regions of the recording layer, while FIG. 5B shows the relationship between the thickness of the recording layer of the information-recording medium of FIG. 3A and the reflectances of the recording light in the recorded and unrecorded regions of the recording layer. Alternatively, FIG. 6 shows the process of producing the information-recording medium in the embodiment 1 of the present invention. FIG. 7 shows the configuration of the optical information-recording/reproducing device in the embodiment 1 of the present invention and the method of recording/reproducing the recording pit on the information-recording medium. In each Figure, $\lambda 1$ represents a reproducing-light wavelength; $\lambda 2$ represents a recording-light wavelength; n represents the refractive index of the unrecorded region 24 of recording layer 1; n1 represents the refractive index of the recorded region 23 of the recording layer; and n2 represents the refractive index of intermediate layer 2.

For example when a diarylethene compound, cis-1,2-Dicyano-1,2-bis(2,4,5-trimethyl-3-thienyl)ethene, is used as the photochromic material for the recording layer 1 in the present embodiment, the open-ring derivative forms the unrecorded region 24, while the closed-ring derivative, the recorded region 23. In such a recording layer 1, for example, the refractive indices n and n1 are 1.55 and 1.60 respectively. When an ultraviolet-curing resin is used for the intermediate layer 2, for example when an intermediate layer 2 of a ultraviolet-curing resin having an n2 of 1.64 is used (although the refractive index n2 may vary according to its kind), an information-recording medium having an n2 greater than n1 (n<n1<n2), i.e., an information-recording medium having an H→L characteristic, is obtained. In the information-recording medium, the relationship between the thickness of the recording layer and the reflectances of the lights at wavelengths of $\lambda 1$ (0.66 μm) and $\lambda 2$ (0.78 μm) in the unrecorded region 24 of recording layer 1 were found to show a sinusoidal periodic change, as shown respectively by dotted and solid lines in FIGS. 2A and 2B. In the variation in reflectance, the maximum reproducing-light reflectance $r1_{max}$ was 0.32%; the maximum recording-light reflectance $r2_{max}$, 0.32%; the minimum reproducing-light reflectance $r1_{min}$, 0%; and minimum recording-light reflectance $r2_{min}$, 0%. As shown in FIG. 2A, the thickness of the recording layer 1 when the reflectance of the light at a wavelength of $\lambda 1$ in the unrecorded region 24 is the maximum value is represented by $p\lambda 1/(4n)$ by using a positive odd number p, and the thickness of the recording layer 1 when the reflectance of the light at a wavelength of $\lambda 2$ is the maximum value, by $p\lambda 2/(4n)$. The variation of the reflectance indicated by a dotted line of $\lambda 1$ changing in the sinusoidal shape against the thickness of the recording layer t is represented by the formula: $R1(t)=r1_{max}[1-\cos(4n\pi t/\lambda 1)]/2$, and the variation of the reflectance indicated by a solid line of $\lambda 2$ changing in the sinusoidal shape is represented by the formula: $R2(t)=r2_{max}[1-\cos(4n\pi t/\lambda 2)]/2$. As in the present embodiment, the influence of the difference in refractive index between $\lambda 1$ and $\lambda 2$ caused by wavelength dispersion on the reflectance is small in most cases (for example, the refractive indices are the same as each other at an effective digit of 2 to 3), and thus, in an information-recording medium having such refractive indices, the Formula above may be simplified, by assuming that $r1_{max}$ at $\lambda 1$ is the same as $r2_{max}$ at $\lambda 2$.

As shown in FIG. 2B, if the range of the layer thickness t satisfy the condition represented by the following Formula (1) concern about between the variation in reflectance $R1(t)$ of $\lambda 1$ in the unrecorded region against the thickness of the recording layer indicated by the dotted line and the variation in reflectance $R2(t)$ of $\lambda 2$ in the unrecorded region against the thickness of the recording layer indicated by the solid line, when the reproducing-light wavelength and the recording-light wavelength in the present embodiment are used, the reflectance of $\lambda 2$ in the unrecorded region becomes smaller than the reflectance of $\lambda 1$ in the unrecorded region:

$$r1_{max}[1-\cos(4n\pi t/\lambda 1)]/2 > r2_{max}[1-\cos(4n\pi t/\lambda 2)]/2 \qquad (1)$$

In the Formula above, $\lambda 1$ represents the reproducing-light wavelength; $\lambda 2$ represents the recording-light wavelength; n represents the refractive index of the unrecorded region in the recording layer; t represents the thickness of the recording layer; $r1_{max}$ represents the maximum reflectance of $\lambda 1$ in the unrecorded region of the recording layer; and $r2_{max}$ represents the maximum reflectance of $\lambda 2$ in the unrecorded region of the recording layer.

Specifically, when the thicknesses at the intersection of $R1(t)$ and $R2(t)$ are designated, in the order from 0 to larger, as $t_0, t_1, t_2, t_3, \ldots, t_i, \ldots$ (i is an integer of 0 or more; $0 \leq t_i < t_{i+1}$; and ... represents repetition), $t_0$ is 0 μm; $t_1$ is 0.12 μm; $t_2$ is 0.23 μm; $t_3$ is 0.35 μm; $t_4$ is 0.46 μm; $t_5$ is 0.58 μm; $t_6$ is 0.69 μm; $t_7$ is 0.81 μm; .... Thus, the ranges of layer thickness wherein the $R1(t)$ indicated by a dotted line becomes larger than the $R2(t)$ indicated by a solid line are the ranges indicated by the arrow in the horizontal direction: $T_1, T_2, T_3, \ldots,$ in FIG. 2B. The ranges represented by $t_i$ satisfy the following condition: $t_0 < T_1 < t_1; t_2 < T_2 < t_3; t_4 < T_3 < t_5; \ldots$. Thus, the range of the recording-layer thickness is $T_{i+1}$ satisfying the following Formula (2):

$$t_{2i} < T_{i+1} < t_{2i+1} \qquad (2)$$

However, i is an integer of 0 or more; and $0 \leq t_i < T_{i+1}$.

The thickness at the intersection $t_i$ can be calculated mathematically by solving the equation: $R1(t)=R2(t)$, namely $r1_{max}[1-\cos(4n\pi t/\lambda 1)]/2 = r2_{max}[1-\cos(4n\pi t/\lambda 2)]/2$ in Formula (1). As described above when the difference in refractive indices by wavelength dispersion between $\lambda 1$ and $\lambda 2$ is small, $r1_{max}$ may be regarded as the same as $r2_{max}$, and thus, the Formula (1) above is simplified to: $\cos(4n\pi t/\lambda 1)=\cos(4n\pi t/\lambda 2)$.

Hereinafter, the reflectance characteristics of an L→H information-recording medium using the reflected light in the recorded region as a light for focus servo control will be described. For example, when an intermediate layer 2 of a UV-curing resin having a refractive index n2 of 1.46 is used, an information-recording medium wherein n2 is smaller than n (n2≦n≦n1), thus an information-recording medium having an L→H characteristic is obtained. In the information-recording medium, the relationship between the thickness of the recording layer and the reflectance of the lights at λ1 (0.66 μm) and λ2 (0.78 μm) in the unrecorded region 24 of each recording layer 1 was found to show a sinusoidal periodic change, as indicated by the dotted and solid lines respectively in FIGS. 3A and 3B. In the variation of reflectance, the maximum reproducing-light reflectance $r1_{max}$ is 0.36%; the maximum recording-light reflectance $r2_{max}$ is 0.36%; the minimum reproducing-light reflectance $r1_{min}$ is 0%; and the minimum recording-light reflectance $r2_{min}$ is 0%. As apparent from FIG. 3, the variation of reflectance of an information-recording medium having an L→H characteristic is the same in the frequency of reflectance and the thickness of the recording layer showing the maximum and minimum values as the variation of reflectance of the information-recording medium having an H→L character shown above in FIG. 2, except that $r1_{max}$ and $r2_{max}$ are different. Thus, the layer thickness $t_i$ at the intersection of two reflectance variation lines (i is an integer of 0 or more) shown in FIG. 3B is the same as that shown in FIG. 2. As a result, the favorable range of the thickness of the recording layer $T_{i+1}$ where the reflectance of the λ1 light is lower than the reflectance of the λ2 light (i is an integer of 0 or more) are also the same, and thus, $t_0$=0 μm<$T_1$<$t_1$=0.12 μm; $t_2$=0.23 μm<$T_2$<$t_3$=0.35 μm; $t_4$=0.46 μm<$T_3$<$t_5$=0.58 μm, . . . . The results above show that, if the refractive index of unrecorded region in the recording layer n, the reproducing-light wavelength λ1, and the recording-light wavelength λ2 are the same in an information-recording medium having either an H→L or L→H characteristic, the favorable thickness of the recording layer 1 is the same. In particular, the thickness which is in the range of $T_2$ ($t_2$ to $t_3$) or $T_3$ ($t_4$ to $t_5$), namely i is 1 or 2 in Formula (2), is preferable, because its leads to expansion of the difference in reflectance between the producing and reflection rights.

Hereinafter, the process of recording a recording pit 5 and reproducing it on the recording layer 1 will be described. In an information-recording medium having an H→L (n<n1<n2) characteristic, for example, when the reflectances n, n1, and n2 are respectively 1.55, 1.60, and 1.64, it was found that the reflectances of the λ1 light in the unrecorded region 24 and recorded region 23 showed a sinusoidal periodic change as shown respectively by the dotted and solid lines in FIG. 4A. In the information-recording medium having an H→L, character, the maximum reflectance in the unrecorded region 24, $r1_{max}$, is 0.32%, but the maximum reflectance of recording pit 5 in the recorded region 23, $r1_{max}$, is lower at 0.06% (the minimum is 0%). As shown in FIG. 4A, the thickness of the recording layer 1 showing the maximum reflectance of the λ1 light in the unrecorded region 24 is represented by pλ1/(4n) by using a given positive odd number p, and the thickness of the recording layer showing the maximum reflectance of the λ1 light in the recorded region 23 is represented by pλ1/(4n1). Thus, an increase in the thickness of recording layer 1 leads to an increase of the difference between the maximum reflectances in respective regions.

As described above, the reflection light 7b' of the reproduction light 7b' reflected in the recorded region 23 employs a reproducing signal light on the recording pit 5. Thus during reproduction, the difference between the intensity of the reflection light of the λ1 light reflected in the unrecorded region 24 and the intensity of the reflection light of the λ1 light reflected in the recorded region 23 is preferably larger, because it leads to an increase of the modulation rate of the reproduced signal. Accordingly, when the intensity of the reflection light of the reproduction light reflected in the recorded region 23 is small and constant, the intensity of the reflection light reflected in the unrecorded region 24 is preferably higher. Previous studies showed that, if a reflectance of 0.7 times or more of the maximum reflectance of the reproducing-light, $r1_{max}$, reflected in the unrecorded region 24 is obtained, it is possible to obtain a favorable reproduction signal without modification of the configuration of the IC for photodetector detection circuit used in conventional optical information-recording/reproducing devices.

The favorable thicknesses of the recording layer showing a reflectance of 0.7 times or more of the maximum reflectance of the reproducing-light, $r1_{max}$, are, in ascending order, the ranges of Ta, Tb, Tc, . . . , ( . . . represents repetition) indicated by the arrow in the horizontal direction arrow in FIG. 4A. The thickness of the recording layer t is in the range satisfying the following Formula (3):

$$(p-0.369)\lambda1/(4n) \leq t \leq (p+0.369)\lambda1/(4n) \quad (3)$$

In the Formula, λ1 represents the reproducing-light wavelength; λ2 represents the recording-light wavelength; t represents the thickness of the recording layer; n represents the refractive index of the unrecorded region; and p is a given positive odd number.

For example, the typical thickness of the recording layer is:

0.07 μm≦Ta≦0.15 μm;

0.28 μm≦Tb≦0.36 μm; 0.49 μm≦Tc≦0.57 μm; 0.71 μm≦Td≦50.78 μm; . . . .

For that reason in the case of an information-recording medium having an H→L (n<n1<n2) characteristic, more favorable range of the thickness of each recording layer 1 is the range where the favorable reproduction signal intensity (0.7 times or more of maximum reflectance $r1_{max}$) is preserved and the reflectance of the λ2 light in the unrecorded region 24 is smaller than the reflectance of the λ1 light. Thus, a range of layer thickness satisfying a range represented by $T_1, T_2, T_3, \ldots$, and a range represented by Ta, Tb, Tc, . . . , at the same time is desirable. Specifically, the more favorable thickness satisfying the requirements at the same time in the ranges of layer thickness are $Tr_1, Tr_2, Tr_3, Tr_4, \ldots$, as indicated by the arrow in the horizontal direction in FIG. 4A: for example, 0.07 μm≦$Tr_1$<0.12 μm; 0.28 μm≦$Tr_2$<0.35 μm; 0.49 μm≦$Tr_3$<0.57 μm; 0.71 μm<$Tr_4$<0.78 μm; . . . , ( . . . represents repetition). Needless to say, the more favorable range of layer thickness varies according to the combination of wavelength and refractive index.

As shown in FIG. 4B, the reflectance of the λ2 light in the unrecorded region 24 or in the recorded region 23 is also expressed by a sinusoidal periodic function, similarly to the reflectance to the λ1 light (the maximum and minimum reflectances thereof are the same as those of the reproducing light), and shows the H→L characteristic of its reflectance decreasing after recording. The thickness of the recording layer 1 showing the maximum reflectance of the λ2 light in the unrecorded region 24 is represented by pλ2/(4n) by using a given positive odd number p, and the thickness of the recording layer 1 showing the maximum reflectance of the λ2 light in the recorded region 23, by pλ2/(4n1). Thus, increase in the thickness of recording layer 1 leads to increase of the difference between the maximum reflectances in respective regions.

Then, it was found that, in an information-recording medium having an L→H (n1>n>n2) characteristic, for example when the refractive indices n, n1 and n2 are respectively 1.55, 1.60, and 1.46, the reflectances of the λ1 light in the unrecorded region 24 and in the recorded region 23 show a sinusoidal periodic change as indicated respectively by dotted and solid lines in FIG. 5A. The information-recording medium showing an L→H characteristic has a maximum reflectance in the unrecorded region 24 in the recording layer, $r1_{max}$, of 0.36%, but the maximum reflectance of recording pit 5 in the recorded region 23, $r1^{max}$, increases to 0.83% (the minimum is 0%). As shown in FIG. 5A, the thickness of the recording layer 1 showing the maximum reflectance of the λ1 light in the unrecorded region 24 is represented by pλ1/(4n) by using a given positive odd number p, and the thickness of the recording layer 1 showing the maximum reflectance in the recorded region 23, by pλ1/(4n1). Thus, increase in the thickness of recording layer 1 leads to increase of the difference between them.

Similarly to the information-recording medium having an H→L character, the difference between the reflection light intensity to the λ1 light in the unrecorded region 24 and the reflection light intensity to the λ1 light in the recorded region 23 in the information-recording medium having an L→H characteristic during reproduction is preferably larger for increase of the modulation rate of the reproduction signal. Thus when the reflection light intensity to the λ1 light in the unrecorded region 24 is kept small, the reflection light intensity to the λ1 light in the recorded region 23 is preferably larger. As described above, when the reflectance is 0.7 times or more of the maximum reflectance, it is possible to obtain a favorable reproduction signal without modification of the configuration of the IC in detection circuit. The favorable thickness of the recording layer giving a reflectance of 0.7 times or more of the maximum reproducing-light reflectance $r1_{max}$ is in the ranges, in ascending order, of Ta, Tb, Tc, ..., ( ... represents repetition) indicated by the arrow in the horizontal direction in FIG. 5A. The thickness of the recording layer t satisfies the following Formula (4).

$$(p-0.369)\lambda 1/(4n1) \leq t \leq (p+0.369)\lambda 1/(4n1) \quad (4)$$

In the Formula, λ1 represents the reproducing-light wavelength; λ2 represents the recording-light wavelength; t represents the thickness of the recording layer; n1 represents the refractive index of the recorded region in the recording-layer; and p is a given positive odd number.

For example, the typical thickness of the recording layer is:

0.07 µm≦Ta≦0.14 µm;

0.27 µm≦Tb≦0.35 µm; 0.48 µm≦Tc≦0.55 µm; 0.68 µm≦Td≦0.76 µm; ....

For that reason, in the case of the information-recording medium having an L→H (n1>n>n2) characteristic, the more favorable range of the thickness of each recording layer 1 is a range in which the favorable reproduction signal intensity (0.7 times or more of maximum reflectance $r1_{max}$) is preserved and the reflectance of the λ2 light in the unrecorded region 24 is smaller than the reflectance of the λ1 light. Thus, ranges of layer thickness satisfying a range represented by $T_1$, $T_2$, $T_3$, ..., and a range represented by Ta, Tb, Tc, ... at the same time are preferable. Specifically, more preferable ranges of layer thickness satisfying the ranges of the two layer thicknesses simultaneously are for example, from the smallest, layer thicknesses $Tr_1$, $Tr_2$, $Tr_3$, $Tr_4$, ..., as shown in FIG. 5A, respectively represented by 0.07 µm≦$Tr_1$<0.12 µm, 0.27 µm≦$Tr_2$<0.35 µm, 0.48 µm≦$Tr_3$≦0.55 µm, 0.68 µm≦$Tr_4$≦0.76 µm, ..., ( ... represents repetition). Needless to say, the more favorable range of layer thickness varies according to the combination of wavelength and refractive index.

Among the ranges Tr above, the thickness of the recording layer is preferably thinner, for example at 0.6 µm or less, from the point of productivity, either in the information-recording medium having an H→L or L→H characteristic. Thus, the range of the thickness of the recording layer 1 is preferably determined to close to $Tr_1$, $Tr_2$, or $Tr_3$, shown in the results above and in FIGS. 4A and 5A.

As shown in FIG. 5B, the reflectance of the λ2 light in the unrecorded region 24 or in the recorded region 23 is also expressed by a sinusoidal periodic function (the maximum and minimum reflectances are the same as those to the reproducing-light wavelength) similarly to the reflectance to λ1, and shows an L→H characteristic in which the reflectance increases after recording. The thickness of the recording layer 1 showing the maximum reflectance of the λ2 light in the unrecorded region 24 is represented by pλ2/(4n) by using a given positive odd number p, and the thickness of the recording layer 1 showing the maximum reflectance of the λ2 light in the recorded region 23, by pλ2/(4n1). Thus, increase in the thickness of recording layer 1 leads to increase of the difference between the maximum reflectances in respective regions.

When the reproducing-light wavelength λ1 satisfies the relationship: 0.6 µm≦λ1≦0.7 µm, and the recording-light wavelength λ2 satisfies the relationship: 0.73 µm≦λ2≦0.83 µm, as in the case of the recording and reproducing lights in the present embodiment, the reflectance of the λ2 light in the unrecorded region 24 indicated by a solid line becomes significantly smaller than the reflectance of the λ1 light in the unrecorded region 24 indicated by a dotted line, independently of whether the information-recording medium has an H→L or L→H characteristics; and in particular when $T_2$ ($t_2$ to $t_3$) and $T_3$ ($t_4$ to $t_5$), i.e., i in Formula (2), are in the range of 1 to 2, as shown in FIGS. 2 and 3 (λ1: 0.66 µm, λ2: 0.78 µm). For example when the thickness of the recording layer 1 is set to 3λ1/(4n)=0.32 µm in the range of the thickness of $T_2$ (the layer thickness is within the more favorable thickness $Tr_2$ of recording layer 1 described above), the reflectance of the λ1 light in the unrecorded region 24 of an H→L information-recording medium is 0.32%, and that of an L→H information-recording medium 0.36%. In contrast, the reflectance of the λ2 light in the unrecorded region 24 of an H→L information-recording medium having the same recording layer thickness is 0.18%, and that of an L→H information-recording medium, 0.20%. Thus in any case, it is possible to obtain an information-recording medium showing a reflectance of the λ2 light in the unrecorded region 24 distinctively smaller than the reflectance of the λ1 light in the unrecorded region 24.

Thus according to the present invention, for example, in the case of an information-recording medium 21 having a 30-layer recording layer 1, the light intensity of the reproducing light 7b in the unrecorded region 24 of the bottom recording layer 1a most separated from the object lens 6 of the information-recording medium having an H→L character is $(1-0.0032)^{29}$=0.91, and that of an information-recording medium having an L→H characteristic, $(1-0.0036)^{29}$=0.90, and thus, both light intensities decrease by approximately 10% in respective information-recording media. On the other hand, the light intensity 7a of the recording light in the unrecorded region 24 of the bottom recording layer 1a of the information-recording medium having an H→L character is $(1-0.0018)^{29}$=0.95, and that of an information-recording medium having an L→H characteristic $(1-0.0020)^{29}$=0.94, showing that the decrease in light intensity of the recording light is 5 to 6%. It is thus possible to reduce the decrease in recording light intensity almost to half of the decrease in the light intensity of reproducing light. Thus, an increase in the number of layers in the recording layer 1 leads to an increase of the advantageous effects of the present invention.

When a recording pit is formed in a nonlinear absorption phenomenon, the recording sensitivity changes exponentially with the variation of light intensity (for example, the recording sensitivity during two-photon absorption recording is proportional to the square of the light intensity), causing a problem of decrease in light intensity especially during recording (for example, a decrease of the recording light intensity to 0.9 times results in a decrease of recording sensitivity to the square thereof, 0.81 times, during two-photon-absorption recording). However, because the decrease in recording light intensity is reduced in the present invention, it is possible to assure supply of a reflected light for focus servo control and to record and reproduce a recording pit three-dimensionally on an information-recording medium having a multilayered recording layer.

When the thickness of the recording layer 1 is determined in the range of $T_3$, for example set to $5\lambda 1/(4n)=0.53$ μm (the layer thickness is within the more favorable range of the thickness $Tr_3$ of recording layer 1 described above), the reflectance of the $\lambda 1$ light in the unrecorded region 24 of the H→L information-recording medium is 0.32%, and that of the L→H information-recording medium, 0.36%. In contrast, the reflectance of the $\lambda 2$ light in the unrecorded region 24 of an H→L information-recording medium having the same recording layer thickness is 0.04%, and that of the L→H information-recording medium is 0.05%. Thus, the reflectance thereof to the recording light is further smaller than that of a recording layer having a thickness of 0.32 μm. As described above, the intensity of recording light is far higher than the intensity of the reproducing light (for example, about 10 times). On the other hand, the reflectance needed for sufficient focus servo control by the reproducing light is approximately 0.1%. Accordingly, the reflectance of the $\lambda 2$ light in the unrecorded region 24 is favorably at least approximately 0.01%. In the present embodiment, in the range of $T_3$, the reflectance of the $\lambda 2$ light in the unrecorded region 24 in the thickness of the recording layer providing the maximum reflectance of the $\lambda 1$ light may be made smaller than the reflectance in the range $T_1$ or $T_2$. Thus, the layer thickness range $T_3$ is particularly favorable for an information-recording medium having a greater number of layers in the recording layer 1. For example in the case of an information-recording medium having a recording layer 1 containing 50 layers, the light intensity of the reproducing light 7b in the unrecorded region 24 in the bottom recording layer 1a most separated from the object lens 6 of an H→L information-recording medium is $(1-0.0032)^{49}=0.85$, and that of the L→H information-recording medium, $(1-0.0036)^{49}=0.84$, and the decrease in the light intensity of reproducing light is 15 to 16%. In contrast, the light intensity of the recording light 7a in the unrecorded region 24 of the H→L information-recording medium is $(1-0.004)^{49}=0.98$, and that of the L→H information-recording medium $(1-0.005)^{49}=0.98$, and thus, it is possible to reduce the decrease in recording light intensity to 2% even in the 50-layer recording layer. It is thus possible to reduce the decrease in recording light intensity significantly to a degree of about ⅛ of the decrease in the light intensity of reproducing light. Thus, it is possible to assure supply of a reflected light for focus servo control and also to record and reproduce accurately favorably, by forming a recording layer having a thickness in the range of $T_3$.

Hereinafter, the configuration of the information-recording medium according to the invention will be described. A recording pit 5 is formed in a nonlinear absorption phenomenon such as two-photon, multiple-photon, or plasma absorption process on the information-recording medium 21 in the present embodiment. Accordingly, it is possible to record and reproduce three-dimensionally recording pits efficiently because of suppressing the loss of any light intensity at $\lambda 2$ or $\lambda 1$ on not only the intermediate layer 2 but also the recording layer 1 except the reflected light described above. It is thus possible to obtain high optical utilization efficiency, in a nonlinear absorption phenomenon by use an almost transparent recording layer 1. However during recording in the two-photon absorption process, for example, a recording layer having almost transparent property at the recording-light wavelength but absorption property at its half wavelength is used as the recording layer 1.

A pulsed laser at a wavelength $\lambda 2$ of 0.78 μm and a pulse width of 100 femtoseconds to 10 nanoseconds, for example, having a relatively high peak light intensity of several 100 mW to several W or more, is focused into a desirable recording layer 1d of the information-recording medium as a convergent recording light 7a by an object lens 6. The recording pit 5 is formed by a two-photon absorption process i.e., a nonlinear absorption phenomenon caused by the convergence of the recording light, as if the wavelength became half (0.39 μm) in the region only where the photon density is high (convergent point and the area surrounding it). In the present embodiment 1, the recording pit 5 is formed by alternation of the refractive index, one of many optical constants of the recording layer 1, but the optical constant may be replaced with any other property. However, use of the change in the refractive index of recording layer 1 is favorable for forming an information-recording medium having a recording part 3 of the multilayer structure, because the light loss is smaller than use of the change in absorption. In addition, it is possible to record on an information-recording medium having a recording part 3 of the multilayer structure, by using multiple-photon absorption such as three-photon absorption. For example, a recording material having almost transparent property to a light at the recording-light wavelength but absorption property to a light at its ⅓ wavelength is used in the three-photon absorption recording. When a recording pit is formed in a nonlinear absorption phenomenon, for example in two-photon absorption process, the recording pit 5 becomes smaller, compared to conventional recording (for example, the diameter of the recording pit 5 by two-photon absorption is 0.71 times of that recorded by one-photon absorption). Thus, when a reproducing-light wavelength shorter than the recording-light wavelength is used (reproducing-light wavelength is an approximately 0.7 times of the recording-light wavelength in two-photon absorption), the spot diameters during recording and reproduction become effectively closer to each other, allowing optimization of recording and reproduction or increase in-density.

In the present embodiment 1, each recording layer 1 has a track guide groove (not shown in FIG. 1). The track pitch Tp is, for example, 0.59 μm, and the groove depth is, for example, 0.49 μm. Detection of ±1st-order diffracted light from the groove by a photodetector (not shown in Figure) gives a tracking-error signal, and thus, a pit is recorded and reproduced accurately along the track.

Examples of the resins contained in the substrate 9 for use include polycarbonate, PMMA, norbornene resins (such as "Atron" (manufactured by JSR Corporation)), cycloolefin resins (such as "Zeonex" (manufactured by Zeon Corporation)), and the like.

The recording layer 1 is formed, for example, by mixing a photochromic material diarylethene or the derivative thereof and additionally an almost transparent resin as needed in an amount of approximately 10 to 50 wt % with respect to the total amount, as the recording material. Use of a photochromic material allows write-once recording in the photon mode and rewritable recording allowing erasing. In particular, diarylethenes or the derivatives thereof are favorable, because they permit more thermally stable recording.

There are many known diarylethene derivatives, and typical examples thereof include 1,2-bis[2-methylbenzo[b]thiophen-3-yl]-3,3,4,4,5,5-hexafluoro-1-cyclopentene, 2,3-bis(2,4,5-trimethyl-3-thienyl)maleic Anhydride, 2,3-bis (2,4,5-trimethyl-3-thienyl)maleimide, cis-1,2-Dicyano-1,2-bis(2,4,5-trimethyl-3-thienyl)ethene, and the like, but the present invention is not restricted by these examples, if it is a material having a diarylethene skeletal structure.

Blending of diarylethene or a derivative thereof, for example, with an almost transparent resin such as PMMA (polymethyl methacrylate) or an ultraviolet-curing resin is effective in preventing recrystallization of the diarylethene. However, the transparent resin is not particularly needed, if there is no recrystallization, and 100% pure diarylethene or the derivative thereof may be used.

The recording layer according to the present invention may contain additionally, for example, a fluorescent material emitting a light at high efficiency having a wavelength sensitizing the photochromic material in the two-photon absorption process. Presence of such a fluorescent material in recording layer is effective in improving the sensitivity of the recording material. Photochromic materials have generally lower recording sensitivity in the two-photon absorption process, but some fluorescent materials are higher in the recording sensitivity in the two-photon absorption process. Thus, the photochromic material generally superior in one-photon absorption sensitivity is sensitized in the one-photon absorption process by the two-photon fluorescence.

Typical examples of such fluorescent materials include inorganic fluorescent materials such as europium-activated strontium magnesium pyrophosphate $[(Sr,Mg)_2P_2O_7:Eu]$; organic fluorescent colorants such as para-terphenyl(p-Terphenyl); and the like.

Other favorable recording materials for use in the recording layer according to the present invention include materials allowing recording in the photon mode such as branched-chain type liquid crystalline polymers and photopolymers. A recording layer of such a branched-chain type liquid crystalline polymer, which shows a greater change in the refractive index of recording pit (for example, $\Delta n=0.2$) after recording and allows recording its polarization direction, characteristically allows expansion of its recording capacity of almost twice larger than that of normal recording. Photopolymers are also favorable, because they are materials suitable for write-once recording and stable after recording.

An organic colorant, resin films containing ultrafine particles such as ZnO, $TeO_2$ film, or the like are also favorable as the recording materials for use in the recording layer other than those above. Use of the change in refractive index of the recording material is preferable, because it leads to decrease of light absorption loss. In the present invention, the amount of change in refractive index may be controlled by an irradiation method of the recording light. Alternatively, a high pulse light at a relatively high power of several W to several dozens kW may be used as the recording light for forming a vacant pit called void. When the pit is a void, the refractive index is 1, and thus, if the refractive index of the recording layer is, for example 1.7, the change in refractive index change $\Delta n$ is −0.7, giving a larger absolute value. Thus, it is possible to reproduce a signal superior in contrast. Although a phase-change material which is recorded by using light absorption is not suitable for an information-recording medium containing a number of layers, but can be used as a recording material for the recording layer of a multilayer optical disk with about 2 to 6 layers.

A resin the same as or different from the resin for the recording layer 1 is used as the intermediate layer 2 formed between the recording layers 1, for obtaining a particular reflectance at the interface with the recording layer 1. Examples of the resins include transparent resins such as ultraviolet (UV)-curing resins, thermosetting resins, PMMA, norbornene resins, and cycloolefin resins.

In the present embodiment, recording pits 5 are formed in the recording layer 1 sequentially, three-dimensionally in the order, for the convergent light 7a from the object lens 6 not to pass through the recording pit previously recorded. By recording of the recording pits 5 in that order, for example, in the target layer 1d it is effective (to improvement in signal-to-noise ratio) to reduce the undesirable stray light (noise light) such as scattered light or undesirable diffracted light cause by transmission through the recording layer 1e above the target layer 1d and previously-recorded recording pit 5 of the layer 1f. Specifically when recording pits 5 are recorded sequentially from the position most separated from the object lens 6 (in FIG. 1, recording layer 1a) in the recording layer 1, other recording pits 5 are recorded without transmission through previously-recorded recording pit. In the configuration of FIG. 1, the pits are favorably recorded three-dimensionally in the Z-axis direction, for example, in rows 1a, 1b, to 1c in turn.

Any one of known production processes may be used in producing the information-recording medium 21 in the present embodiment. Specifically as shown in FIG. 6, a recording layer 1a is formed on a substrate 9 by coating such as spin coating (FIG. 6B), and an intermediate layer 2a is formed thereon for example by coating (FIG. 6C). Further on the intermediate layer 2a, a recording layer 1b, an intermediate layer 2b, a recording layer 1c, . . . are formed repeatedly similarly. Finally, a protective layer 4 is formed, for example by coating or film forming, on the incident-light side (FIG. 6D). Formation of the recording layers 1 and intermediate layers 2 by coating method allows easier production of the information recording medium and reduction of the cost thereof.

In the present embodiment, the intermediate layers 2 and the recording layers 1 may be formed in excess. Some of the intermediate layers 2 and the recording layers 1 formed in excess (some of recording part on the incident-light side) may be used as a protective layer 4. The configuration of the recording part demand no formation of the protective layer 4 additionally in a separate process, and the protective layer substantially the same in composition to the recording part 3 is formed.

Hereinafter, an optical information-recording/reproducing device recording and/or reproducing a pit on the information-recording medium in the present embodiment will be described. As shown in FIG. 7, an optical information-recording/reproducing device 70 in the present embodiment has 2 kinds of light sources emitting lights different in wavelength: a recording-light source 20a and a reproducing-light source 20b. There are a beam splitter 18a, a collimator lens 16, a beam splitter 18b, a mirror 12, a wave plate 10, a spherical aberration compensation element 13, and an object lens 6 installed in the optical paths from the light sources 20a and 20b to the information-recording medium 21.

There are a focus/track error signal-detecting optical element 15, a detection lens 11, and a pinhole 14 suppressing interlayer crosstalk in the information-recording medium 21 installed in the optical return path from the beam splitter 18b to a photodetector 19.

The recording-light source 20a is a semiconductor pulsed laser light source emitting a recording light at a pulse width, for example of 100 femtoseconds to 10 nanosecond and a wavelength λ2 of 0.78 μm. The reproducing-light source 20b is a semiconductor laser light source emitting a light at a wavelength λ1, for example, of 0.66 μm. It is possible to increase the recording density further in nonlinear recording such as two-photon absorption recording, multiple-photon absorption recording or plasma absorption recording, by using a reproducing-light source emitting a light having a wavelength shorter than that of the recording-light source 20a. A light source having the two light sources arrayed may be used instead.

As shown in FIG. 7, a wave plate 10 common to the recording and reproducing lights is placed on the optical path from the object lens 6 to the light sources 20. The wave plate 10 is designed to be substantially a λ/4 plate or the like to the recording light 22a and to be substantially a λ/2 plate, A plate or the like to the reproducing light 22b, by using the difference between the wavelengths. The beam splitter 18a allows transmission of the recording light 22a and reflects the reproducing light 22b by using the difference between the wavelengths, while the beam splitter 18b is designed to function as a polarized beam splitter to the recording light 22a and to be a half mirror independent of the polarization direction to the reproducing light 22b by using the difference between the wavelengths.

As shown FIG. 7, in the optical information-recording/reproducing device 70 in the present embodiment, a recording light 22a of linearly-polarize pulsed laser having a relatively high peak power emitted from the recording-light source 20a in the Y-axis direction, passes first through the beam splitter 18a during recording. The recording light 22a is collimated by a collimator lens 16 into almost parallel light, which passes through a beam-branching element beam splitter 18b, and the optical path is bend in the −Z axis direction by the mirror 12. The recording light 22a bent into the −Z axis direction (laser beam 8) is converted into a substantially circularly polarized light by the wave plate 10, passes through the spherical aberration compensation element 13, passes through the protective layer 4 of information-recording medium 21 having the configuration described above by an object lens 6, for example, having a numerical aperture NA of 0.85 and a focal length of 2 mm, and focuses in a desirable recording layer 1b of the recording part 3 (convergent light 7a). A row of recording pits 5 is recorded on the recording layer 1 by using a nonlinear phenomenon such as two- or multiple-photon absorption process, while focus servo control and track servo control are performed by using the reflected light 7a'. Because an information-recording medium having a reflectance at the recording-light wavelength in the unrecorded region smaller than the reflectance at the reproducing-light wavelength in the unrecorded region is used in the present embodiment, a reduction of the recording power is suppressed also in the bottom layer of the recording layer, and the recording pit 5 is recorded accurately (recording layer 1a in FIG. 7).

Since the thickness of the recording part 3, through which the convergent light 7a passes, varies according to the recording depth, a suitable recording pit 5 is formed accurately by performing recording while the spherical aberration is controlled according to the recording depth of the information pit 5 recorded in the recording part 3 by the spherical aberration compensation element 13 placed on the optical path from the light source 20 to the object lens 6. For example, a liquid crystal element having a variable refractive index distribution or a beam expander in combination of a concave lens and a convex lens with the gap in the optical-axis direction between them variable with an actuator is used as the spherical aberration compensation element 13.

During reproduction, the reproducing light 22b, a linearly polarized laser beam emitted from the reproducing-light source 20b, is bent by the beam splitter 18a into the Y-axis direction, converted to an almost parallel beam similarly by the collimator lens, and transmitted through the beam splitter 18b; and the optical path is bent by the mirror 12 into the −Z axis direction. The reproducing light 22b bent into the −Z axis direction (laser beam 8) passes through the wave plate 10 and the spherical aberration compensation element 13, converges in the recording pit 5 of the recording layer 1 in the recording part 3 of information-recording medium 21 as linearly polarized light by the object lens 6 (convergent light 7b). The laser beam 7b' reflected by the recording pit 5 is bent to the reverse direction, passes through the object lens 6, the spherical aberration compensation element 13, the wave plate 10, and the mirror 12 in that order, is bent by the beam splitter 18b into an optical axis in the Z axis direction, and branched into multiple beams by the diffraction focus/track error signal-detective optical element 15, giving convergent detection lights 17 and 17' by the detection lens 11. The signal-reproducing light, convergent detection light 17, passes through a pinhole 14, and the signal is detected by the photodetector 19a. The other convergent detection light 17', branched focus/track error signal, does not pass through a pinhole and is detected by another photodetector 19b. The convergent detection light 17', i.e., focus/track error signal, not passing through the pinhole, are detected by a conventional method such as astimatism method, SSD method (spot size detection method), or three-beam-tracking method. Thus, the recording pit is recorded and reproduced by using the change in the optical constant of the recording layer while performing focus servo control and track servo control by using the reflected lights 7a' and 7b'.

The focal length of the detection lens 11 is, for example, 33 mm, and the airy disk diameter in the photodetector 19 side is for example 9.6 μm. The pinhole 14 is formed almost at the position of the focal point of the convergent detection light 17; when the pinhole 14 is formed, the crosstalk lights (interlayer crosstalk), undesirable reflected lights irradiated by convergent light 7 of the object lens 6 from other recording pits in the recording layers 1a, 1c, and 1d over and below the desirable recording layer 1b in the optical-axis direction, distributes in the direction outside the pinhole 14. The lights do not pass through the pinhole 14, leading to decrease of the interlayer crosstalk. It is also possible to have a similar effect by detecting the convergent detection light 17 with a photodetector 19a having a photodetector light-receiving unit having a size of pinhole, instead of using the pinhole 14.

In the present embodiment, when the diameter of the pinhole 14 is 5 times or less greater than the airy disk diameter of the convergent detection light 17 of signal-reproducing light, it was possible to improve the quality of reproduction signal to the level without problem (interlayer crosstalk amount≦30 dB), for example, even when the interval of the recording layer 1 Δd is 5 to 8 μm. However, although it is possible to make the interval of the recording layer 1 (thickness of intermediate layer 2) smaller by changing the diameter of pinhole 14 to smaller, excessive reduction in the thickness leads to decrease of the light intensity entering into the pinhole 14 and deviation of the convergent detection light 17 from the center of pinhole 14 due to the distortion of the optical system by environment temperature. In addition, it is possible to raise the signal intensity by using an APD (avalanche photodiode), even when the light intensity declines. Thus, use of an APD is effective, when the light intensity declines because of restriction on the material in a three-dimensional multilayer record reproduction device as in the present invention.

The focus servo control may be conducted in the optical information-recording/reproducing device in the embodiment above by emitting a recording light 22$a$ as well as a reproducing light 22$b$ during recording and using the reproducing light 7$b$. Thus, it is possible to record a recording pit 5 by focusing the convergent light 7$a$ into a desirable recording layer 1$b$, by performing focus servo control by emitting a reproducing light, focusing the convergent light 7$b$ into a desirable recording layer 1$b$, and using the reflected light 7$b$' during recording. As described above, when the thickness of the recording layer is in the range showing low reflectance at the recording-light wavelength, it is possible to reduce the decrease in recording light power also in the bottom recording layer, but becomes more difficult to perform focus servo control by using the recording light. Thus, it is possible to assure supply of a reflected light for focus servo and record a recording pit 5 more accurately in the bottom recording layer 1$a$, by performing focus servo control by using the reproducing light during recording. In particular when a nonlinear absorption phenomenon, for example a two-photon absorption process, is used, the recording sensitivity is proportional to the square of the light intensity. Thus if the focus servo control is performed with the reproducing light, it is advantageously possible to reduce decrease of the recording light by the focus servo control. Such an information-recording medium 21 for use in an optical information-recording/reproducing device under focus servo control with the reproducing light during recording preferably has a thickness of the recording layer giving a smaller reflectance of the $\lambda 2$ light in the unrecorded region, for example, of 0.01% or less (i.e., thickness making the focus servo more difficult only with the recording light). Considering the variation of the reflectance of the $\lambda 2$ light in the unrecorded region, the thickness of the recording layer is preferably in the range satisfying the following Formula (5):

$$(q-0.104)\lambda 2/(4n) \leq t \leq (q+0.104)\lambda 2/(4n) \quad (5)$$

In the Formula, $\lambda 2$ represents the recording-light wavelength; n represents the refractive index of the unrecorded region; and q represents a given positive even number.

For example, when the reproducing-light wavelength $\lambda 1$ used in the present embodiment is in the range of 0.6 $\mu m \leq \lambda 1 \leq 0.7$ $\mu m$ and the recording-light wavelength $\lambda 2$ in the range of 0.73 $\mu m \leq \lambda 2 \leq 0.83$ $\mu m$, q=4, i.e., a layer thickness t in the range satisfying the following Formula (6), is selected.

$$3.90 \times \lambda 2/(4n) \leq t \leq 4.10\lambda 2/(4n) \quad (6)$$

In the case of a recording layer having the refractive index n described above, the range of the thickness of the recording layer satisfying Formula (6) is 0.49 $\mu m \leq t \leq 0.52$ $\mu m$, either in an information-recording medium having an H→L or L→H characteristic. The range of the layer thickness t is included in the more preferable range of layer thickness $Tr_3$ shown in FIGS. 4A and 5A above where the reflectance of the $\lambda 1$ light in the unrecorded region is assured and favorable reproduction signal intensity (0.7 times or more of the maximum reflectance $r1_{max}$) is assured. Thus because the decrease in recording light intensity is prevented even when focus servo control is performed with the reproducing light during recording, it is possible to form a recording pit accurately in the lower recording layer without adjustment of the peak power of light source. The focus servo control is then performed with the reproducing light during reproduction, because the reflectance of reproducing light is made larger than the reflectance of recording light. When the light intensity is not sufficient in the lower recording layer during reproduction, because the reproducing-light source is lower in power than the recording-light source and thus, the light intensity is easily raised by adjustment, it is possible to control the insufficiency of light intensity by raising the light intensity as needed in the depth direction to obtain a desirable reflection light intensity in the target recording layer farther separated from the object lens. As will be apparent from comparison of FIGS. 4 and 5, the information-recording medium having an H→L character which has a reflectance after recording lower than that of the information-recording medium having an L→H characteristic is favorably in terms of providing a larger difference in reflectance between before and after recording and consequently a larger modulation rate.

Embodiment 2

Hereinafter, the information-recording medium in the second embodiment of the present invention will be described. The embodiment 2 is the same as the embodiment 1 in that a reproducing-light wavelength $\lambda 1$ shorter than the recording-light wavelength $\lambda 2$ is used, but different in that a recording light having a recording-light wavelength of 0.6 $\mu m \leq \lambda 2 \leq 0.7$ $\mu m$ and a reproducing light having a reproducing-light wavelength of 0.35 $\mu m \leq \lambda 1 \leq 0.45$ $\mu m$ are used. Examples of the light sources having such wavelengths include the combination of a semiconductor laser of $\lambda 1$=0.405 $\mu m$ and a semiconductor laser of $\lambda 2$=0.66 $\mu m$.

FIGS. 8 to 11 are charts explaining the information-recording medium in the embodiment 2 of the invention. FIGS. 8A and 8B are charts explaining an example of the relationship between the thickness of the recording layer in the information-recording medium in the embodiment 2 of the invention and the reflectances of the recording and reproducing lights in the unrecorded regions of the recording layer. FIGS. 9A and 9B are charts explaining another example of the relationship between the thickness of the recording layer in the information-recording medium in the embodiment 2 of the invention and the reflectances of the recording and reproducing lights in the unrecorded regions of the recording layer. FIG. 10A is a chart showing the relationship between the thickness of the recording layer in the information-recording medium shown in FIG. 8A and the reflectances of the recording light in the recorded and unrecorded regions of the recording layer, and FIG. 10B is a chart showing the relationship between the thickness of the recording layer in the information-recording medium shown in FIG. 8A and the reflectances of the recording light in the recorded and unrecorded regions of the recording layer. FIG. 11A is a chart showing the relationship between the thickness of the recording layer in the information-recording medium shown in FIG. 9A and the reflectances of the reproducing light in the recorded and unrecorded regions of the recording layer, while FIG. 11B is a chart showing the relationship between the thickness of the recording layer in the information-recording medium shown in FIG. 9A and the reflectances of the recording light in the recorded and unrecorded regions of recording layer.

Figure 8A:
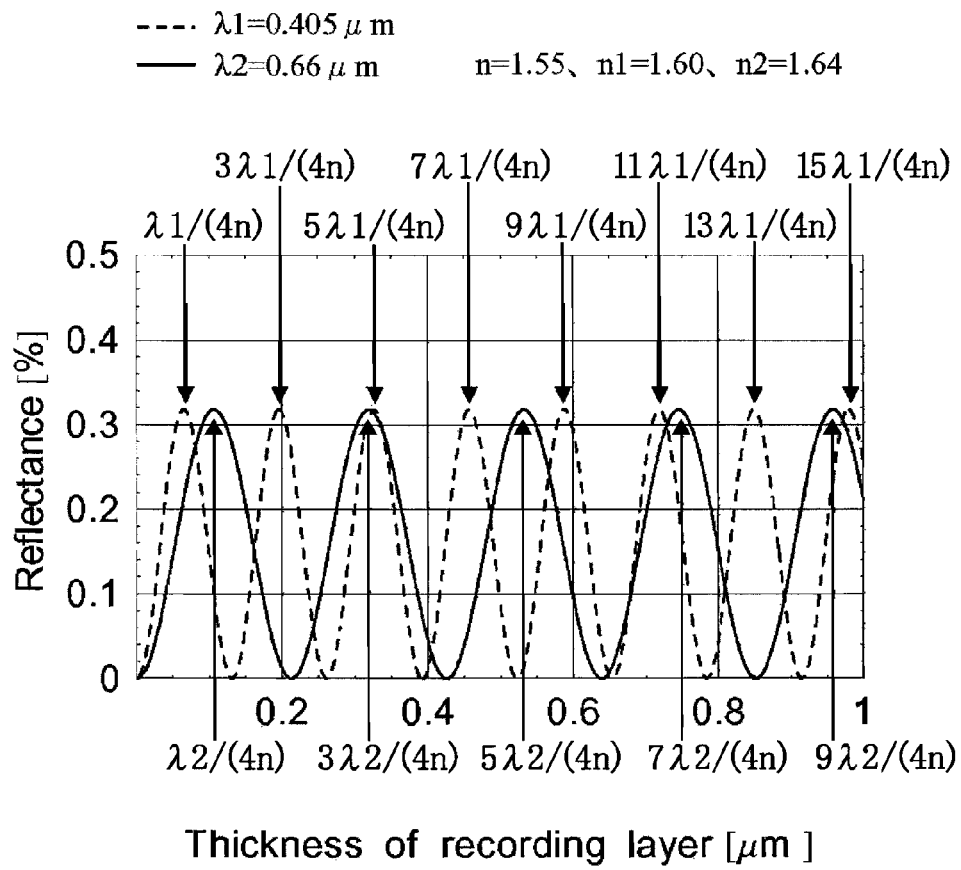

First, similarly to the information-recording medium in embodiment 1, for example, if refractive indices in an information-recording medium having an H→L (n<n1<n2) characteristic are as follows: n=1.55, n1=1.60, and n2=1.64, the relationship between the thickness of the recording layer and the reflectance of the λ1 light (0.405 μm) or λ2 (0.66 μm) in the unrecorded region 24 was found to show a sinusoidal periodic change, as indicated by the dotted or solid line in FIGS. 8A and 8B. The variation in reflectance is represented by the following Formula as in embodiment 1: $R1(t)=r1_{max}[1-\cos(4n\pi t/\lambda 1)]/2$, and $R2(t)=r2_{max}[1-\cos(4n\pi t/\lambda 2)]/2$. As for the maximum reflectance, $r1_{max}=r2_{max}=0.32\%$, as for the minimum reflectance, $r1_{min}=r2_{min}=0\%$.

Figure 9A:
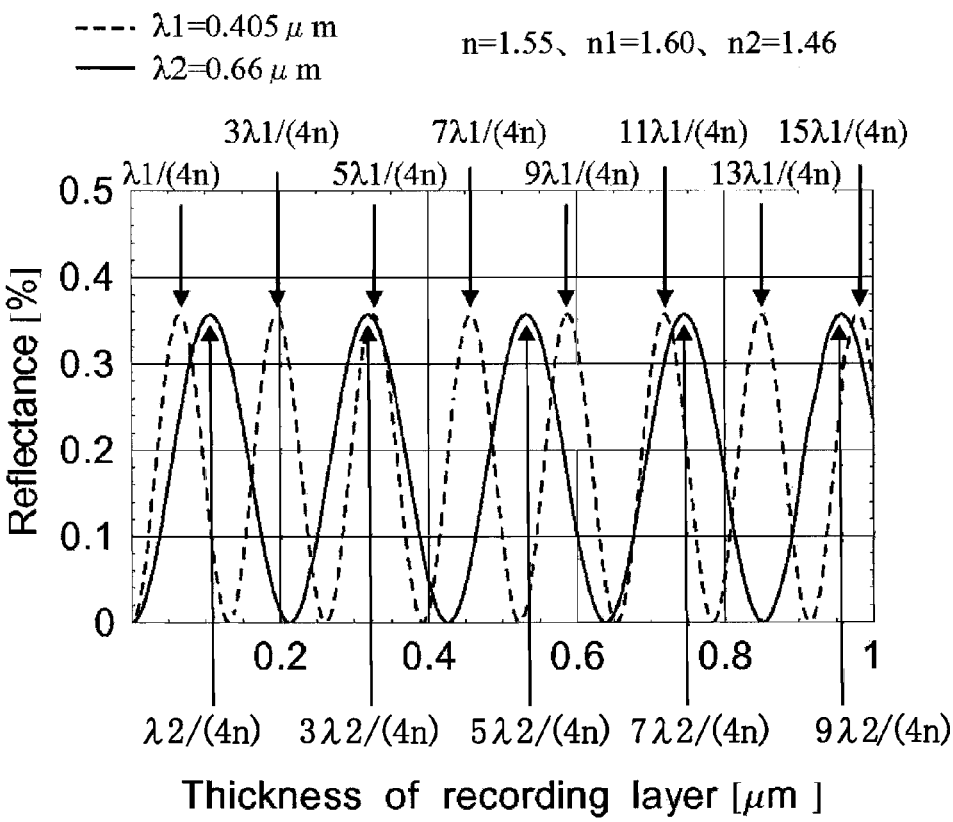

For example if the refractive indices are as follows: n=1.55, n1=1.60, and n2=1.46 in an information-recording medium having an L→H (n1>n>n2) characteristic, each reflectance was found to show a sinusoidal periodic change similarly to that in embodiment 1, as indicated by the dotted or solid line in FIGS. 9A and 9B. Therefore, the following Formulae are satisfied: $R1(t)=r1_{max}[1-\cos(4n\pi t/\lambda 1)]/2$, and $R2(t)=r2_{max}[1-\cos(4n\pi t/\lambda 2)]/2$. As for the maximum reflectance, $r1_{max}=r2_{max}=0.36\%$, and as for the minimum reflectance, $r1_{min}=r2_{min}=0\%$.

Figure 8B:
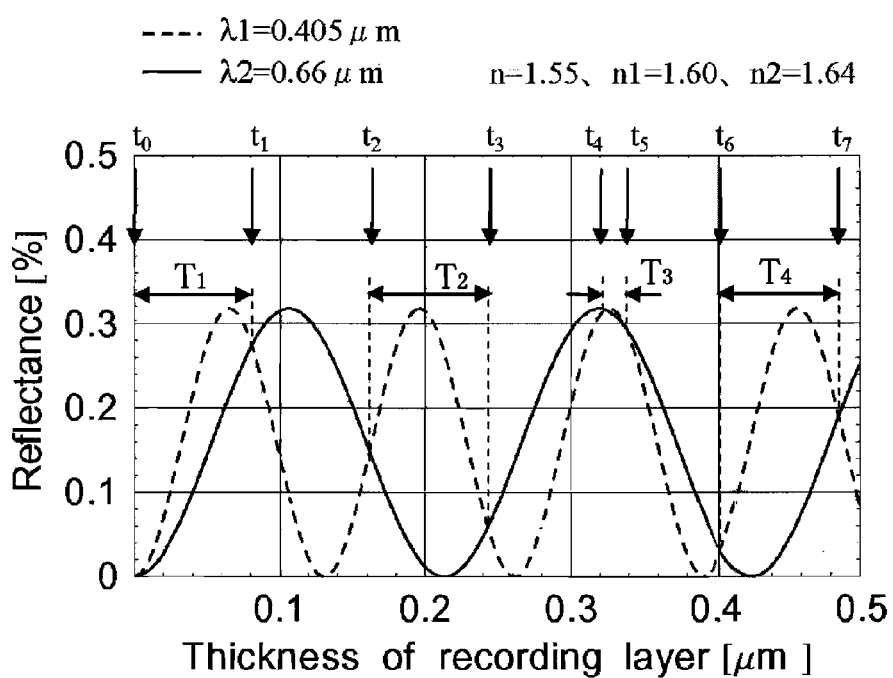
FIG. 8B is a chart showing the thickness ranges of the recording layer where the reflectance of recording light becomes lower than the reflectance of reproducing light in the unrecorded region of the recording layer in FIG. 8A.
Figure 9B:
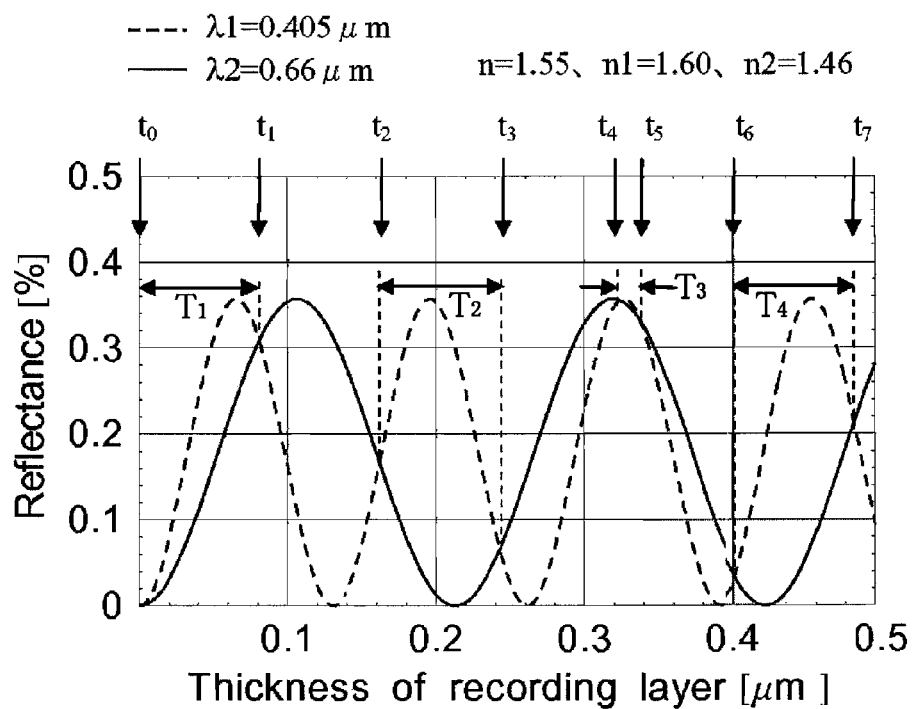
FIG. 9B is a chart showing the thickness ranges of the recording layer where the reflectance of recording light becomes lower than the reflectance of reproducing light in the unrecorded region of the recording layer in FIG. 9A.

Thus as shown in FIGS. 8B and 9B, if the layer thickness is in the range where the variation R1(t) in the reflectance of the λ1 light in the unrecorded region against the thickness of the recording layer indicated by the dotted line is larger than the variation R2(t) in the reflectance of the λ2 light in the unrecorded region against the thickness of the recording layer indicated by the solid line, when the reproducing-light wavelength and the recording-light wavelength in the present embodiment are used, the reflectance of the λ2 light in the unrecorded region becomes smaller than the reflectance of the λ1 light in the unrecorded region. Thus similarly to embodiment 1, if the thickness of the recording layer satisfies the Formula (1), it is possible to assure supply of a reflected light for focus servo control and also to record and reproduce favorably at high accuracy.

The layer thicknesses $t_i$ at the intersections of the two reflectance curves are the same as each other in both cases, and from the smallest, $t_0$ is 0 μm; $t_1$ is 0.08 μm; $t_2$ is 0.16 μm; $t_3$ is 0.24 μm; $t_4$ is 0.32 μm; $t_5$ is 0.34 μm; $t_6$ is 0.40 μm; $t_7$ is 0.48 μm; is 0.57 μm; $t_9$ is 0.67 μm, . . . . Thus, the ranges of the thickness of the recording layer where the reflectance curve of the λ1 light indicated by a dotted line becomes larger than the reflectance curve to the λ2 light indicated by a solid line are ranges of $T_1$, $T_2$, $T_3$, . . . , indicated by the arrow in the horizontal direction shown respectively in FIG. 8B and FIG. 9B. Similarly to the condition of Formula (2) in embodiment 1, the ranges shown by using $t_i$ are respectively as follows: $t_0<T_1<t_1$, $t_2<T_2<t_3$, $t_4<T_3<t_5$, $t_6<T_4<t_7$, . . . .

Figure 10A:
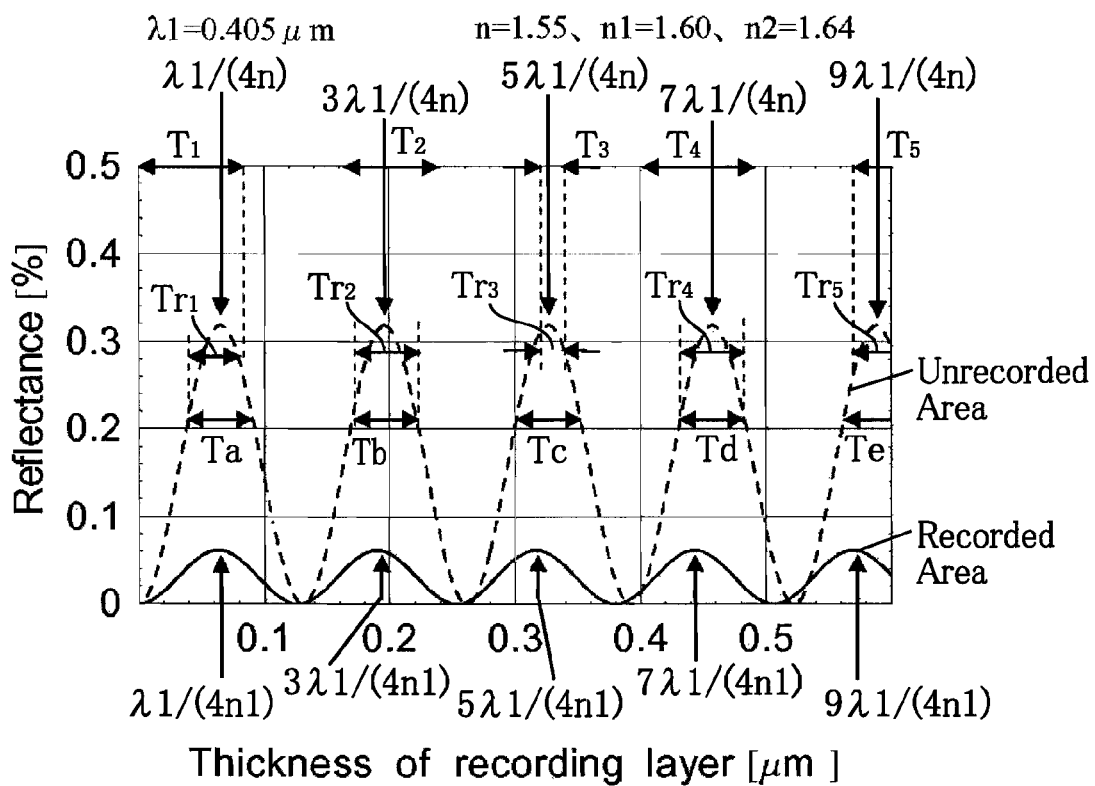
Figure 10B:
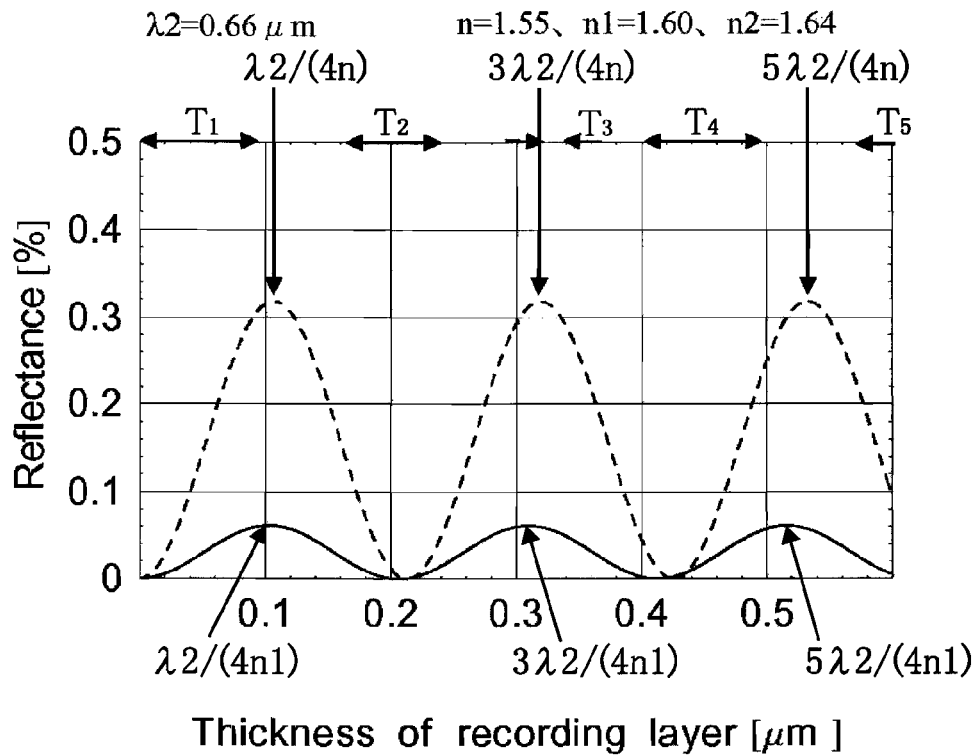
FIG. 10B is a chart showing the relationship between the thickness of the recording layer in the information-recording medium shown in FIG. 8A and the reflectances of the recording light in the recorded and unrecorded regions of the recording layer.

The process of recording and reproducing a recording pit 5 in the recording layer 1 is also explained similarly to embodiment 1. Thus, for example, if refractive indices in an information-recording medium having an H→L (n<n1<n2) characteristic are expressed as follows: n=1.55, n1=1.60, and n2=1.64, the reflectances of the λ1 light in the unrecorded region 24 and the recorded region 23 were shown to show a sinusoidal periodic change, as indicated respectively by the dotted and solid lines in FIG. 10A. Because the information-recording medium has an H→L character, the maximum reflectance in the unrecorded region 24, $r1_{max}$, is 0.32%, but the maximum reflectance in the recorded region 23, $r1_{max}$, i.e., of the recording pit 5, decreases to 0.06% (minimum reflectance: 0%). As shown in FIG. 10A, the thickness of the recording layer 1 where the reflectance of the λ1 light in the unrecorded region 24 shows the maximum value is represented by $p\lambda 1/(4n)$ by using a given positive odd number p, and the thickness of the recording layer where the reflectance of the λ1 light in the recorded region 23 shows the maximum value, by $p\lambda 1/(4n1)$.

Thus also in the present embodiment, similarly to embodiment 1, the favorable thickness of the recording layer that gives a reflectance of the reproducing light in the unrecorded region 24 of 0.7 times or more of the maximum reflectance is the range satisfying Formula (3):

$$(p-0.369)\lambda 1/(4n) \leq t \leq (p+0.369)\lambda 1/(4n) \quad (3)$$

Typical thicknesses of the recording layers are, for example, ranges indicated by the arrow in the horizontal direction in FIG. 10A, Ta, Tb, Tc, . . . , ( . . . represents repetition) satisfying the following requirements: 0.04 μm≦Ta≦0.09 μm, 0.17 μm≦Tb≦0.22 μm, 0.30 μm≦Tc≦0.35 μm, 0.43 μm≦Td≦0.48 μm, 0.56 μm≦Te≦0.61 μm, . . . .

For that reason in the information-recording medium having an H→L (n<n1<n2) characteristic of the present embodiment, more favorable ranges of the thickness of the recording layer 1 are, similarly to embodiment 1, ranges satisfying the ranges represented by $T_1$, $T_2$, $T_3$, . . . where the reflectance of the λ2 light in the unrecorded region 24 becomes lower than the reflectance of the λ1 light and the ranges represented by Ta, Tb, Tc, . . . where a favorable reproduction signal intensity (0.7 times or more of the maximum value) simultaneously. Specifically as indicated by the arrow in the horizontal direction arrow in FIG. 10A, the layer thicknesses satisfying the ranges of the two layer thicknesses simultaneously are, from the smallest, for example, $Tr_1$, $Tr_2$, $Tr_3$, $Tr_4$, $Tr_5$, . . . , respectively satisfying: 0.04 μm≦$Tr_1$<0.08 μm, 0.17 μm≦$Tr_2$≦0.22 μm, 0.32 μm<$Tr_3$<0.34 μm, 0.43 μm≦$Tr_4$<0.48 μm, 0.57 μm<$Tr_5$≦0.61 μm, . . . , ( . . . represents repetition).

Figure 11A:
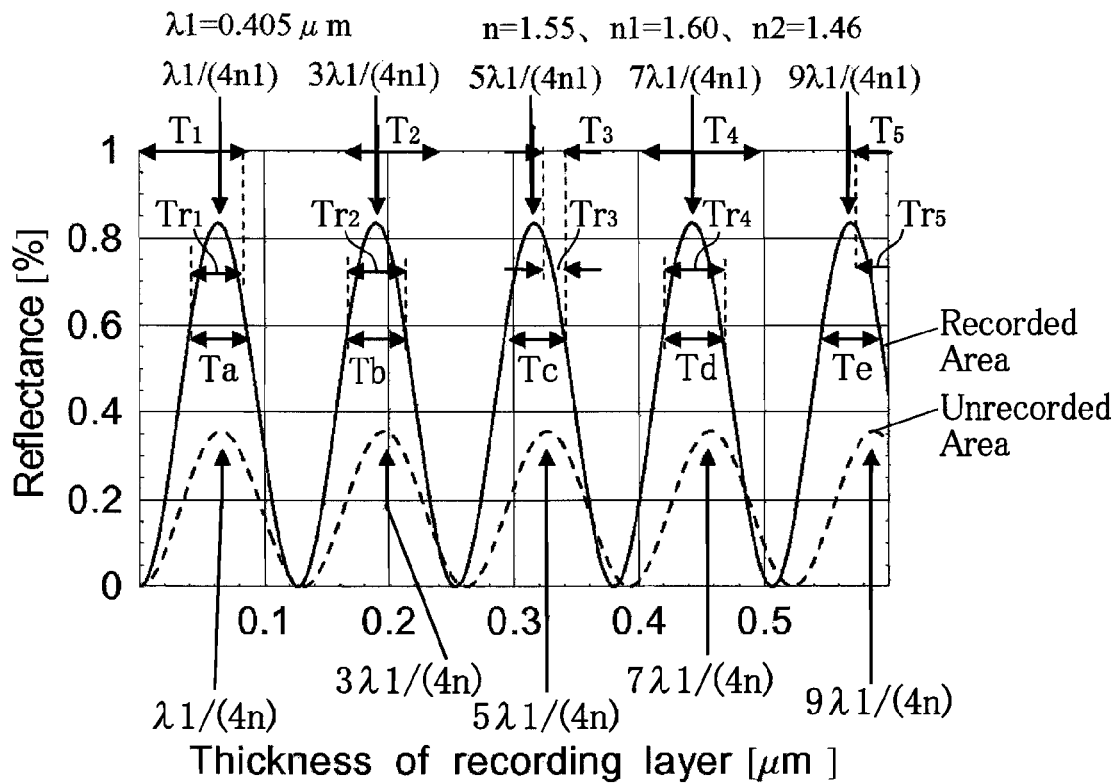
Figure 11B:
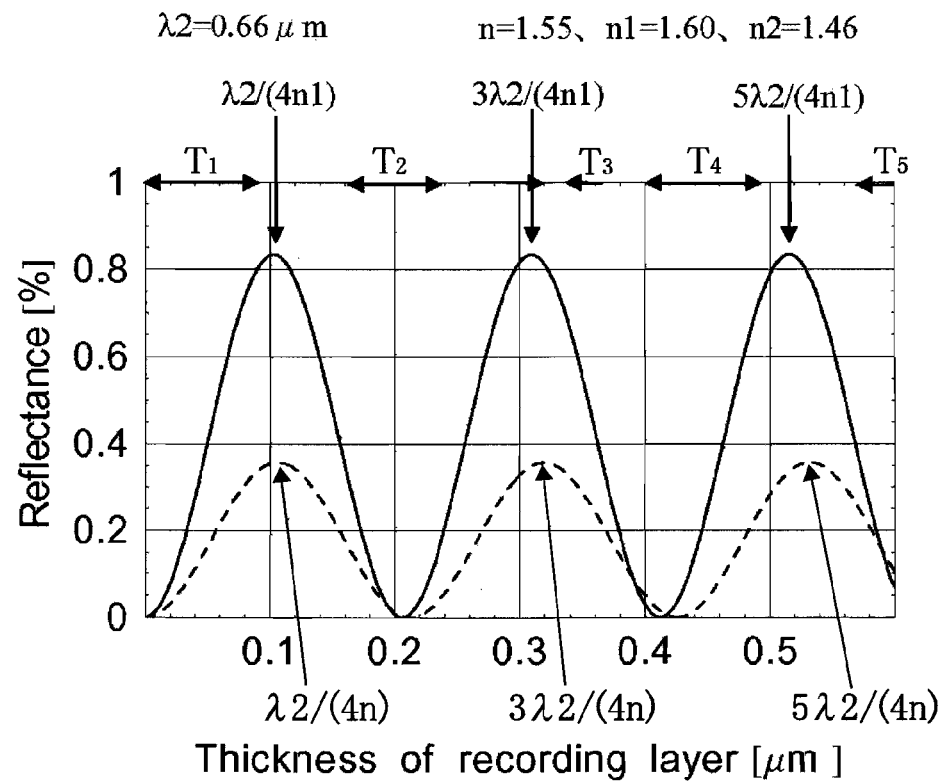
FIG. 11B is a chart showing the relationship between the thickness of the recording layer in the information-recording medium of FIG. 9A and the reflectances of the recording light in the recorded and unrecorded regions of the recording layer.

Then, for example, if refractive indices in an information-recording medium having an L→H (n1>n>n2) characteristic are expressed as follows: n=1.55, n1=1.60, and n2=1.46, the reflectances to λ1 in the unrecorded region 24 and in the recorded region 23 were found to show a sinusoidal periodic change, as shown respectively by the dotted and solid lines in FIG. 11A. Because the information-recording medium has an L→H character, the maximum reflectance in the unrecorded region 24, $r1_{max}$, is 0.36%, but the maximum reflectance in the recorded region 23, $r1_{max}$, i.e., of the recording pit 5, increases to 0.83% (minimum: 0%). As shown in FIG. 11A, the thickness of the recording layer 1 where the reflectance of the λ1 light in the unrecorded region 24 shows the maximum value is represented by $p\lambda 1/(4n)$ by using a given positive odd number p, and the thickness of the recording layer where the reflectance of the λ1 light in the recorded region 23 shows the maximum value, by $p\lambda 1/(4n1)$.

Thus also in the present embodiment, similarly to embodiment 1, the favorable thickness of the recording layer that gives a reflectance of reproducing light in the unrecorded region 23 of 0.7 times or more of the maximum reflectance is the range satisfying Formula (4):

$$(p-0.369)\lambda 1/(4n1) \leq t \leq (p+0.369)\lambda 1/(4n1) \quad (4)$$

Typical thicknesses of the recording layers are, for example, ranges Ta, Tb, Tc, . . . , ( . . . represents repetition), indicated by the arrow in the horizontal direction in FIG. 11A, respectively satisfying the following requirements: 0.04 μm≦Ta≦0.09 μm, 0.17 μm≦Tb≦0.21 μm, 0.29 μm≦Tc≦0.34 μm, 0.42 μm≦Td≦0.47 μm, 0.55 μm≦Te≦0.59 μm, . . . .

For that reason, in the information-recording medium having an L→H (n1>n>n2) characteristic, more favorable range of the thickness of each recording layer 1 is a range where the favorable reproduction signal intensity (0.7 times or more of maximum reflectance $r1_{max}$) is assured and the reflectance of the λ2 light in the unrecorded region 24 is smaller than the reflectance to the λ1 light. Accordingly, layer thicknesses simultaneously satisfying the ranges represented by $T_1$, $T_2$, $T_3$, . . . and the ranges represented by Ta, Tb, Tc . . . are preferable. Specifically as indicated by the arrow in the horizontal direction arrow in FIG. 11A, the layer thicknesses satisfying the ranges of the two layer thicknesses simultaneously are, from the smallest, for example, ranges $Tr_1$, $Tr_2$, $Tr_3$, $Tr_4$, $Tr_5$, . . . , respectively satisfying: 0.04 µm≦$Tr_1$<0.08 µm, 0.17 µm≦$Tr_2$≦0.21 µm, 0.32 µm≦$Tr_3$≦0.34 µm, 0.42 µm≦$Tr_4$<0.47 µm, 0.57 µm≦$Tr_5$≦0.59 µm, . . . , ( . . . represents repetition).

Needless to say, more favorable layer thickness varies according to the combination of wavelength and refractive index, even if it is in the range where the recording-light wavelength and the reproducing-light wavelength are in the ranges of the present embodiment.

Among the Tr ranges above, the thickness of the recording layer in the information-recording medium having both H→L, and L→H characteristics is preferably thinner to some extent, for example, at 0.6 µm or less, from the point of productivity. Thus, the range of the thickness of the recording layer 1 is preferably set to $Tr_1$, $Tr_2$, $Tr_3$, $Tr_4$, or $Tr_5$ as shown in FIGS. 10A and 11A, from the results above.

When the reproducing-light wavelength λ1 satisfies the formula: 0.35 µm≦λ1≦0.45 µm and the recording-light wavelength λ2 satisfies the formula: 0.6 µm≦λ2≦0.7 µm as of the recording light and the reproducing light in the present embodiment, it is possible to make the reflectance of the λ2 light in the unrecorded region 24 indicated by a solid line significantly smaller than the reflectance of the λ1 light in the unrecorded region 24 indicated by a dotted line, especially in ranges $T_2$ ($t_2$ to $t_3$) and $T_4$ ($t_6$ to $t_7$), i.e., when i in Formula (2) is in the range of 1 or 3, in the information-recording medium having H→L or L→H characteristics, as shown in FIGS. 8 and 9 (λ1: 0.405 µm, λ2: 0.66 µm). For example when the thickness of the recording layer 1 is set to 3λ1/(4n)=0.20 µm in the $T_2$ region (the layer thickness is included in the more preferable layer thickness $Tr_2$ of recording layer 1 described above), the reflectance of the λ1 light in the unrecorded region 24 of the H→L information-recording medium is 0.32% and that of the L→H information-recording medium is 0.36%. In contrast, the reflectances to the λ2 light in the unrecorded region 24 are both about 0.02%. Thus, in any case, it is possible to obtain an information-recording medium of which a reflectance of the λ2 light in the unrecorded region 24 is distinctively smaller than the reflectance of the λ1 light in the unrecorded region.

When the thickness of the recording layer 1 is set in the range $T_4$, for example to 7λ1/(4n)=0.46 µm (the layer thickness is included in the more preferable layer thickness range $Tr_4$ of recording layer 1), the reflectance of the λ1 light in the unrecorded region 24 of the H→L information-recording medium is 0.32% and that of the L→H information-recording medium is 0.36%. In contrast, the reflectance of the λ2 light in the unrecorded region 24 of the H→L, information-recording medium is 0.06%, and that of the L→H information-recording medium is 0.07%. Thus, obtained is an information-recording medium in which the decrease in the light intensity of recording light is suppressed significantly more than the decrease in reproducing light intensity. Needless to say, the more favorable range of layer thickness varies according to the combination of wavelength and refractive index.

The method of producing an information-recording medium and the optical information-recording/reproducing device in the present embodiment are similar to those described in the embodiment 1.

Also in the present embodiment, similarly to embodiment 1, it is possible to perform focus servo control by emitting both recording and reproducing lights, converging the reproducing light in a desirable recording layer, and using the reflected light during recording. Then, the layer thickness where the reflectance to the λ2 light is, for example, small at 0.01% or less is the range satisfying Formula (5), similarly to embodiment 1.

$$(q-0.104)\lambda 2/(4n) \leq t \leq (q+0.104)\lambda 2/(4n) \quad (5)$$

Accordingly when a recording light and a reproducing light respectively satisfying the conditions: 0.35 µm<λ1≦0.45 µm and 0.6 µm≦λ2≦0.7 µm, are used, for example, q=2, i.e., a recording layer having a thickness t in the range satisfying the following Formula (7) is preferable.

$$1.90\lambda 2/(4n) \leq t \leq 2.10\lambda 2/(4n) \quad (7)$$

For example in the case of the recording layer having a refractive index of n described above, the range of the thickness of recording layer satisfying the Formula (7) in the information-recording media having both H→L and L→H characteristics is as follows: 0.20 µm≦t≦0.22 µm. The range of layer thickness is included in the more preferable range of layer thickness $Tr_2$ described above shown in FIGS. 10A and 11A.

Alternatively, preferably in the present embodiment, q=4, i.e., a recording layer having the range of layer thickness t satisfying the following Formula (8) is preferable.

$$3.90\lambda 2/(4n) \leq t \leq 4.10\lambda 2/(4n) \quad (8)$$

In such a case, the range of layer thickness satisfying the Formula (8) at the refractive index of the recording layer is: 0.41 µm≦t≦0.44 µm. In the range of layer thickness, the ranges common to the more preferable range of layer thickness $Tr_3$ shown in FIG. 10A or 11A are 0.43 µm≦t≦0.44 µm in the H→L information-recording medium and 0.42 µm≦t≦0.44 µm in the L→H information-recording medium.

Embodiment 3

Hereinafter, the information-recording medium in the embodiment 3 of the present invention will be described. The embodiment 3 is the same as the embodiment 1 in that a reproducing-light wavelength λ1 shorter than the recording-light wavelength λ2 is used, but different from it in that a recording light and a reproducing light, of which the reproducing-light wavelength satisfies the formula: 0.48 µm≦λ1≦0.58 µm and the recording-light wavelength satisfies the formula: 0.6 µm≦λ2≦0.7 µm, are used. Examples of the light sources emitting lights having such wavelengths include the combination of a Nd:YAG-SHG laser at λ1=0.532 µm and a semiconductor laser at λ2=0.66 µm.

FIGS. 12 to 15 are charts explaining the information-recording medium in the present embodiment 3 in detail. FIGS. 12A and 12B are charts showing an example of the relationship between the thickness of the recording layer in the information-recording medium in the embodiment 3 of the present invention and the reflectances of the recording and reproducing lights in the unrecorded regions of the recording layer. FIG. 13A and FIG. 13B are charts showing other examples of the relationship between the thickness of the recording layer in the information-recording medium in the embodiment 3 of the present invention and the reflectances of the recording and reproducing lights in the unrecorded regions of the recording layer. FIG. 14A is a chart showing the relationship between the thickness of the recording layer in the information-recording medium shown in FIG. 12A and the reflectances of the reproducing light in the recorded and unrecorded regions of the recording layer, while FIG. 14B shows the relationship between the thickness of the recording layer in the information-recording medium shown in FIG. 12A and the reflectances of the recording light in the recorded and unrecorded regions of the recording layer. FIG. 15A is a chart showing the relationship between the thickness of the recording layer in the information-recording medium shown in FIG. 13A and the reflectances of the reproducing light in the recorded and unrecorded regions of the recording layer, while FIG. 15B is a chart showing the relationship between the thickness of the recording layer in the information-recording medium shown in FIG. 13A and the reflectances of the recording light in the recorded and unrecorded regions of the recording layer.

Figure 12A:
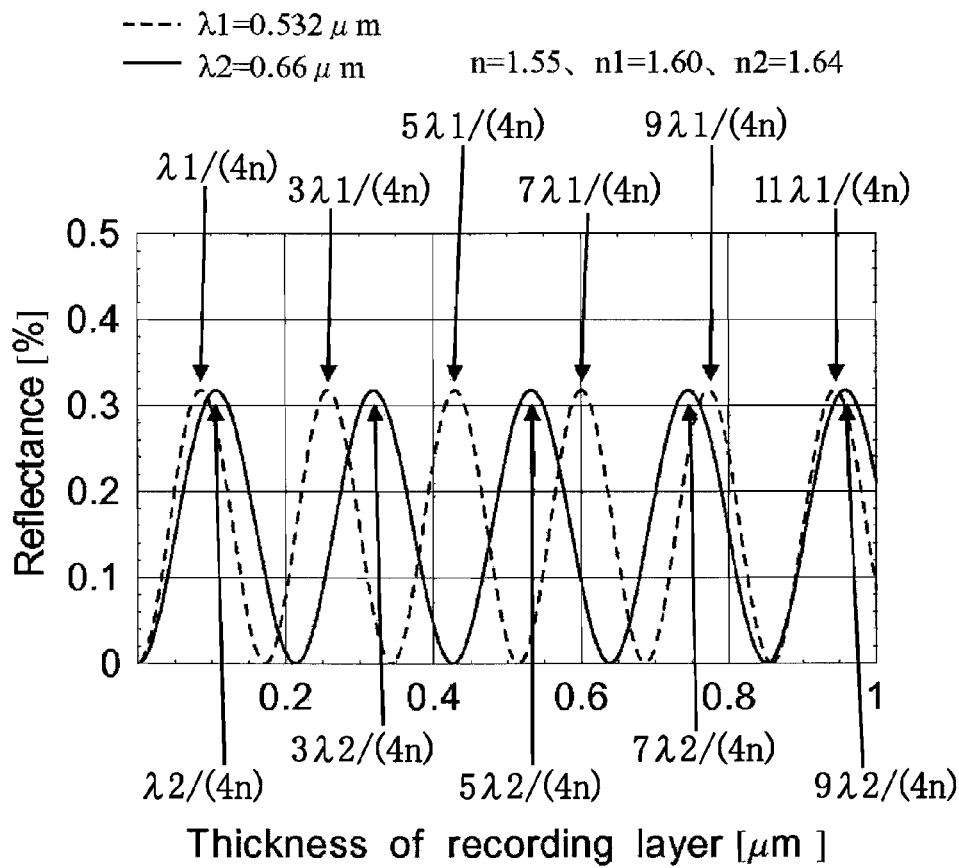
Figure 12B:
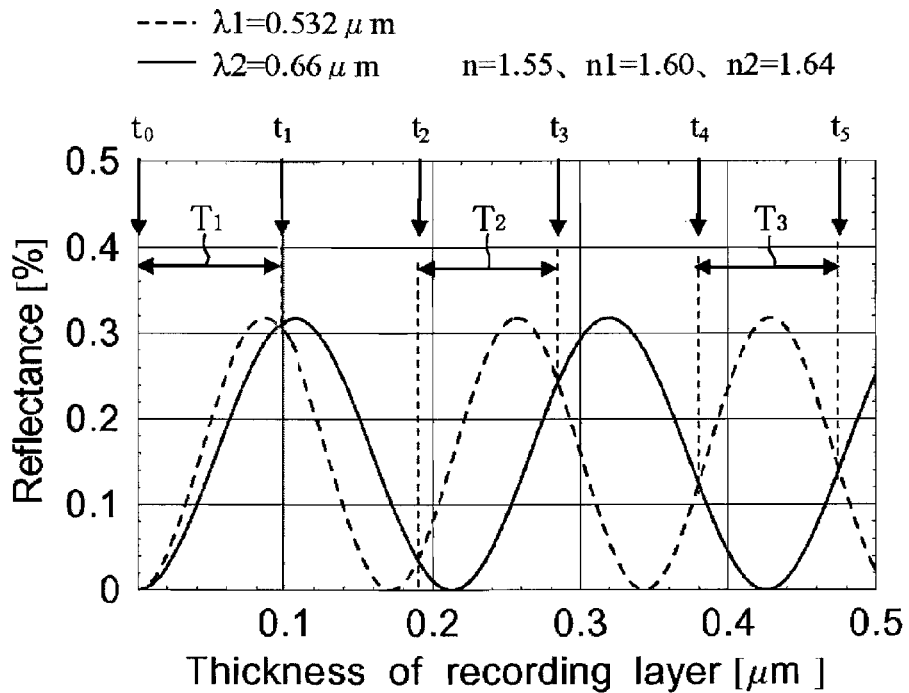
FIG. 12B is a chart showing the thickness ranges of the recording layer where the reflectance of recording light in the unrecorded region becomes less than the reflectance of reproducing light in FIG. 12A.

First, similarly to the information-recording medium in embodiment 1, for example, when refractive indices in an information-recording medium having an H→L (n<n1<n2) characteristic satisfy the following condition: n=1.55, n1=1.60, and n2=1.64, the reflectances to λ1 (0.532 μm) and λ2 (0.66 μm) in the unrecorded region 24 were found to show a sinusoidal periodic change, as indicated by the dotted and solid lines in FIGS. 12A and 12B. Similarly to the embodiment 1, the variation of reflectance is represented by the following formulae: $R1(t) = r1_{max}[1-\cos(4n\pi t/\lambda 1)]/2$, and $R2(t) = r2_{max}[1-\cos(4n\pi t/\lambda 2)]/2$. As for the maximum reflectance, $r1_{max} = r2_{max} = 0.32\%$, and as for the minimum reflectance, $r1_{min} = r2_{min} = 0\%$.

Figure 13A:
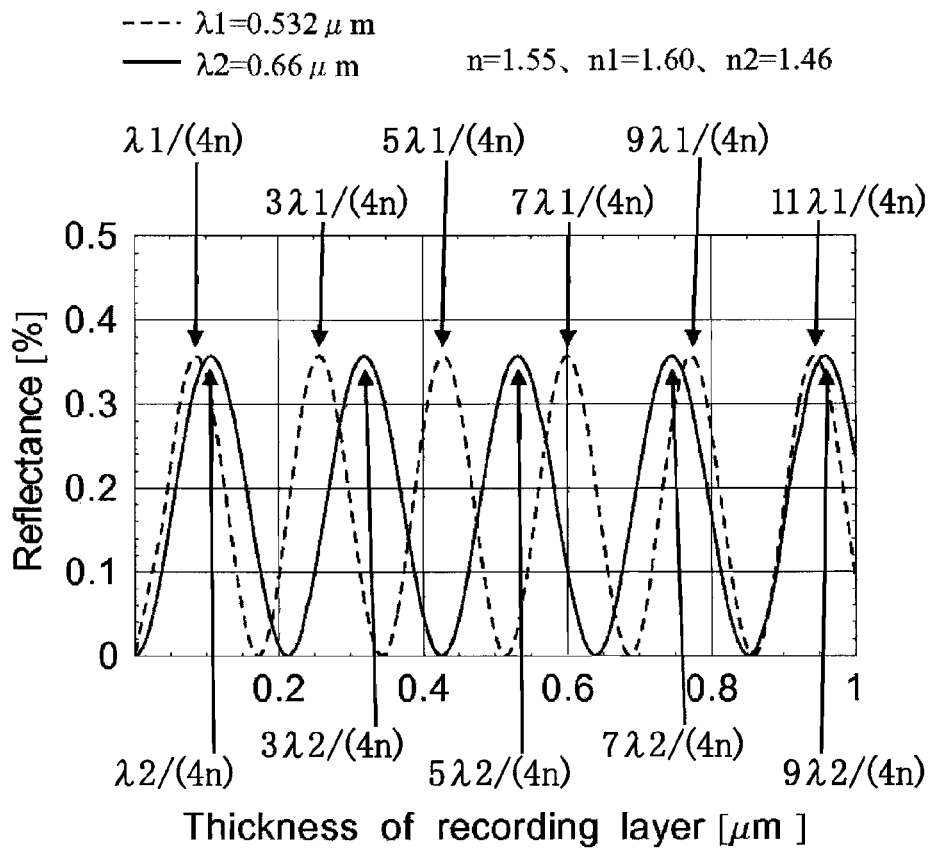
Figure 13B:
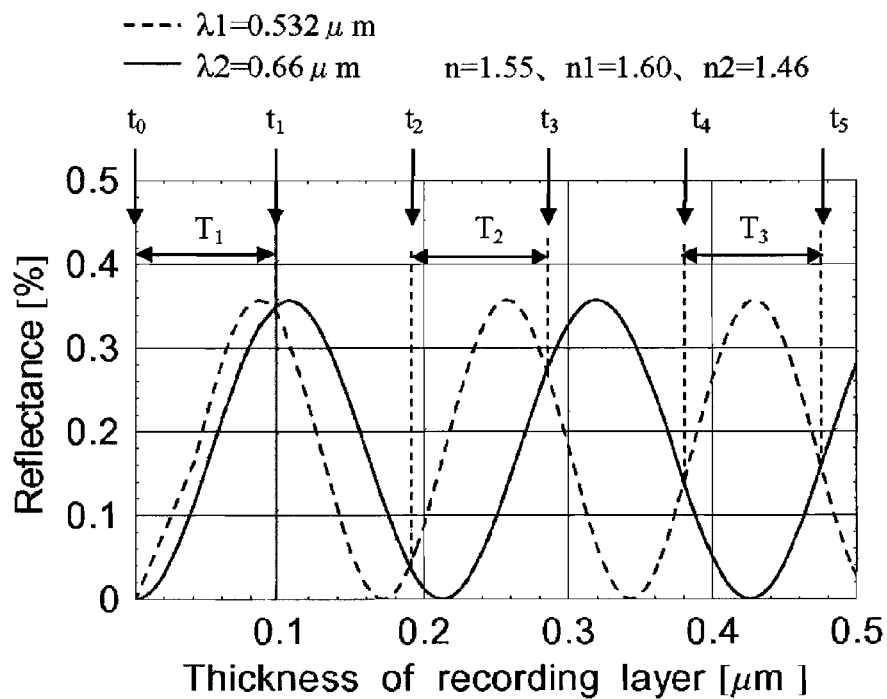
FIG. 13B is a chart showing the thickness ranges of the recording layer where the reflectance of recording light in the unrecorded region becomes lower than the reflectance of reproducing light in FIG. 13A.

Then, for example, if refractive indices of an information-recording medium having an L→H characteristic (n1>n>n2) are expressed as follows: n=1.55, n1=1.60, and n2=1.46, each reflectance was found to show a sinusoidal periodic change similarly, as shown in FIGS. 13A and 13B. Accordingly, $R1(t) = r1_{max}[1-\cos(4n\pi t/\lambda 1)]/2$, and $R2(t) = r2_{max}[1-\cos(4n\pi t/\lambda 2)]/2$. As for the maximum reflectance, $r1_{max} = r2_{max} = 0.36\%$, and as for the minimum reflectance, $r1_{min} = r2_{max} = 0\%$.

Thus as shown in FIGS. 12B and 13B, if the layer thickness is in the range where the variation R1(t) in the reflectance of the λ1 light in the unrecorded region against the thickness of the recording layer indicated by the dotted line is larger than the variation R2(t) in the reflectance of the λ2 light in the unrecorded region against the thickness of the recording layer indicated by the solid line, when the reproducing-light wavelength and the recording-light wavelength in the present embodiment are used, the reflectance of the λ2 light in the unrecorded region becomes smaller than the reflectance of the λ1 light in the unrecorded region. Thus similarly to embodiment 1, if the thickness of the recording layer satisfies the Formula (1), it is possible to assure supply of a reflected light for focus servo control and also to record and reproduce favorably at high accuracy.

The layer thicknesses $t_1$ at the intersections of the two reflectance curves are the same as each other in both cases, and from the smallest, $t_0$ is 0 μm; $t_1$ is 0.10 μm; $t_2$ is 0.19 μm; $t_3$ is 0.29 μm; $t_4$ is 0.38 μm; $t_5$ is 0.48 μm; $t_6$ is 0.57 μm; $t_7$ is 0.67 μm; $t_8$ is 0.76 μm; $t_9$ is 0.88 μm; . . . . Thus, the ranges of the thickness of the recording layer where the reflectance curve of the λ1 light indicated by a dotted line becomes larger than the reflectance curve to the λ2 light indicated by a solid line are ranges of $T_1, T_2, T_3, \ldots$, indicated by the arrow in the horizontal direction shown respectively in FIG. 12B and FIG. 13B. Similarly to the condition of Formula (2) in embodiment 1, the ranges shown by using $t_i$ are respectively as follows: $t_0 < T_1 < t_1, t_2 < T_2 < t_3, t_4 < T_3 < t_5, t_6 < T_4 < t_7, \ldots$.

Figure 14A:
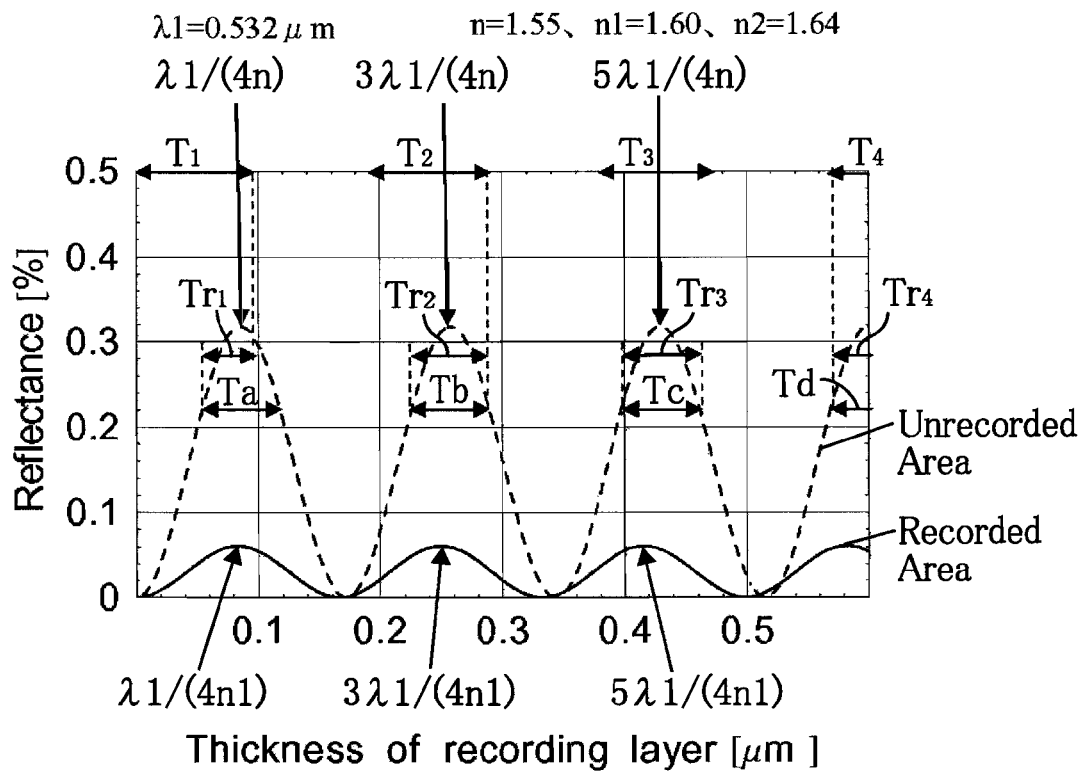
Figure 14B:
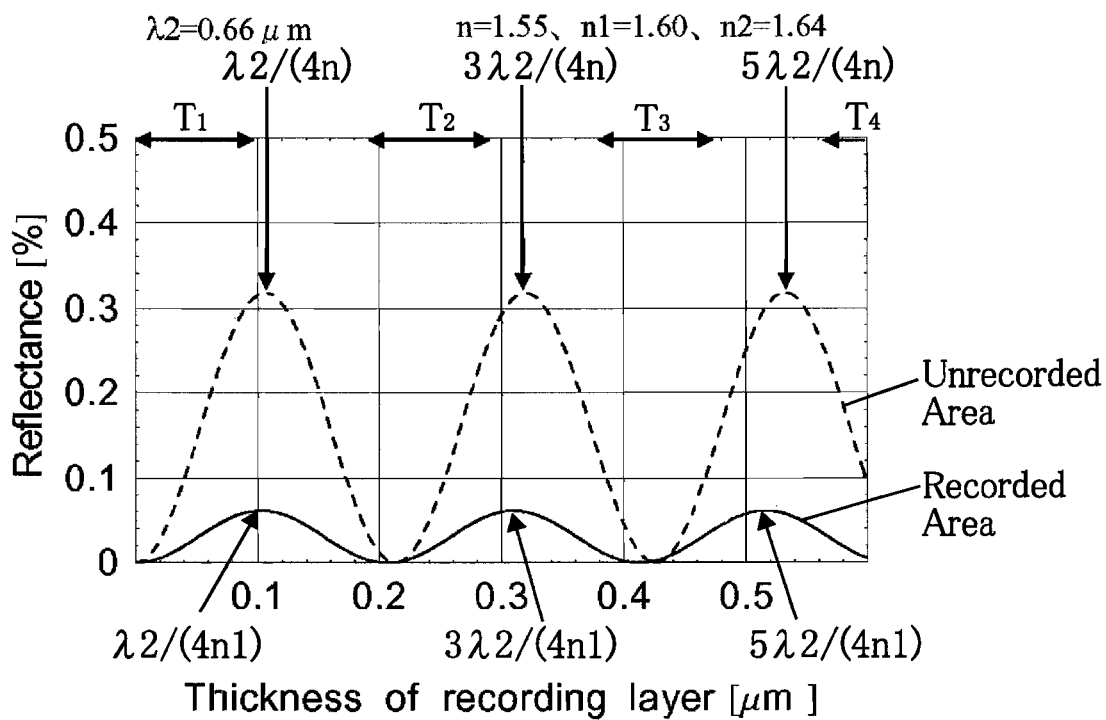
FIG. 14B is a chart showing the relationship between the thickness of the recording layer in the information-recording medium shown in FIG. 12A and the reflectances of recording light in the recorded and unrecorded regions of the recording layer.

The process of recording and reproducing a recording pit 5 in the recording layer 1 is also explained similarly to embodiment 1. Thus, for example, if refractive indices in an information-recording medium having an H→L characteristic (n<n1<n2) are expressed as follows: n=1.55, n1=1.60, and n2=1.64, the reflectances of the λ1 light in the unrecorded region 24 and the recorded region 23 were shown to show a sinusoidal periodic change, as indicated respectively by the dotted and solid lines in FIG. 14A. Because the information-recording medium has an H→L character, the maximum reflectance in the unrecorded region 24, $r1_{max}$, is 0.32%, but the maximum reflectance in the recorded region 23, $r1_{max}$, i.e., of the recording pit 5, decreases to 0.06% (minimum reflectance: 0%). As shown in FIG. 14A, the thickness of the recording layer 1 where the reflectance of the λ1 light in the unrecorded region 24 shows the maximum value is represented by $p\lambda 1/(4n)$ by using a given positive odd number p, and the thickness of the recording layer where the reflectance of the λ1 light in the recorded region 23 shows the maximum value by $p\lambda 1/(4n1)$.

Thus also in the present embodiment, similarly to embodiment 1, the favorable thickness of the recording layer that gives a reflectance of reproducing light in the unrecorded region 24 of 0.7 times or more of the maximum reflectance is the range satisfying Formula (3):

$$(p-0.369)\lambda 1/(4n) \leq t \leq (p+0.369)\lambda 1/(4n) \quad (3)$$

Typical thicknesses of the recording layers are, for example, ranges indicated by the arrow in the horizontal direction in FIG. 14A, Ta, Tb, Tc, . . . , ( . . . represents repetition) satisfying the following requirements: 0.05 μm ≤ Ta ≤ 0.12 μm, 0.23 μm ≤ Tb ≤ 0.29 μm, 0.40 μm ≤ Tc ≤ 0.46 μm, 0.57 μm ≤ Td ≤ 0.63 μm, 0.74 μm ≤ Te ≤ 0.80 μm, . . . .

For that reason in the information-recording medium having an H→L characteristic (n<n1<n2) of the present embodiment, more favorable range of the thickness of each recording layer 1 are, similarly to embodiment 1, ranges represented by $T_1, T_2, T_3, \ldots$, where the reflectance of the λ2 light in the unrecorded region 24 becomes lower than the reflectance of the λ1 light and the ranges represented by Ta, Tb, Tc, . . . where a favorable reproduction signal intensity (0.7 times or more of the maximum value) is assured. Specifically as indicated by the arrow in the horizontal direction arrow in FIG. 14A, the layer thicknesses satisfying the ranges of the two layer thicknesses simultaneously are from the smallest, for example, $Tr_1, Tr_2, Tr_3, Tr_4, Tr_5, \ldots$, respectively satisfying: 0.05 μm < $Tr_1$ < 0.10 μm, 0.23 μm ≤ $Tr_2$ < 0.29 μm, 0.40 μm ≤ $Tr_3$ ≤ 0.46 μm, 0.57 μm < $Tr_4$ ≤ 0.63 μm, 0.76 μm < $Tr_5$ ≤ 0.80 μm, . . . , ( . . . represents repetition).

Figure 15A:
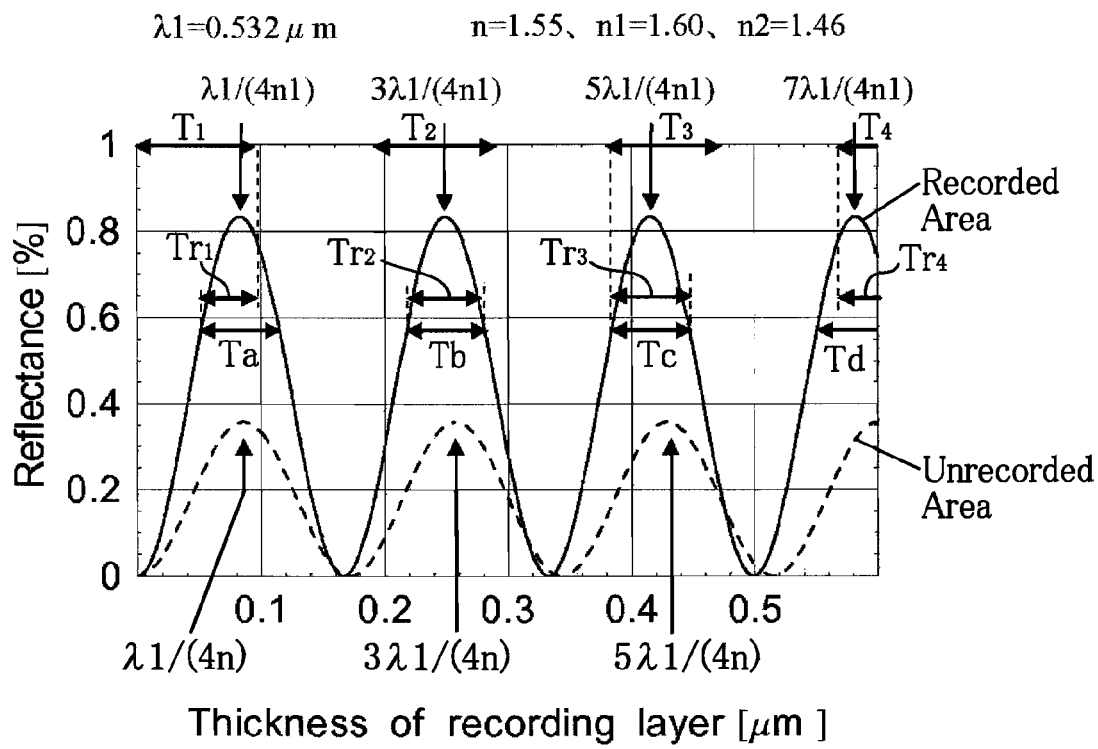
Figure 15B:
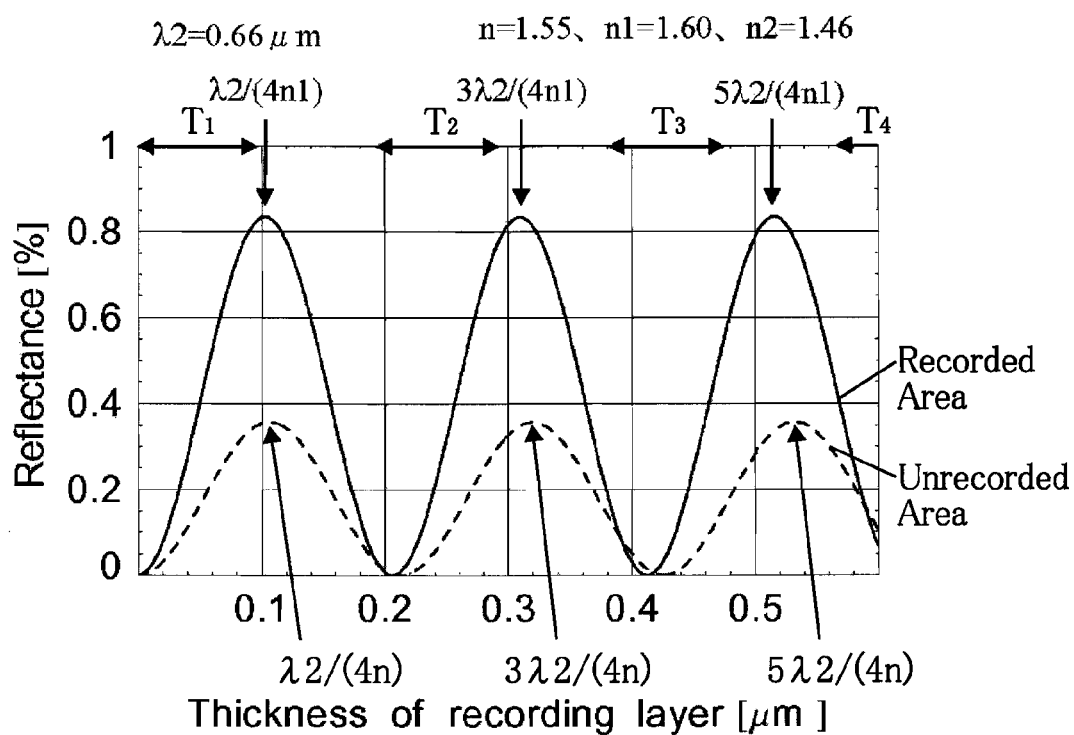
FIG. 15B is a chart showing the relationship between the thickness of the recording layer of the information-recording medium in FIG. 13A and the reflectances of the recording light in the recorded and unrecorded regions of the recording layer.

Then, for example, if refractive indices in an information-recording medium having an L→H (n1>n>n2) characteristic are expressed as follows: n=1.55, n1=1.60, and n2=1.46, the reflectances were shown to show a sinusoidal periodic change, as indicated respectively by the dotted and solid lines in FIG. 15A. Because the information-recording medium has an L→H character, the maximum reflectance in the unrecorded region 24, $r1_{max}$, is 0.36%, but the maximum reflectance in the recorded region 23, $r1_{max}$, i.e., of the recording pit 5, increases to 0.83% (minimum: 0%). As shown in FIG. 15A, the thickness of the recording layer 1 where the reflectance of the λ1 light in the unrecorded region 24 shows the maximum value is represented by $p\lambda 1/(4n)$ by using a given positive odd number p, and the thickness of the recording layer where the reflectance of the λ1 light in the recorded region 23 shows the maximum value by $p\lambda 1/(4n1)$.

Thus also in the present embodiment, similarly to embodiment 1, the favorable thickness of the recording layer that gives a reflectance of reproducing light in the unrecorded region 23 of 0.7 times or more of the maximum reflectance is the range satisfying Formula (4):

$$(p-0.369)\lambda 1/(4n1) \leq t \leq (p+0.369)\lambda 1/(4n1) \quad (4)$$

Typical thicknesses of the recording layers are, for example, ranges Ta, Tb, Tc, ..., ( ... represents repetition), indicated by the arrow in the horizontal direction in FIG. 15A, respectively satisfying the following requirements: 0.05 μm≦Ta≦0.11 μm, 0.22 μm≦Tb≦0.28 μm, 0.38 μm≦Tc≦0.45 μm, 0.55 μm≦Td≦0.61 μm, 0.72 μm≦Te≦0.78 μm ....

For that reason, in the information-recording medium having an L→H (n1>n>n2) characteristic of the present embodiment, more favorable range of the thickness is a range where the favorable reproduction signal intensity (0.7 times or more of maximum reflectance) is preserved and the reflectance of the λ2 light in the unrecorded region 24 is smaller than the reflectance to the λ1 light. Accordingly, layer thicknesses simultaneously satisfying the ranges represented by $T_1$, $T_2$, $T_3$, ... and the ranges represented by Ta, Tb, Tc ... are preferable. Specifically, as indicated by the arrow in the horizontal direction arrow in FIG. 15A, the layer thicknesses satisfying the ranges of the two layer thicknesses simultaneously are, from the smallest, for example, ranges $Tr_1$, $Tr_2$, $Tr_3$, $Tr_4$, $Tr_5$, ..., respectively satisfying: 0.05 μm≦$Tr_1$<0.10 μm, 0.22 μm≦$Tr_2$≦0.28 μm, 0.38 μm<$Tr_3$≦0.45 μm, 0.57 μm<$Tr_4$≦0.61 μm, 0.76 μm<$Tr_5$≦0.78 μm, ..., ( ... represents repetition).

Needless to say, more favorable layer thickness varies according to the combination of wavelength and refractive index, even if it is in the range where the recording-light wavelength and the reproducing-light wavelength are in the ranges of the present embodiment.

The thickness of the recording layer in the information-recording medium having both H→L and L→H characteristics is preferably thinner to some extent, for example, at 0.6 μm or less, from the point of productivity. Thus, the range of the thickness of the recording layer 1 is preferably set to $Tr_1$, $Tr_2$, $Tr_3$, $Tr_4$, or $Tr_5$ shown in FIGS. 14A and 15A, from the results above.

When the reproducing-light wavelength λ1 satisfy the formula: 0.48 μm≦λ1≦0.58 μm and the recording-light wavelength λ2 satisfies the formula: 0.6 μm≦λ2≦0.7 μm as of the recording light and the reproducing light in the present embodiment, it is possible to make the reflectance of the λ2 light in the unrecorded region 24 indicated by a solid line significantly smaller than the reflectance of the λ1 light in the unrecorded region 24 indicated by a dotted line, especially in $T_2$ ($t_2$ to $t_3$) and $T_4$ ($t_6$ to $t_7$), i.e., when i in Formula (2) is in the range of 1 or 2, in the information-recording medium having H→L or L→H characteristics, as shown in FIGS. 12 and 13 (λ1: 0.532 μm, λ2: 0.66 μm). For example when the thickness of the recording layer 1 is set to 3λ1/(4n): 0.26 μm in the $T_2$ region (the layer thickness is included in the more preferable layer thickness $Tr_2$ of recording layer 1 described above), the reflectance of the λ1 light in the unrecorded region 24 of the H→L information-recording medium is 0.32% and that of the L→H information-recording medium is 0.36%. In contrast, the reflectance of the λ2 light in the unrecorded region 24 of the H→L information-recording medium is lower at 0.12%, and that of the L→H information-recording medium at 0.13%. Thus in any case, it is possible to obtain an information-recording medium of which the reflectance of the λ2 light in the unrecorded region 24 is distinctively smaller than the reflectance of the λ1 light in the unrecorded region.

When the thickness of the recording layer 1 is set in the range $T_3$, for example to 5λ1/(4n)=0.43 μm (the layer thickness is in the more favorable layer thickness range $Tr_3$ of recording layer 1 described above), the reflectance of the λ1 light in the unrecorded region 24 of the H→L information-recording medium is 0.32% and that of the L→H information-recording medium is 0.36%. In contrast, the reflectance of the λ2 light in the unrecorded region 24 of the H→L information-recording medium is very smaller at 0.0007%, and that of the L→H information-recording medium at 0.0008%. Thus in any case, obtained is an information-recording medium in which the decrease in the light intensity of recording light is suppressed significantly more than the decrease in reproducing light intensity. Needless to say, more favorable range of layer thickness varies according to the combination of wavelength and refractive index.

The method of producing an information-recording medium and the optical information-recording/reproducing device in the present embodiment are similar to those described in the embodiment 1.

Also in the present embodiment, similarly to embodiment 1, it is possible to perform focus servo control by emitting both recording and reproducing lights, converging the reproducing light in a desirable recording layer, and using the reflected light during recording. Then, the layer thickness where the reflectance to the λ2 light is, for example, small at 0.01% or less is the range satisfying Formula (5), similarly to embodiment 1.

$$(q-0.104)\lambda 2/(4n) \leq t \leq (q+0.104)\lambda 2/(4n) \quad (5)$$

Accordingly when a recording light and a reproducing light respectively satisfying the conditions: 0.48 μm≦λ1≦0.58 μm and 0.6 μm≦λ2≦0.7 μm, are used, for example, q=4, i.e., a recording layer having a thickness t in the range satisfying the following Formula (9) is preferable.

$$3.90\lambda 2/(4n) \leq t \leq 4.10\lambda 2/(4n) \quad (9)$$

For example in the case of the recording layer having a refractive index of n described above, the range of the thickness of recording layer satisfying the Formula (9) in the information-recording media having both H→L and L→H characteristics, 0.41 μm≦t≦0.44 μm. The range of layer thickness is included in the more preferable range of layer thickness $Tr_3$ described above shown in FIGS. 14A and 15A.

Embodiment 4

Hereinafter, the information-recording medium in the embodiment 4 of the present invention will be described. The embodiment 4 is the same as the embodiment 1 in that a reproducing-light wavelength λ1 shorter than the recording-light wavelength λ2 is used, but different from it in that a recording light and a reproducing light, of which the reproducing-light wavelength satisfies the formula: 0.35 μm≦λ1≦0.45 μm and the recording-light wavelength satisfies the formula: 0.48 μm≦λ1≦0.58 μm, are used. Examples of the light sources having such wavelengths include the combination of a semiconductor laser at λ1=0.405 μm and a Nd:YAG-SHG laser at λ2=0.532 μm.

FIG. 16 to FIG. 19 are charts explaining the information-recording medium in the present embodiment 4 in detail. FIGS. 16A and 16B show an example of the relationship between the thickness of the recording layer in the information-recording medium in the embodiment 4 of the present invention and the reflectances of the recording and reproducing lights in the unrecorded region of the recording layer. FIG. 17A and FIG. 17B are charts showing other examples of the relationship between the thickness of the recording layer in the information-recording medium in the embodiment 4 of the present invention and the reflectances of the recording and reproducing lights in the unrecorded region of the recording layer. FIG. 18A is a chart showing the relationship between the thickness of the recording layer in the information-recording medium shown in FIG. 16A and the reflectances of the reproducing light in the recorded and unrecorded regions of the recording layer, while FIG. 18B is a chart showing the relationship between the thickness of the recording layer in the information-recording medium shown in FIG. 16A and the reflectances of the recording light in the recorded and unrecorded regions of the recording layer. FIG. 19A is a chart showing the relationship between the thickness of the recording layer in the information-recording medium shown in FIG. 17A and the reflectances of the reproducing light in the recorded and unrecorded regions of the recording layer, while FIG. 19B is a showing the relationship between the thickness of the recording layer in the information-recording medium shown in FIG. 17A and the reflectances of the recording light in the recorded and unrecorded regions of the recording layer.

Figure 16A:
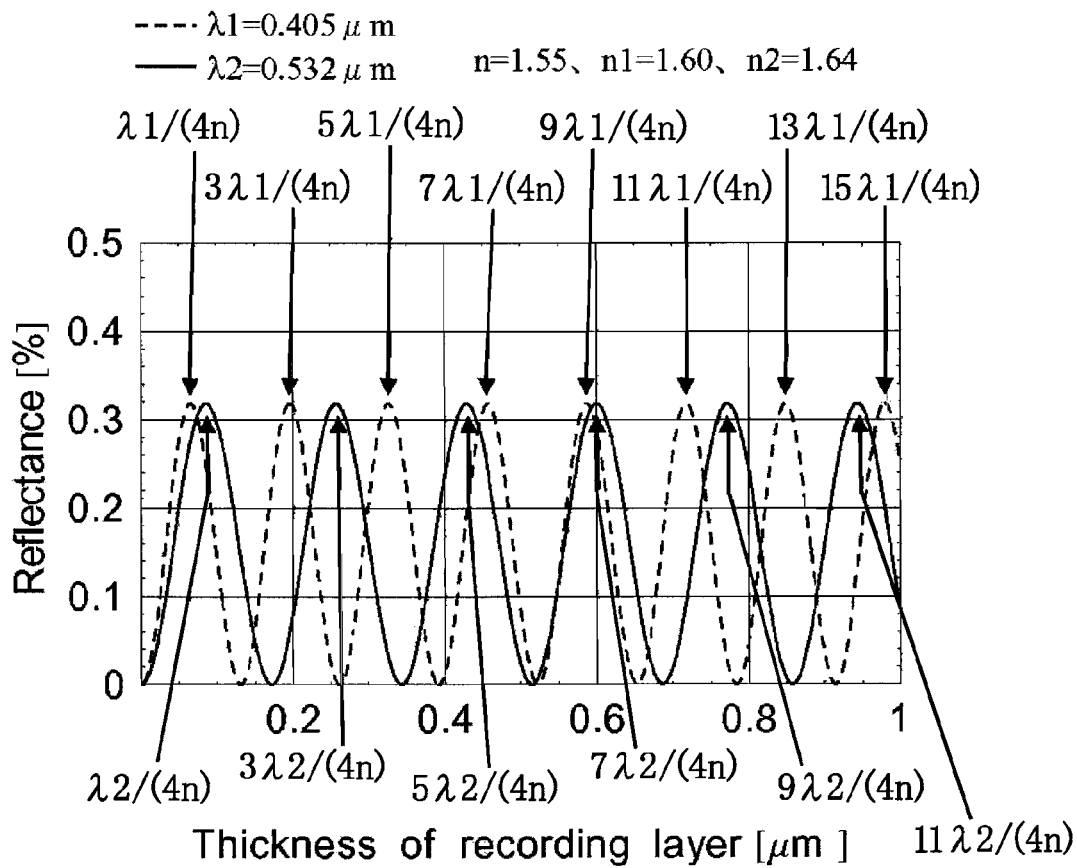
Figure 16B:
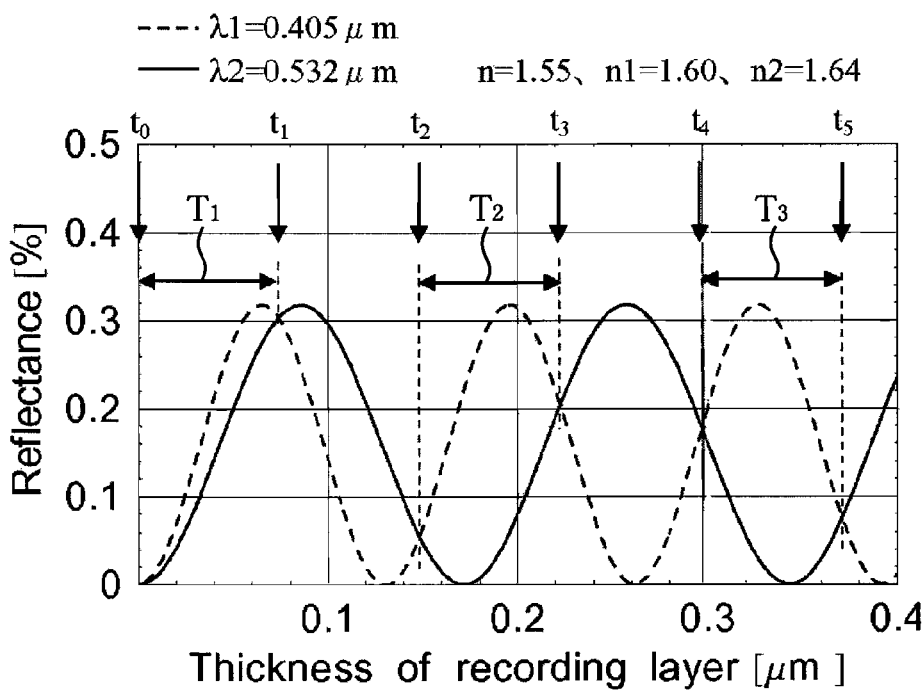
FIG. 16B is a chart showing the thickness ranges of the recording layer where the reflectance of recording light in the unrecorded region of the recording layer in FIG. 16A becomes lower than the reflectance of reproducing light.

First, similarly to the information-recording medium in embodiment 1, for example, when refractive indices in an information-recording medium having an H→L (n<n1<n2) characteristic satisfy the following condition: n=1.55, n1=1.60, and n2=1.64, the reflectances to λ1 (0.405 μm) and λ2 (0.532 μm) in the unrecorded region 24 were found to show a sinusoidal periodic change, as indicated by the dotted and solid lines in FIGS. 16A and 16B. Similarly to embodiment 1, the variation of reflectance is represented by the following formulae: $R1(t)=r1_{max}[1-\cos(4n\pi t/\lambda 1)]/2$, and $R2(t)=r2_{max}[1-\cos(4n\pi t/\lambda 2)]/2$. As for the maximum reflectance, $r1_{max}=r2_{max}=0.32\%$, and as for the minimum reflectance, $r1_{min}=r2_{min}=0\%$.

Figure 17A:
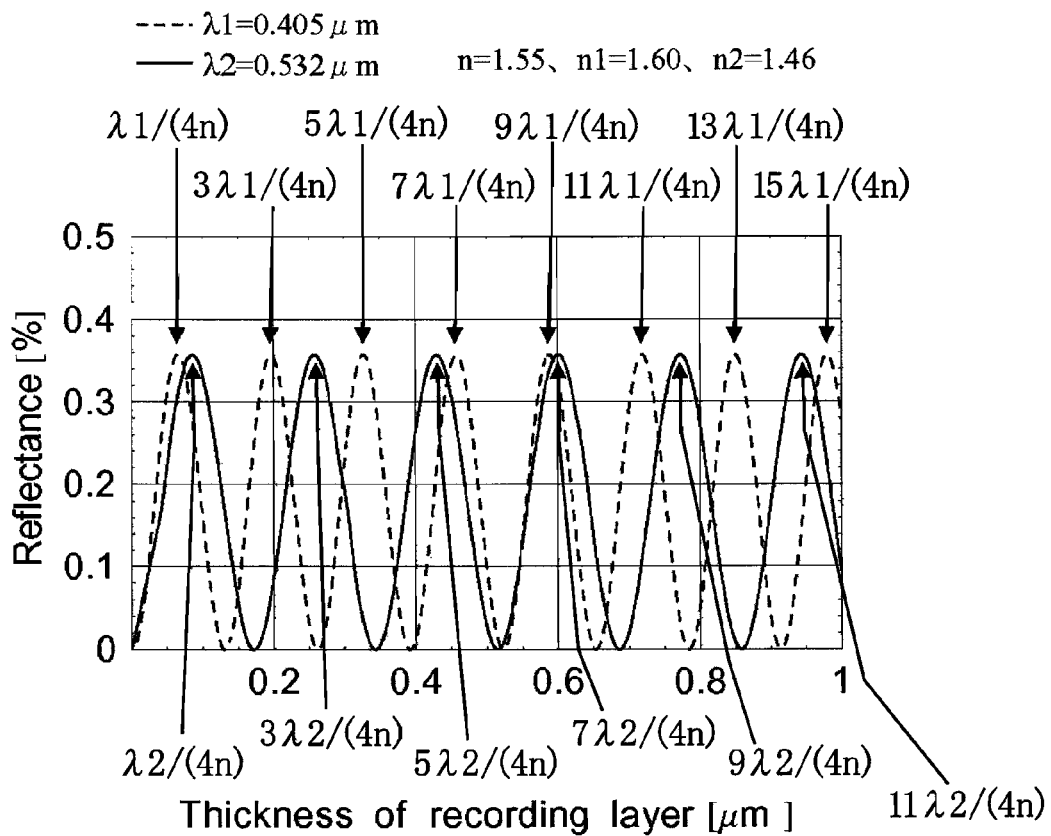

Then, for example, if refractive indices of an information-recording medium having an L→H (n1>n>n2) characteristic are expressed as follows: n=1.55, n1=1.60, and n2=1.46, each reflectance was found to show a sinusoidal periodic change similarly to embodiment 1, as indicated by the dotted and solid lines in FIGS. 17A and 17B. Accordingly, $R1(t)=r1_{max}[1-\cos(4n\pi t/\lambda 1)]/2$, and $R2(t)=r2_{max}[1-\cos(4n\pi t/\lambda 2)]/2$. As for the maximum reflectance, $r1_{max}=r2_{max}=0.36\%$, and as for the minimum reflectance, $r1_{min}=r2_{min}=0\%$.

Figure 17B:
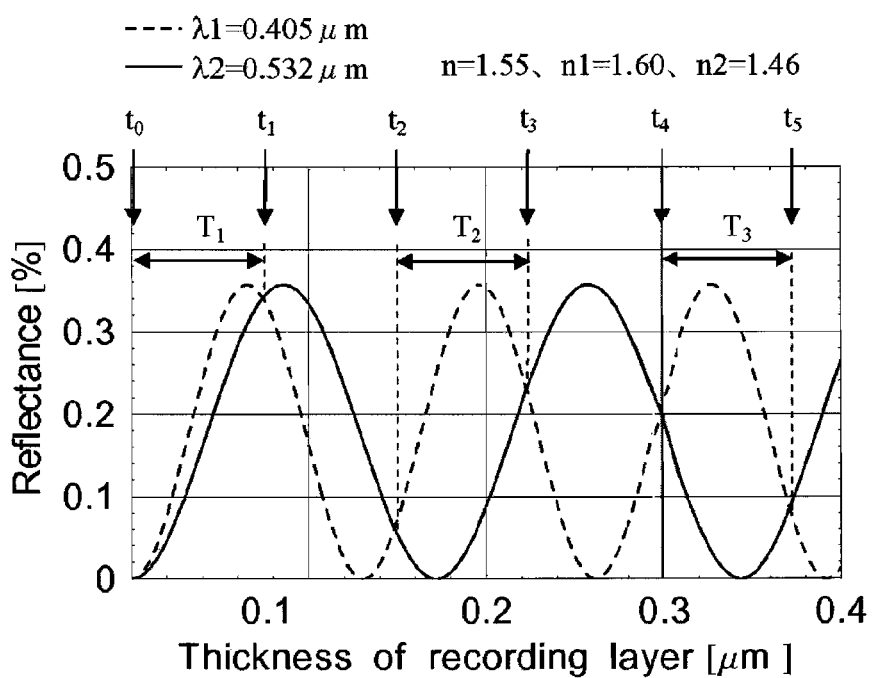
FIG. 17B is a chart showing the thickness ranges of the recording layer where the reflectance of the recording light in the unrecorded region becomes lower than the reflectance of the reproducing light in FIG. 17A.

Thus as shown in FIGS. 16B and 17B, in the range of layer thickness where the variation R1(t) of the reflectance of the λ1 light in the unrecorded region against the thickness of the recording layer indicated by the dotted line is larger than the variation R2(t) of the reflectance of the λ2 light in the unrecorded region against the thickness of the recording layer indicated by the solid line, when the reproducing-light wavelength and the recording-light wavelength in the present embodiment are used, the reflectance of the λ2 light in the unrecorded region becomes smaller than the reflectance of the λ1 light in the unrecorded region. Thus similarly to embodiment 1, if the thickness of the recording layer satisfies the Formula (1), it is possible to assure supply of a reflected light for focus servo control and also to record and reproduce favorably at high accuracy.

The layer thickness $t_i$ at the intersection of the two reflectance curves are the same as each other in both cases, and from the smallest, $t_0$ is 0 μmc; $t_1$ is 0.07 μm; $t_2$ is 0.15 μm; $t_3$ is 0.22 μm; $t_4$ is 0.30 μm; $t_5$ is 0.37 μm; $t_6$ is 0.45 μm; $t_7$ is 0.52 μm; $t_8$ is 0.55 μm; $t_9$ is 0.59 μm, . . . . Thus, the ranges of the thickness of the recording layer where the reflectance curve of the λ1 light indicated by a dotted line becomes larger than the reflectance curve to the λ2 light indicated by a solid line are ranges of $T_1$, $T_2$, $T_3$, . . . , indicated by the arrow in the horizontal direction shown respectively in FIG. 16B and FIG. 17B. Similarly to the condition of Formula (2) in embodiment 1, the ranges shown by using $t_i$ are respectively as follows: $t_0<T_1<t_1$, $t_2<T_2<t_3$, $t_4<T_3<t_5$, $t_6<T_4<t_7$ . . . .

Figure 18A:
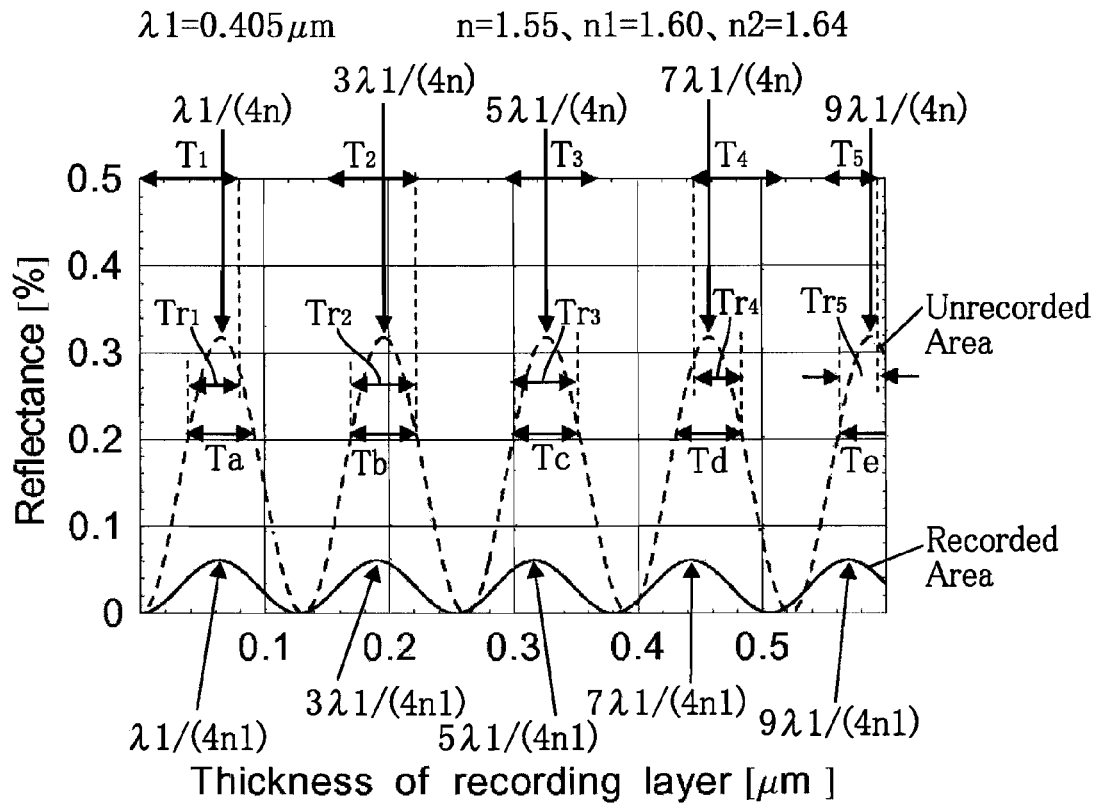
Figure 18B:
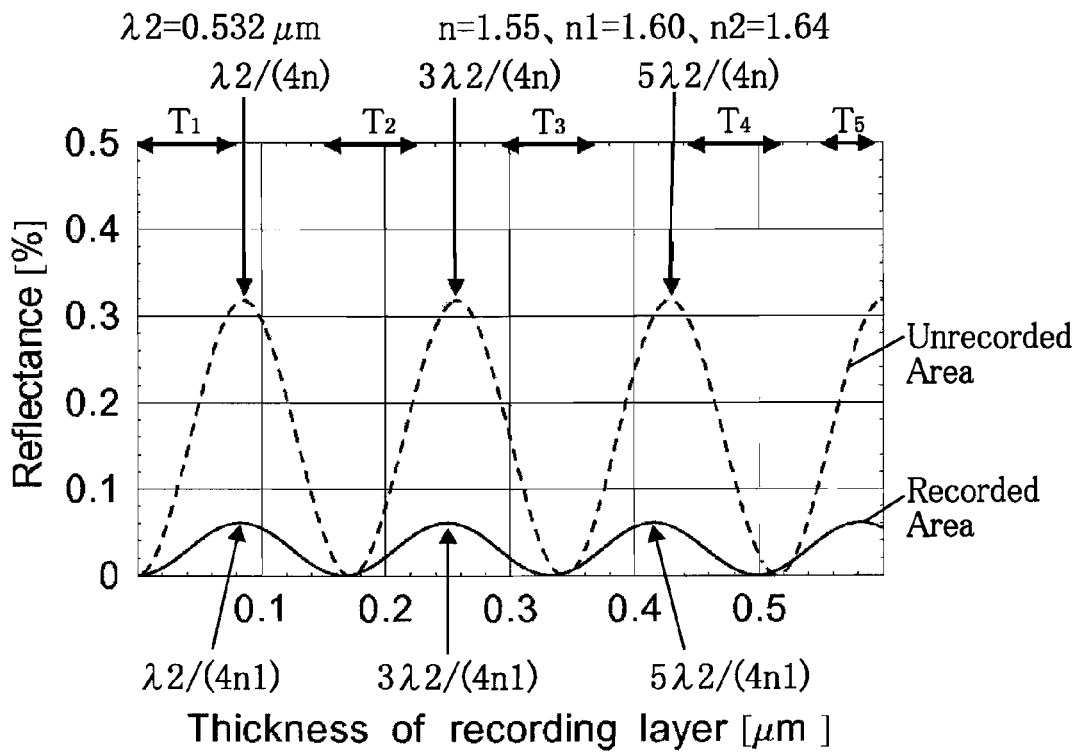
FIG. 18B is a chart showing the relationship between the thickness of the recording layer in the information-recording medium in FIG. 16A and the reflectances of recording light in the recorded and unrecorded regions of the recording layer.

The process of recording and reproducing a recording pit 5 in the recording layer 1 is also explained similarly to embodiment 1. Thus, for example, if refractive indices in an information-recording medium having an H→L characteristic (n<n1<n2) are expressed as follows: n=1.55, n1=1.60, and n2=1.64, the reflectances of the λ1 light in the unrecorded region 24 and the recorded region 23 were shown to show a sinusoidal periodic change, as indicated respectively by the dotted and solid lines in FIG. 18A. Because the information-recording medium has an H→L character, the maximum reflectance in the unrecorded region 24, $r1_{max}$, 0.32%, but the maximum reflectance in the recorded region 23, $r1_{max}$, i.e., of the recording pit 5, decreases to 0.06% (minimum reflectance: 0%). As shown in FIG. 18A, the thickness of the recording layer 1 where the reflectance of the λ1 light in the unrecorded region 24 shows the maximum value is represented by pλ1/(4n) by using a given positive odd number p, and the thickness of the recording layer where the reflectance of the λ1 light in the recorded region 23 shows the maximum value by pλ1/(4n1).

Thus also in the present embodiment, similarly to embodiment 1, the favorable thickness of the recording layer that gives a reflectance of reproducing light in the unrecorded region 24 of 0.7 times or more of the maximum reflectance is the range satisfying Formula (3):

$$(p-0.369)\lambda 1/(4n) \leq t \leq (p+0.369)\lambda 1/(4n) \quad (3)$$

Typical thicknesses of the recording layers are, for example, ranges indicated by the arrow in the horizontal direction in FIG. 18A, satisfying the following requirements: 0.04 μm≦Ta≦0.09 μm, 0.17 μm≦Tb≦0.22 μm, 0.30 μm≦Tc≦0.35 μm, 0.43 μm≦Td≦0.48 μm, 0.56 μm≦Te≦0.61 μm . . . .

For that reason, in the information-recording medium having an H→L (n<n1<n2) characteristic of the present embodiment, more favorable range of the thickness of each recording layer 1 are, similarly to embodiment 1, ranges by $T_1$, $T_2$, $T_3$, . . . , where the reflectance of the λ2 light in the unrecorded region 24 becomes lower than the reflectance of the λ1 light and the ranges represented by Ta, Tb, Tc, . . . where a favorable reproduction signal intensity (0.7 times or more of the maximum value) is assured. Specifically, as indicated by the arrow in the horizontal direction arrow in FIG. 18A, the layer thicknesses satisfying the ranges of the two layer thicknesses simultaneously are from the smallest, for example: $Tr_1$, $Tr_2$, $Tr_3$, $Tr_4$, $Tr_5$, . . . , respectively satisfying: 0.04 μm≦$Tr_1$<0.07 μm, 0.17 μm≦$Tr_2$<0.22 μm, 0.30 μm<$Tr_3$≦0.35 μm, 0.45 μm<$Tr_4$≦0.48 μm, 0.56 μm≦$Tr_5$<0.59 μm . . . ( . . . represents repetition).

Figure 19A:
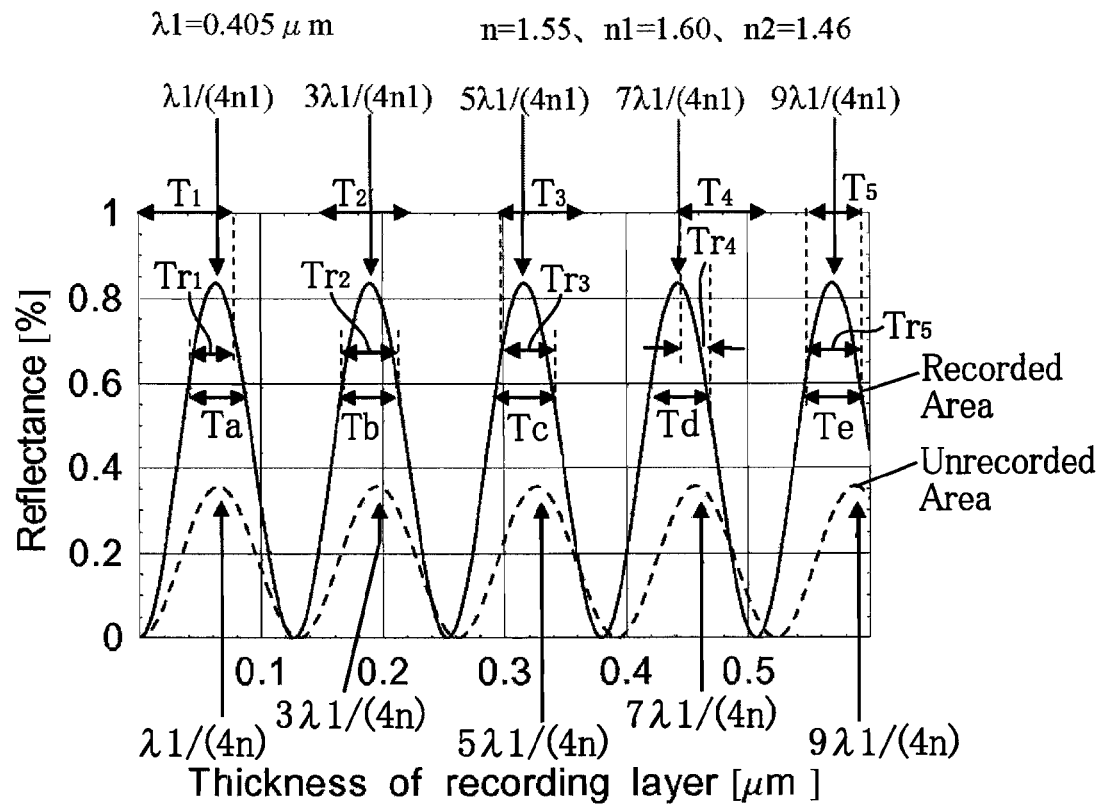
Figure 19B:
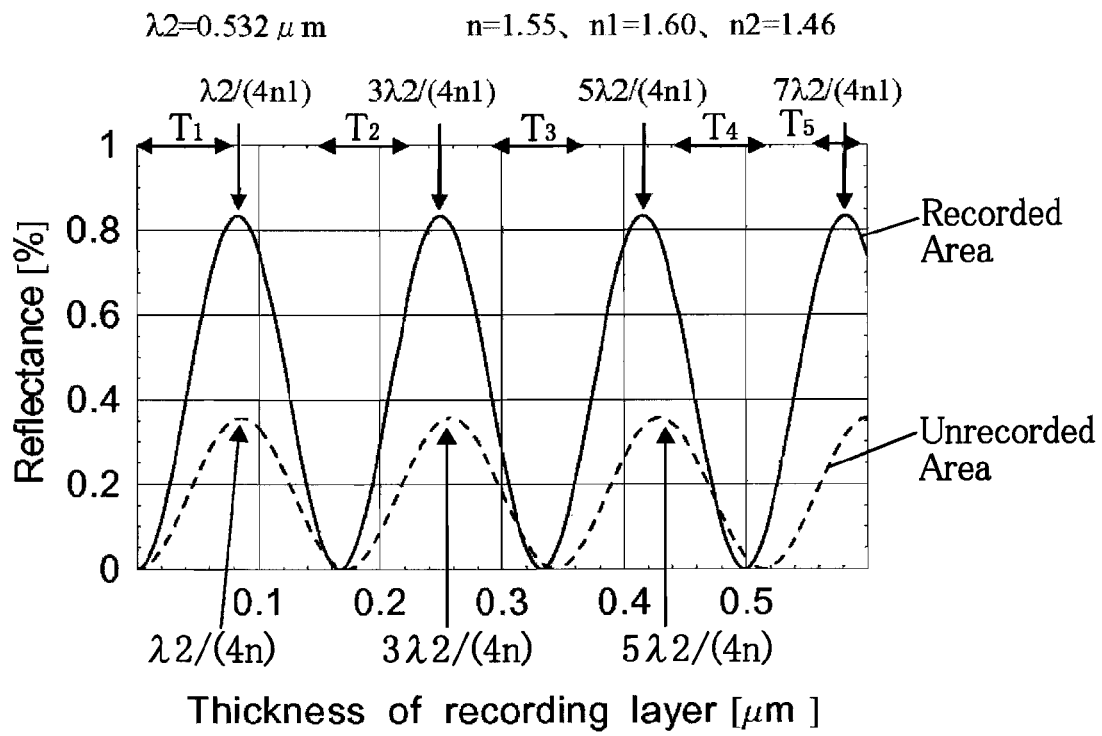
FIG. 19B is a chart showing the relationship between the thickness of the recording layer in the information-recording medium in FIG. 17A and the reflectances of the recording light in the recorded and unrecorded regions of the recording layer.
Figure 20:
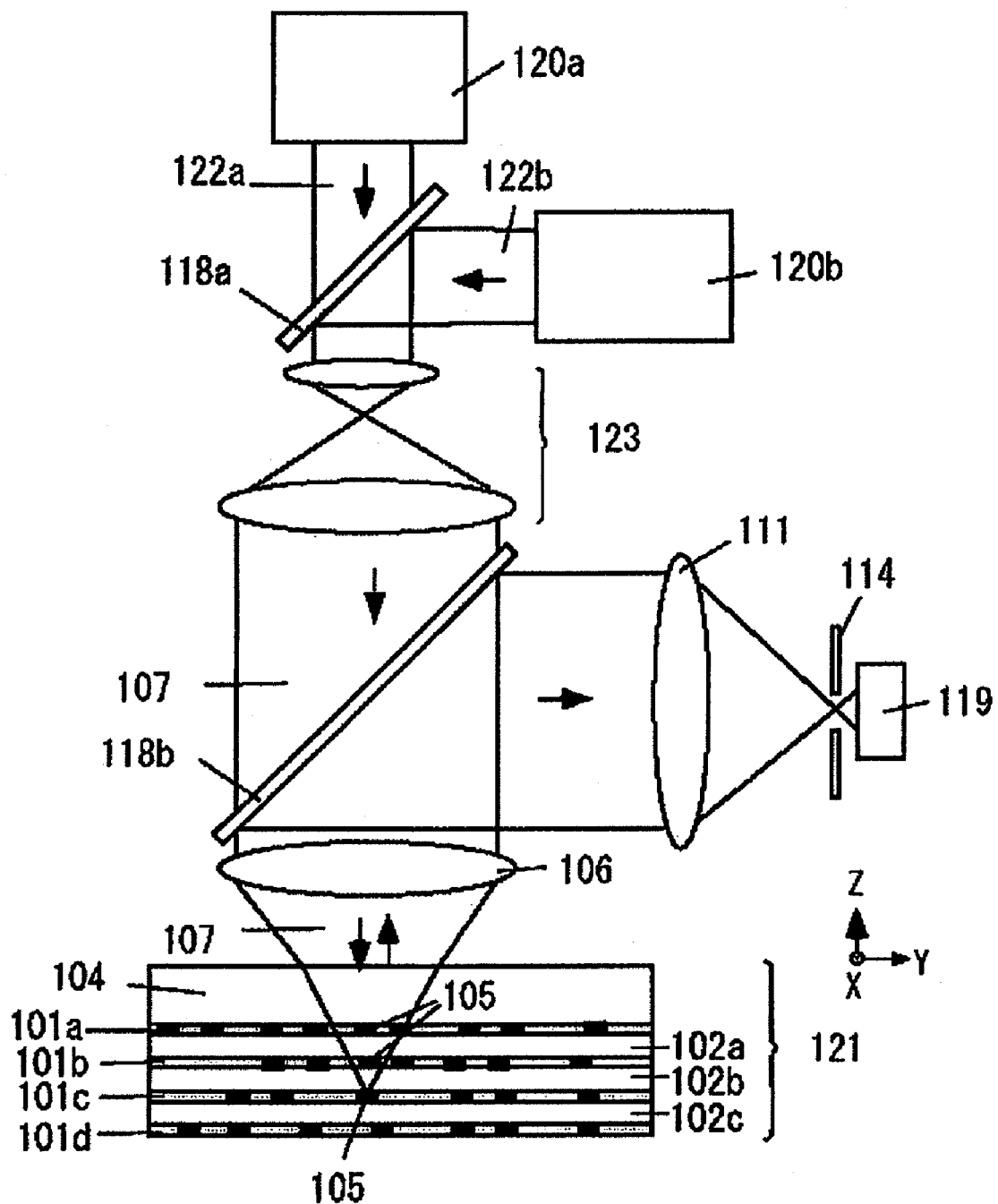
FIG. 20 is an explanatory drawing illustrating the configuration of a conventional optical information-recording/reproducing device and the method of recording/reproducing a signal.

Then, for example, if refractive indices in an information-recording medium having an L→H (n1>n>n2) characteristic are expressed as follows: n=1.55, n1=1.60, and n2=1.46, the reflectances of the λ1 light in the unrecorded region 24 and in the recorded region 23 are found to show a sinusoidal periodic change, as indicated respectively by the dotted and solid lines in FIG. 19A. Because the information-recording medium has an L→H character, the maximum reflectance in the unrecorded region 24, $r1_{max}$, is 0.36%, but the maximum reflectance in the recorded region 23, $r1_{max}$, i.e., of the recording pit 5, increases to 0.83% (minimum: 0%). As shown in FIG. 19A, the thickness of the recording layer 1 where the reflectance of the λ1 light in the unrecorded region 24 shows the maximum value is represented by pλ1/(4n) by using a given positive odd number p, and the thickness of the recording layer where the reflectance of the λ1 light in the recorded region 23 shows the maximum value by pλ1/(4n1).

Thus also in the present embodiment, similarly to embodiment 1, the favorable thickness of the recording layer that gives a reflectance of reproducing light in the unrecorded region 23 of 0.7 times or more of the maximum reflectance is the range satisfying Formula (4):

$$(p-0.369)\lambda 1/(4n1) \leq t \leq (p+0.369)\lambda 1/(4n1) \quad (4)$$

Typical thicknesses of the recording layers are, for example, ranges indicated by the arrow in the horizontal direction in FIG. 19A, Ta, Tb, Tc, . . . , ( . . . represents repetition), respectively satisfying the following requirements: 0.04 μm≦Ta≦0.09 μm, 0.17 μm≦Tb≦0.21 μm, 0.29 μm≦Tc≦0.34 μm, 0.42 μm≦Td≦0.47 μm, 0.55 μm≦Te≦0.59 μm, 0.67 μm≦Tf≦0.72 μm . . . .

For that reason, in the information-recording medium having an L→H (n1>n>n2) characteristic of the present embodiment, more favorable range of the thickness of each recording layer 1 is a range where the favorable reproduction signal intensity (0.7 times or more of maximum reflectance) is preserved and the reflectance of the λ2 light in the unrecorded region 24 is smaller than the reflectance to the λ1 light. Accordingly, layer thicknesses simultaneously satisfying the ranges represented by $T_1$, $T_2$, $T_3$, . . . and the ranges represented by Ta, Tb, Tc . . . are preferable. Specifically, as indicated by the arrow in the horizontal direction arrow in FIG. 19A, the layer thicknesses satisfying the ranges of the two layer thicknesses simultaneously are, from the smallest, for example, ranges $Tr_1$, $Tr_2$, $Tr_3$, $Tr_4$, $Tr_5$, . . . , respectively satisfying: 0.04 μm≦$Tr_1$<0.07 μm, 0.17 μm≦$Tr_2$<0.21 μm, 0.30 μm<$Tr_3$≦0.34 μm, 0.45 μm<$Tr_4$≦0.47 μm, 0.55 μm<$Tr_5$≦0.59 μm . . . , ( . . . represents repetition).

Needless to say, more favorable layer thickness varies according to the combination of wavelength and refractive index, even it is in the range where the recording-light wavelength and the reproducing-light wavelength are in the ranges of the present embodiment.

The thickness of the recording layer in the information-recording medium having both H→L and L→H characteristics is preferably thinner to some extent, for example, at 0.6 μm or less, from the point of productivity. Thus, the range of the thickness of the recording layer 1 is preferably set to $Tr_1$, $Tr_2$, $Tr_3$, $Tr_4$, or $Tr_5$ shown in FIGS. 18A and 19A, from the results above.

When the reproducing-light wavelength λ1 satisfy the formula: 0.35 μm≦λ1≦0.45 μm and the recording-light wavelength λ2 satisfies the formula: 0.48 μm≦λ2≦0.58 μm as of the recording light and the reproducing light in the present embodiment, it is possible to make the reflectance of the λ2 light in the unrecorded region 24 indicated by a solid line significantly smaller than the reflectance of the λ1 light in the unrecorded region 24 indicated by a dotted line, especially in $T_2$ ($t_2$ to $t_3$) and $T_3$ ($t_4$ to $t_5$), i.e., when i in Formula (2) is in the range of 1 or 2, in the information-recording medium having H→L or L→H characteristics, as shown in FIGS. 16 and 17 (λ1: 0.405 μm, λ2: 0.532 μm). For example when the thickness of the recording layer 1 is set to 3λ1/(4n): 0.20 μm in the $T_2$ region (the layer thickness is included in the more preferable layer thickness $Tr_2$ of recording layer 1 described above), the reflectance of the λ1 light in the unrecorded region 24 of the H→L information-recording medium is 0.32% and that of the L→H information-recording medium is 0.36%. In contrast, the reflectance of the λ2 light in the unrecorded region 24 of the H→L information-recording medium is 0.06%, while that of the L→H information-recording medium is 0.07%. Thus in any case, it is possible to obtain an information-recording medium of which the reflectance of the λ2 light in the unrecorded region 24 is distinctively smaller than the reflectance of the λ1 light in the unrecorded region.

When the thickness of the recording layer 1 is set in the range $T_3$, for example to 5λ1/(4n)=0.33 μm (the layer thickness is in the more favorable range of the thickness $Tr_3$ of recording layer 1 described above), the reflectance of the λ1 light in the unrecorded region 24 of the H→L information-recording medium is 0.32% and that of the L→H information-recording medium is 0.36%. In contrast, the reflectances to λ2 in the unrecorded region 24 are both smaller at 0.03%. Thus, obtained is an information-recording medium in which the decrease in the light intensity of recording light is suppressed significantly more than the decrease in reproducing light intensity. Needless to say, more favorable range of layer thickness varies according to the combination of wavelength and refractive index.

The method of producing an information-recording medium and the optical information-recording/reproducing device in the present embodiment are similar to those described in the embodiment 1.

Also in the present embodiment, similarly to embodiment 1, it is possible to perform focus servo control by emitting both recording and reproducing lights, converging the reproducing light in a desirable recording layer, and using the reflected light during recording. Then, the layer thickness where the reflectance to the λ2 light is, for example, small at 0.01% or less, is the range satisfying Formula (5), similarly to embodiment 1.

$$(q-0.104)\lambda 2/(4n) \leq t \leq (q+0.104)\lambda 2/(4n) \quad (5)$$

Accordingly when a recording light and a reproducing light respectively satisfying the conditions: 0.35 μm<λ1≦0.45 μm and 0.48 μm≦λ2≦0.58 μm, are used, for example, q=2, i.e., a recording layer having a thickness t in the range satisfying the following Formula (10) is preferable.

$$1.90\lambda 2/(4n) \leq t \leq 2.10\lambda 2/(4n) \quad (10)$$

For example in the case of the recording layer having a refractive index of n described above, the range of the thickness of recording layer satisfying the Formula (10) in both the information-recording media having both H→L and L→H characteristics, 0.16 μm≦t≦0.18 μm. The range common to the more favorable range of layer thickness $Tr_2$ shown in FIGS. 18A and 19A described above in the range of layer thickness above is expressed by the formula: 0.17 μm≦t≦0.18 μm, in an information-recording medium having an H→L or L→H characteristic.

In the case of the present embodiment, q=4, i.e., a recording layer having a thickness t in the layer thickness range satisfying the following Formula (11) is preferable:

$$3.90\lambda 2/(4n) \leq t \leq 4.10 \times 2/(4n) \quad (11)$$

In such a case, the range of layer thickness satisfying Formula (11) at the refractive index of the recording layer is expressed by the formula: 0.33 μm≦t≦0.35 μm. The range in the H→L information-recording medium common to the more favorable range of layer thickness $Tr_3$ shown in FIG. 18A or FIG. 19A in the range of layer thickness satisfies the formula: 0.33 μm≦t≦0.35 μm, and that of L→H information-recording medium, the formula: 0.33 μm≦t≦0.34 μm.

In the embodiment above, explained in the case where the refractive index of unrecorded region n is smaller than the refractive index n1 of recorded region, but the present invention is applicable similarly in the opposite case where n>n1. Accordingly, when a diarylethene closed-ring derivative is used for the unrecorded region and its open-ring derivative for the recorded region, the refractive index of unrecorded region n becomes greater than that of the recorded region n1. In such a case, the H→L information-recording medium preferably satisfies the relationship: n2<n1<n, and the L→H information-recording medium to the relationship: n1≦n≦n2, with respect to the refractive index n2 of the intermediate layer.

The information-recording medium in the embodiments 1 to 4 and the optical information-recording/reproducing devices using the same have been described above, but the present invention is not restricted by these embodiments; and information-recording media and optical information-recording/reproducing devices in combination of the information-recording medium and the optical information-recording/reproducing device in each embodiment are also effective and included in the scope of the present invention. The information-recording media above also include rewritable media in addition to the write-once media. Needless to say, the invention is also applicable to optical information-reproducing device only for reproduction, if it uses an information-recording medium.

In examining whether the reflectance at the recording-light wavelength in the unrecorded region of the recording layer is smaller than the reflectance at the reproducing-light wavelength in the unrecorded region of the recording layer, if the intermediate layer is substantially transparent to the light at both wavelengths, the transmission coefficient of the unrecorded information-recording medium when a recording light or a reproducing light is irradiated is determined, and if the transmission coefficient of the recording light is higher, it may be regarded that the relationship above is satisfied.

The object, collimator and detection lenses used in the embodiments above are so designated for convenience, and are no more than common lenses.

Although an information-recording media having a recording part on one side of a substrate were described in the embodiments above, the present invention is also applicable to an information-recording medium having two recording regions on both faces, which is prepared by connecting two substrates each having a recording part to each other.

Further, although the information-recording medium was explained by taking an optical disk as an example in the embodiments above, the present invention is also applicable to similar information recording/reproduction devices, for example, card-, drum-, and tape-shaped products for production of media different in multiple specifications such as thickness and recording density.

As described above, an aspect of the present invention is an information-recording medium having a substrate and a recording part formed on the substrate allowing three-dimensional formation of recording pits, the recording part, comprising multiple recording layers, in which the recording pits are formed with a converged recording light with a wavelength of λ2 and reproduced with a converged reproducing light with a wavelength λ1 shorter than the wavelength λ2, and intermediate layers alternately laminated between the recording layers, wherein the reflectance at the recording light wavelength of λ2 in unrecorded regions of the recording layers is smaller than the reflectance at the repruducing light wavelength λ1 in the unrecorded regions of the recording layers. In the configuration above, it is possible to assure supply of a reflected light for focus servo control and suppress decrease in recording light intensity in the bottom recording layer far separated from the object lens, and thus to provide an information-recording medium allowing favorable recording and reproduction at high accuracy.

In the invention, the recording layer preferably contains a photochromic material. In the configuration above, it is possible to obtain sufficient recording-light intensity also in the bottom recording layer and thus allows favorable recording in a nonlinear phenomenon even with a photochromic material of which the recording sensitivity is influenced by light intensity.

In the invention, the recording and reproducing lights preferably satisfy any one of the following relationships (i) to (iv) of the reproducing-light wavelength λ1 and the recording-light wavelength λ2:

$0.6 \ \mu m \leq \lambda 1 \leq 0.7 \ \mu m$, and $0.73 \ \mu m \leq \lambda 2 \leq 0.83 \ \mu m$;  (i)

$0.35 \ \mu m \leq \lambda 1 \leq 0.45 \ \mu m$, and $0.6 \ \mu m \leq \lambda 2 \leq 0.7 \ \mu m$;  (ii)

$0.48 \ \mu m \leq \lambda 1 \leq 0.58 \ \mu m$, and $0.6 \ \mu m \leq \lambda 2 \leq 0.7 \ \mu m$; and  (iii)

$0.35 \ \mu m \leq \lambda 1 \leq 0.45 \ \mu m$, $0.48 \ \mu m \leq \lambda 2 \leq 0.58 \ \mu m$.  (iv)

When a reproducing-light wavelength having a wavelength shorter than the recording-light wavelength is used, if the relationship above between the recording and reflected lights is satisfied, it becomes possible to perform favorable recording while assuring supply of the reflected light for focus servo control. Because the size of the recording pits formed in such a nonlinear absorption phenomenon is smaller than that formed by one-photon absorption recording, when recording and reproducing lights having the relationship above are used, the effective spot diameters during recording and reproduction become closer to each other, allowing optimization or improvement in density of recording and reproduction.

In the present invention, the thickness of the recording layer, t, satisfies the condition represented by the following Formula (1) showing the relationship between the variation of the reflectances of the reproducing light in the unrecorded region of the recording layer depending on the thickness of the recording layer and the variation of the reflectance of the recording light in the unrecorded region of the recording layer depending on the thickness of the recording layer:

$$r1_{max}[1-\cos(4n\pi t/\lambda 1)]/2 > r2_{max}[1-\cos(4n\pi t/\lambda 2)]/2 \quad (1)$$

In the Formula, λ1 represents the reproducing-light wavelength; λ2 represents the recording-light wavelength; n represents the refractive index of the unrecorded region; t represents the thickness of the recording layer; $r1_{max}$ represents the maximum reflectance of λ1 in the unrecorded region of the recording layer; and $r2_{max}$ represents the maximum reflectance of λ2 in the unrecorded region of the recording layer.

In the configuration above, it is possible to assure supply of a reflected light for focus servo control and perform favorable recording, because a recording layer having a reflectance of reproducing light in the unrecorded region higher than that of the recording light is obtained.

In the present invention, preferably, the thickness of the recording layer, t, satisfying the relationship of the reflectance above is the thickness of the recording layer, $t_i$, at which the variation of the reflectance of the reproducing light in the unrecorded region depending on the thickness of the recording layer agrees with that of the reflectance of the recording light in the unrecorded region depending on the thickness of the recording layer, and satisfies the condition represented by the following Formula (2):

$$t_{2i} < t < t_{2i+1} \quad (2)$$

In the Formula, $t_i$ is 0 or more; i is an integer of 0 or more; and $0 \leq t_1 < t_{i+1}$.

In the present invention, when the difference in refractive index caused by wavelength dispersion is small, $r1_{max}$ and $r2_{max}$ may be considered to be substantially the same as each other.

Preferably in the present invention, the difference in refractive index between the intermediate layer and the unrecorded region is larger than the difference in refractive index between the intermediate layer and the recorded region of the recording layer and the thickness of the recording layer, t, satisfies the condition represented by the following Formula (3):

$$(p-0.369)\lambda 1/(4n) \leq t \leq (p+0.369)\lambda 1/(4n) \qquad (3)$$

In the Formula, $\lambda 1$ represents the reproducing-light wavelength; $\lambda 2$ represents the recording-light wavelength; t represents the thickness of the recording layer; n represents the refractive index of the unrecorded region of the recording layer; and p is a given positive odd number.

In the configuration above, it is possible to obtain a sufficiently high light intensity of the reflected light for focus servo control during reproduction in an information-recording medium having an H→L character.

Also preferably in the present invention, the difference in refractive index between the intermediate layer and the unrecorded region is smaller than the difference in refractive index between the intermediate layer and the recorded region of the recording layer and the thickness of the recording layer, t, satisfies the condition represented by the following Formula (4):

$$(p-0.369)\lambda 1/(4n1) \leq t \leq (p+0.369)\lambda 1/(4n1) \qquad (4)$$

In the Formula, $\lambda 1$ represents the reproducing-light wavelength; $\lambda 2$ represents the recording-light wavelength; t represents the thickness of the recording layer; n1 represents the refractive index of the recorded region in the recording-layer; and p is a given positive odd number.

In the configuration above, it is possible to obtain a sufficiently high light intensity of the reflected light for focus servo control during reproduction in an information-recording medium having an L→H character.

In addition, preferably in the present invention, the thickness of the recording layer, t, satisfies the condition represented by the following Formula (5):

$$(q-0.104)\lambda 2/(4n) \leq t \leq (q+0.104)\lambda 2/(4n) \qquad (5)$$

In the Formula, $\lambda 2$ represents the recording-light wavelength; t represents the thickness of the recording layer; n represents the refractive index of the unrecorded region; and q is a given positive even number.

In the configuration above, it is possible to optimize the thickness of the recording layer in performing focus servo control with a reproducing light during recording.

In the present invention, the thickness of the recording layer is preferably 0.6 µm or less. In the configuration above, the recording layer is formed easily, for example, by a coating method.

As for the thickness of the recording layer, t, in the present invention, i of the $t_i$ in Formula (2) is preferably one of 1 to 3. In the configuration above, it is possible to obtain an information-recording medium having a distinctively large difference between the reflectances of reproducing light and, the reflectances of recording light in the unrecorded region.

Preferably in the present invention, the difference in refractive index between the intermediate layer and the unrecorded region or the difference in refractive index between the intermediate layer and the recorded region of the recording layer is 0.05 or more. In the configuration above, it is possible to obtain a reflectance of at least approximately 0.1% or more with respect to the reproducing light and perform favorable focus servo control during reproduction.

In the present invention, when the recording and reproducing lights have any one of the following relationships (i) to (iv) between the reproducing-light wavelength $\lambda 1$ and the recording-light wavelength $\lambda 2$, the thickness of the recording layer t preferably satisfies the conditions represented by the following Formulae (6) to (11):

(i) when 0.6 µm$\leq \lambda 1 \leq$0.7 µm, and 0.73 µm$\leq \lambda 2 \leq$0.83 µm, $3.90\lambda 2/(4n) \leq t \leq 4.10\lambda 2/(4n)$ (6);

(ii) when 0.35 µm$\leq \lambda 1 \leq$0.45 µm, and 0.6 µm$\leq \lambda 2 \leq$0.7 µm, $1.90\lambda 2/(4n) \leq t \leq 2.10\lambda 2/(4n)$ (7), or $3.90\lambda 2/(4n) \leq t \leq 4.10\lambda 2/(4n)$ (8);

(iii) when 0.48 µm$\leq \lambda 1 \leq$0.58 µm, and 0.6 µm$\leq \lambda 2 \leq$0.7 µm, $3.90\lambda 2/(4n) \leq t \leq 4.10\lambda 2/(4n)$ (9);

(iv) when 0.35 µm$\leq \lambda 1 \leq$0.45 µm, and 0.48 µm$\leq \lambda 2 \leq$0.58 µm, and $1.90\lambda 2/(4n) \leq t \leq 2.10\lambda 2/(4n)$ (10), or $3.90\lambda 2/(4n) \leq t \leq 4.10\lambda 2/(4n)$ (11).

In Formulae (6) to (11), $\lambda 1$ represents the reproducing-light wavelength; $\lambda 2$ represents the recording-light wavelength; n represents the refractive index of the unrecorded region of the recording layer; and t represents the thickness of the recording layer.

In the configuration above, it is possible to assure supply of a reflected light for focus servo control both during recording and reproduction and suppress decrease of the light intensity of the recording light during recording and the reproducing light during reproduction, allowing favorable recording and reproduction.

Another aspect according to the present invention is an optical information-recording/reproducing device, comprising a first light source emitting an recording light, a second light source emitting a reproducing light with a wavelength shorter than the recording-light wavelength, an object lens converging the recording and reproducing lights emitted from the first and second light sources onto the information-recording medium, and a photodetector detecting the reflected light from the information-recording medium, wherein recording pits are formed during recording by using the change in an optical constant of the recording layer onto which the recording light is converged and the recording pits are reproduced during reproduction by performing focus servo control by using the reflected light of the reproducing light from the recording layer and also by using the difference in reflectance caused by the change in the optical constant of the recording layer. Because the information-recording medium according to the present invention has a reflectance at the reproducing-light wavelength in the unrecorded region higher than that at the recording-light wavelength in the unrecorded region, it is possible to perform focus serve with a reproducing light during reproduction and reduce decrease in recording light intensity, allowing favorable recording.

In the optical information-recording/reproducing device according to the present invention, the focus servo control may be performed by using the reflected light of the recording light from the recording layer during the recording. In the configuration above, the focus servo control is performed also during recording, allowing accurate recording of a recording pit.

In the optical information recording/reproducing device according to the present invention, the focus servo control may be performed by irradiating both the recording and reproducing lights and using the reflected light of the reproducing light from the recording layer during the recording. The reflectance of reproducing light is made larger than the reflectance of recording light in the recorded region of the information-recording medium according to the present invention, and thus, focus servo control with the reproducing light enables accurate recording of a recording pit.

In the optical information recording/reproducing device according to the present invention, the light source emitting the recording light is preferably a laser beam source emitting a pulsed light having a pulse width of 100 femtoseconds to 10 nanoseconds. In the configuration above, recording is performed favorably in a nonlinear phenomenon.

In the optical information recording/reproducing device according to the present invention, the recording pits are formed in a nonlinear absorption phenomenon such as two-photon absorption, multiple-photon absorption, or plasma absorption process. In the configuration above, three-dimensionally recording pits are formed, because the change in an optical constant occurs only in a particular recording layer by convergence of the recording light.

Preferably in the optical information recording/reproducing device according to the present invention, when the recording and reproducing lights have any one of the following relationships (i) to (iv) between the reproducing-light wavelength $\lambda 1$ and the recording-light wavelength $\lambda 2$, the thickness of the recording layer, t, satisfies the conditions represented by the following Formulae (12) to (17);

(i) when $0.6 \ \mu m \leq \lambda 1 \leq 0.7 \ \mu m$, and $0.73 \ \mu m \leq \lambda 2 \leq 0.83 \ \mu m, 3.90\lambda 2/(4n) \leq t \leq 4.10\lambda 2/(4n)$ (12);

(ii) when $0.35 \ \mu m \leq \lambda 1 \leq 0.45 \ \mu m$, and $0.6 \ \mu m \leq \lambda 2 \leq 0.7 \ \mu m, 1.90\lambda 2/(4n) \leq t \leq 2.10\lambda 2/(4n)$ (13), or $3.90\lambda 2/(4n) \leq t \leq 4.10\lambda 2/(4n)$ (14);

(iii) when $0.48 \ \mu m \leq \lambda 1 \leq 0.58 \ \mu m$, and $0.6 \ \mu m \leq \lambda 2 \leq 0.7 \ \mu m, 3.90\lambda 2/(4n) \leq t \leq 4.10\lambda 2/(4n)$ (15); and (iv) when $0.35 \ \mu m \leq \lambda 1 \leq 0.45 \ \mu m$, and $0.48 \ \mu m \leq \lambda 2 \leq 0.58 \ \mu m, 1.90\lambda 2/(4n) \leq t \leq 2.10\lambda 2/(4n)$ (16), or $3.90\lambda 2/(4n) \leq t \leq 4.10\lambda 2/(4n)$ (17).

In Formulae (12) to (17), $\lambda 1$ represents the reproducing-light wavelength; $\lambda 2$ represents the recording-light wavelength; n represents the refractive index of the unrecorded region of the recording layer; and t represents the thickness of the recording layer.

In the configuration above, it is possible to obtain the light for focus servo control both during recording and reproduction and assure the intensity of the recording light during recording and the reproducing sufficiently, allowing favorable recording and reproduction.

Preferably in the optical information recording/reproducing device according to the present invention, the recording pits are formed three-dimensionally so as not to allow the recording light converged by the object lens to pass through previously-recorded recording pits. In the configuration above, it is possible to reduce the stray light (noise light), such as scattered light or undesirable diffracted light, generated by transmission through previously-recorded recording pits (improvement in signal-to-noise ratio).

Preferably in the optical information recording/reproducing device according to the present invention, the recording pits are formed sequentially from the recording layer most separated from the object lens in the recording region of the information-recording medium. In the configuration above, it is possible to reduce the stray light (noise light), such as scattered light or undesirable diffracted light, generated by transmission of the recording light through previously-recorded recording pits (improvement in signal-to-noise ratio).

Yet another aspect of the present invention is an optical information-recording/reproducing device, comprising a first light source emitting an recording light, a second light source emitting a reproducing light with a wavelength shorter than the recording-light wavelength, an object lens converging the recording and reproducing lights emitted from the first and second light sources onto the information-recording medium, and a photodetector detecting the reflected light from the information-recording medium, wherein recording pits are formed by performing focus servo control by using the reflected light of the recording light from the recording layer and by using the change in an optical constant of the recording layer into which the recording light is converged during recording or by performing focus servo control by irradiating both the recording and reproducing lights and using the reflected light of the reproducing light from the recording layer and also by using the change in an optical constant of the recording layer into which the recording light is converged during recording. Because the information-recording medium according to the present invention, has a reflectance to the reproducing light in the unrecorded region higher than that to the recording light in the unrecorded region, it is possible to perform focus servo control by irradiating a recording light or a reproducing light during recording and by using the reflected light. In addition, absence of decay of the recording light allows favorable recording at high accuracy in the lower recording layer.

INDUSTRIAL APPLICABILITY

The present invention provides an information-recording/reproducing medium allowing recording recording pits as information bits three-dimensionally and also allowing recording and/or reproduction in the lower layer separated from the object lens while focus servo control is performed.

The invention claimed is:

1. An information-recording medium having a substrate and a recording part formed on the substrate allowing three-dimensional formation of recording pits,
   the recording part, comprising multiple recording layers, in which the recording pits are formed with a converged recording light with a wavelength of $\lambda 2$ and reproduced with a converged reproducing light with a wavelength $\lambda 1$ shorter than the wavelength $\lambda 2$, and intermediate layers alternately laminated between the recording layers, wherein
   the reflectance at the recording light wavelength of $\lambda 2$ in unrecorded regions of the recording layers is smaller than the reflectance at the reproducing light wavelength of $\lambda 1$ in the unrecorded regions of the recording layers.

2. The information-recording medium according to claim 1, wherein at least one of the recording layers contains a photochromic material.

3. The information-recording medium according to claim 1, wherein the recording and reproducing lights satisfy any one of the following relationships (i) to (iv) between the reproducing-light wavelength $\lambda 1$ and the recording-light wavelength $\lambda 2$:

$0.6 \ \mu m \leq \lambda 1 \leq 0.7 \ \mu m$, and $0.73 \ \mu m \leq \lambda 2 \leq 0.83 \ \mu m$; (i)

$0.35 \ \mu m \leq \lambda 1 \leq 0.45 \ \mu m$, and $0.6 \ \mu m \leq \lambda 2 \leq 0.7 \ \mu m$; (ii)

$0.48 \ \mu m \leq \lambda 1 \leq 0.58 \ \mu m$, and $0.6 \ \mu m \leq \lambda 2 \leq 0.7 \ \mu m$; and (iii)

$0.35 \ \mu m \leq \lambda 1 \leq 0.45 \ \mu m$, and $0.48 \ \mu m \leq \lambda 2 \leq 0.58 \ \mu m$. (iv)

4. The information-recording medium according to claim 1, wherein a thickness t of at least one of the recording layers satisfies the condition represented by the following Formula (1) showing the relationship between the variation of the reflectance of the reproducing light in the unrecorded region of the recording layer depending on the thickness of the recording layer and the variation of the reflectance of the recording light in the unrecorded region of the recording layer depending on the thickness of the recording layer:

$$r1_{max}[1-\cos(4n\pi t/\lambda 1)]/2 > r2_{max}[1-\cos(4n\lambda t/\lambda 2)]/2 \quad (1)$$

wherein, $\lambda 1$ represents the reproducing-light wavelength; $\lambda 2$ represents the recording-light wavelength; n represents the refractive index of the unrecorded region; $r1_{max}$ represents the maximum reflectance of $\lambda 1$ in the unrecorded region of the recording layer; and $r2_{max}$ represents the maximum reflectance of $\lambda 2$ in the unrecorded region of the recording layer.

5. The information-recording medium according to claim 4, wherein the thickness t of the recording layer is a thickness $t_1$ at which the variation of the reflectance of the reproducing light in the unrecorded region depending on the thickness of the recording layer agrees with that of the reflectance of the recording light in the unrecorded region depending on the thickness of the recording layer, and satisfies the condition represented by the following Formula (2):

$$t_{2i} < t < t_{2i+1} \quad (2)$$

wherein, $t_i$ is 0 or more; i is an integer of 0 or more; and $0 \leq t_1 < t_{i+1}$.

6. The information-recording medium according to claim 4, wherein $r1_{max}$ is substantially the same as $r2_{max}$.

7. The information-recording medium according to claim 1, wherein the difference in refractive index between an arbitrary one of the intermediate layers and the unrecorded region is larger than the difference in refractive index between the arbitrary intermediate layer and the recorded region of a respective one of the recording layers and a thickness t of the respective recording layer satisfies the condition represented by the following Formula (3):

$$(p-0.369)\lambda 1/(4n) \leq t \leq (p+0.369)\lambda 1/(4n) \quad (3)$$

wherein, $\lambda 1$ represents the reproducing-light wavelength; $\lambda 2$ represents the recording-light wavelength; n represents the refractive index of the unrecorded region of the respective recording layer; and p is a given positive odd number.

8. The information-recording medium according to claim 1, wherein the difference in refractive index between an arbitrary one of the intermediate layers and the unrecorded region is smaller than the difference in refractive index between the arbitrary intermediate layer and the recorded region of a respective one of the recording layers and a thickness t of the respective recording layer satisfies the condition represented by the following Formula (4):

$$(p-0.369)\lambda 1/(4n1) \leq t \leq (p+0.369)\lambda 1/(4n1) \quad (4)$$

wherein, $\lambda 1$ a represents the reproducing-light wavelength; $\lambda 2$ represents the recording-light wavelength; n1 represents the refractive index of the recorded region in the respective recording-layer; and p is a given positive odd number.

9. The information-recording medium according to claim 1, wherein a thickness t of at least one of the recording layers satisfies the condition represented by the following Formula (5):

$$(q-0.104)\lambda 2/(4n) \leq t \leq (q+0.104)\lambda 2/(4n) \quad (5)$$

wherein, $\lambda 2$ represents the recording-light wavelength; n represents the refractive index of the unrecorded region; and q is a given positive even number.

10. The information-recording medium according to claim 1, wherein the thickness of the recording layer is 0.6 μm or less.

11. The information-recording medium according to claim 5, wherein i is any one of 1 to 3.

12. The information-recording medium according to claim 1, wherein the difference in refractive index between a given one of the intermediate layers and the unrecorded region in a respective one of the recording layers or the difference in refractive index between the given intermediate layer and the recorded region in the respective recording layer is 0.05 or more.

13. The information-recording medium according to claim 1, wherein, when the recording and reproducing lights have any one of the following relationships (i) to (iv) between the reproducing-light wavelength $\lambda 1$ and the recording-light wavelength $\lambda 2$, a thickness t of at least one of the recording layers satisfies the conditions represented by the following Formulae (6) to (11):

(i) when 0.6 μm $\leq \lambda 1 \leq$ 0.7 μm, and 0.73 μm $\leq \lambda 2 \leq$ 0.83 μm, $3.90\lambda 2/(4n) \leq t \leq 4.10\lambda 2/(4n)$ (6);

(ii) when 0.35 μm $\leq \lambda 1 \leq$ 0.45 μm, and 0.6 μm $\leq \lambda 2 \leq$ 0.7 μm, $1.90\lambda 2/(4n) \leq t \leq 2.10\lambda 2/(4n)$ (7), or $3.90\lambda 2/(4n) \leq t \leq 4.10\lambda 2/(4n)$ (8);

(iii) when 0.48 μm $\leq \lambda 1 \leq$ 0.58 μm, and 0.6 μm $\leq \lambda 2 \leq$ 0.7 μm, $3.90\lambda 2/(4n) \leq t \leq 4.10\lambda 2/(4n)$ (9); and (iv) when 0.35 μm $\leq \lambda 1 \leq$ 0.45 μm, and 0.48 μm $\leq \lambda 2 \leq$ 0.58 μm, $1.90\lambda 2/(4n) \leq t \leq 2.10\lambda 2/(4n)$ (10), or $3.90\lambda 2/(4n) \leq t \leq 4.10\lambda 2/(4n)$ (11);

in Formulae (6) to (11), $\lambda 1$ represents the reproducing-light wavelength; $\lambda 2$ represents the recording-light wavelength; and n represents the refractive index of the unrecorded region of the recording layer.

14. An optical information-recording/reproducing device, comprising a first light source emitting a recording light,
a second light source emitting a reproducing light with a wavelength shorter than the recording-light wavelength,
an object lens converging the recording and reproducing lights emitted from the first and second light sources onto the information-recording medium according to claim 1, and
a photodetector detecting the reflected light from the information-recording medium, wherein
recording pits are formed during recording by using the change in an optical constant of the recording layer onto which the recording light is converged and are reproduced during reproduction by performing focus servo control by using the reflected light of the reproducing light from the recording layer and also by using the difference in reflectance caused by the change in the optical constant of the recording layer.

15. The optical information-recording/reproducing device according to claim 14, wherein focus servo control is performed by using the reflected light of the recording light from the recording layer during the recording.

16. The optical information-recording/reproducing device according to claim 14, wherein focus servo control is performed by irradiating both the recording and reproducing lights and using the reflected light of the reproducing light from the recording layer during recording.

17. The optical information-recording/reproducing device according to claim 14, wherein the light source emitting the recording light is a laser beam source emitting a pulsed light having a pulse width of 100 femtoseconds to 10 nanoseconds.

18. The optical information-recording/reproducing device according to claim 14, wherein the recording pits are formed in a nonlinear absorption phenomenon such as two-photon absorption, multiple-photon absorption, or plasma absorption process.

19. The optical information-recording/reproducing device according to claim 16, wherein, when the recording and reproducing lights have any one of the following relationships (i) to (iv) between the reproducing-light wavelength $\lambda 1$ and the recording-light wavelength $\lambda 2$, a thickness t of the recording layer satisfies the conditions represented by the following Formulae (12) to (17):

(i) when $0.6 \ \mu m \leq \lambda 1 \leq 0.7 \ \mu m$, and $0.73 \ \mu m \leq \lambda 2 \leq 0.83 \ \mu m, 3.90\lambda 2/(4n) \leq t \leq 4.10\lambda 2/(4n)$ \hfill (12);

(ii) when $0.35 \ \mu m \leq \lambda 1 \leq 0.45 \ \mu m$, and $0.6 \ \mu m \leq \lambda 2 \leq 0.7 \ \mu m, 1.90\lambda 2/(4n) \leq t \leq 2.10\lambda 2/(4n)$ \hfill (13), or $3.90\lambda 2/(4n) \leq t \leq 4.10\lambda 2/(4n)$ \hfill (14);

(iii) when $0.48 \ \mu m \leq \lambda 1 \leq 0.58 \ \mu m$, and $0.6 \ \mu m \leq \lambda 2 \leq 0.7 \ \mu m, 3.90\lambda 2/(4n) \leq t \leq 4.10\lambda 2/(4n)$ \hfill (15); and (iv) when $0.35 \ \mu m \leq \lambda 1 \leq 0.45 \ \mu m$, and $0.48 \ \mu m \leq \lambda 2 \leq 0.58 \ \mu m, 1.90\lambda 2/(4n) \leq t \leq 2.10\lambda 2/(4n)$ \hfill (16), or $3.90\lambda 2/(4n) \leq t \leq 4.10\lambda 2/(4n)$ \hfill (17);

in Formulae (12) to (17), $\lambda 1$ represents the reproducing-light wavelength; $\lambda 2$ represents the recording-light wavelength; and n represents the refractive index of the unrecorded region of the recording layer.

20. The optical information-recording/reproducing device according to claim 14, wherein the recording pits are formed three-dimensionally so as not to allow the recording light converged by the object lens to pass through previously-recorded recording pits.

21. The optical information-recording/reproducing device according to claim 14, wherein recording pits are formed sequentially from the recording layer most separated from the object lens in the recording region of the information-recording medium.

22. An optical information-recording/reproducing device, comprising a first light source emitting a recording light, a second light source emitting a reproducing light with a wavelength shorter than the recording-light wavelength, an object lens converging the recording and reproducing lights emitted from the first and second light sources onto the information-recording medium according to claim 1, and a photodetector detecting the reflected light from the information-recording medium, wherein recording pits are formed by performing focus servo control by using the reflected light of the recording light from the recording layer and by using the change in an optical constant of the recording layer into which the recording light is converged during recording, or by performing focus servo control by irradiating both the recording and reproducing lights and using the reflected light of the reproducing light from the recording layer and also by using the change in an optical constant of the recording layer into which the recording light is converged during recording.

\* \* \* \* \*

UNITED STATES PATENT AND TRADEMARK OFFICE
CERTIFICATE OF CORRECTION

PATENT NO. : 7,848,205 B2
APPLICATION NO. : 11/913013
DATED : December 7, 2010
INVENTOR(S) : Teruhiro Shiono et al.

It is certified that error appears in the above-identified patent and that said Letters Patent is hereby corrected as shown below:

In column 41, claim 4, line 10, "$r1_{max}[1-\cos(4n\pi t/\lambda 1)]/2 > r2_{max}[1-\cos(4n\lambda t/\lambda 2)]/2$" should read -- $r1_{max}[1-\cos(4n\pi t/\lambda 1)]/2 > r2_{max}[1-\cos(4n\pi t/\lambda 2)]/2$ --.

Signed and Sealed this
Twenty-fourth Day of May, 2011

David J. Kappos
*Director of the United States Patent and Trademark Office*